(12) United States Patent
Nishimura et al.

(10) Patent No.: US 7,785,199 B2
(45) Date of Patent: Aug. 31, 2010

(54) TOUCH-SENSITIVE GAMING SYSTEM WITH DUAL DISPLAYS

(75) Inventors: Kentaro Nishimura, Kyoto (JP);
Masayasu Nakata, Kyoto (JP);
Toshikazu Tomizawa, Kyoto (JP);
Yosuke Hatayama, Kyoto (JP);
Noriyuki Niwa, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1220 days.

(21) Appl. No.: 10/931,202

(22) Filed: Sep. 1, 2004

(65) Prior Publication Data
US 2005/0176502 A1    Aug. 11, 2005

(30) Foreign Application Priority Data
Feb. 9, 2004    (JP) .............................. 2004-032472

(51) Int. Cl.
*A63F 9/24*    (2006.01)
*A63F 13/00*    (2006.01)

(52) U.S. Cl. ................................ 463/31; 463/4; 463/37

(58) Field of Classification Search .................. 463/1–6, 463/30–33
See application file for complete search history.

(56) References Cited

U.S. PATENT DOCUMENTS 5,951,397 A    9/1999    Dickinson
6,210,279 B1    4/2001    Dickinson
6,431,982 B2 *    8/2002    Kobayashi ..................... 463/4
6,450,887 B1    9/2002    Mir et al.
2001/0027121 A1    10/2001    Boesen

FOREIGN PATENT DOCUMENTS

| GB | 2 345 558 | 7/2000 |
|---|---|---|
| JP | 10-28777 | * 2/1998 |
| JP | 10-28777 | * 3/1998 |
| JP | A-2000-317137 | 11/2000 |
| JP | A-2002-939 | 1/2002 |
| WO | 00/79372 | 12/2000 |
| WO | WO 00/79372 | * 12/2000 |
| WO | 01/08763 | 2/2001 |

OTHER PUBLICATIONS

General Strategy Unit Commands, http://battle.net/scc/GS/com.shtml, US Game relase date Apr. 1998.*
General Strategy Hot Keys and Special Commands, http://battle.net/scc/GS/control.shtml, US Game relase date Apr. 1998.*
StarCraft Game Manual, US Game release date Apr. 1998, pertinent pp. 13, 18.*
How to Play: The Simpsons Arcade Game, released on 1991, month not available.*

* cited by examiner

*Primary Examiner*—Peter DungBa Vo
*Assistant Examiner*—Jasson H Yoo
(74) *Attorney, Agent, or Firm*—Nixon & Vanderhye P.C.

(57) ABSTRACT

A first game image to be controlled by using an operation switch section 14 is displayed on a first LCD 11. In addition, a second game image to be controlled by using a touch panel 13 is displayed on a second LCD 12. The first game image and the second game image are expressions, taken from different perspectives, of the same game space generated by executing a game program.

26 Claims, 45 Drawing Sheets

F I G. 2
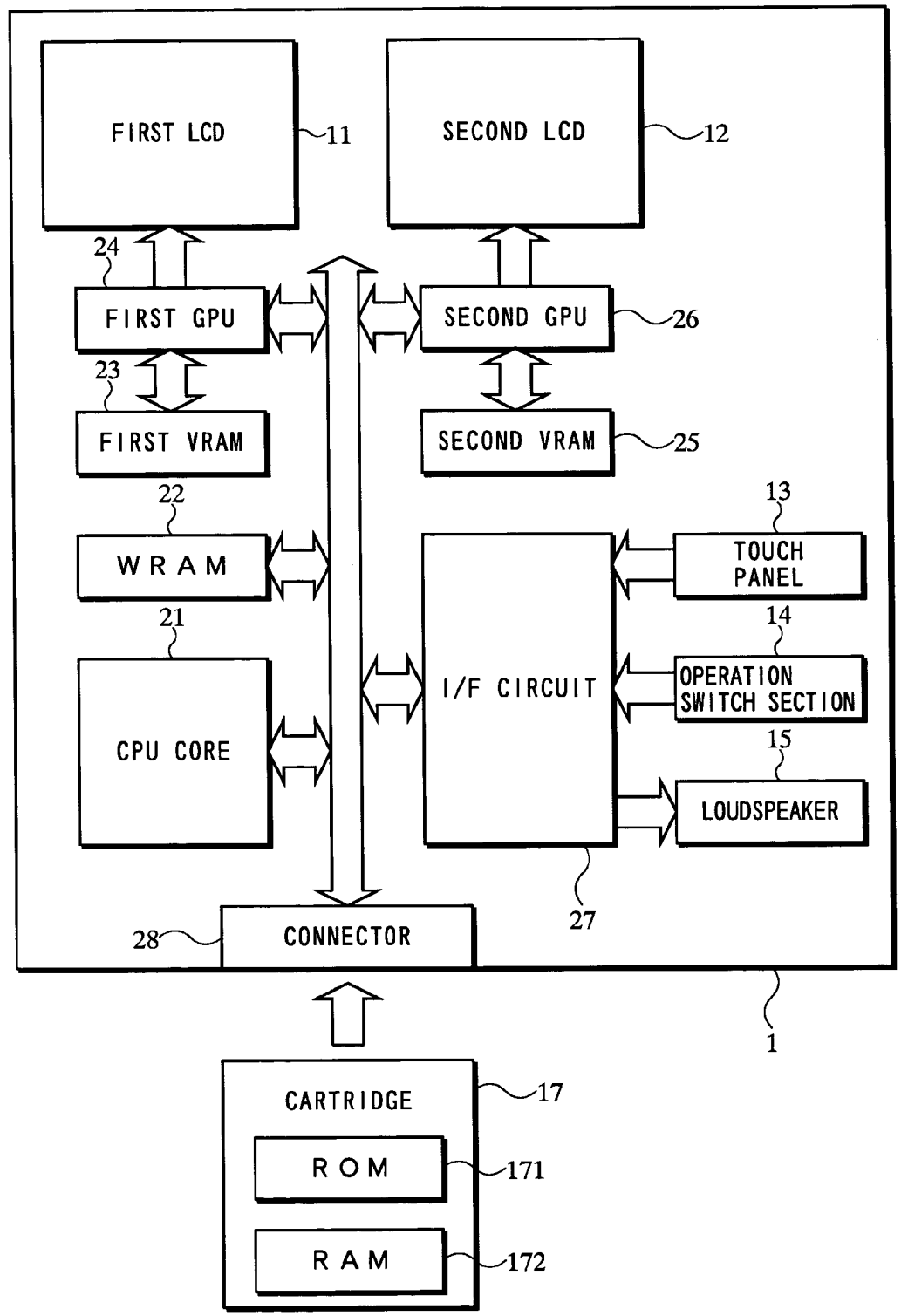

F I G. 3 4
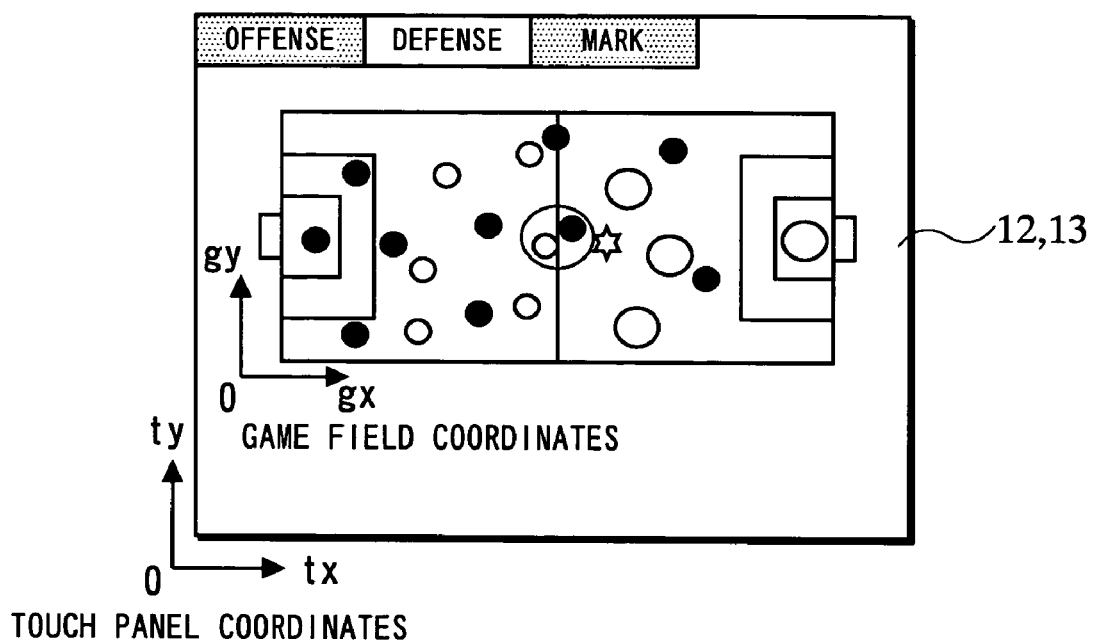

TOUCH-SENSITIVE GAMING SYSTEM WITH DUAL DISPLAYS

FIELD

The technology herein relates to a computer-based game apparatus and a storage medium storing a game program to be executed by the computer-based game apparatus. More particularly, the technology herein relates to a game apparatus including a first display section for displaying a game image and a second display section different from the first display section, and a storage medium storing a game program adapted to provide dual display capabilities.

BACKGROUND AND SUMMARY

Game systems allowing a game player to enjoy a game by controlling a character (player character) displayed on a game screen have been in wide use.

To allow a player to operate such a player character, direction keys, operation switches, joysticks, and/or the like (hereinafter collectively referred to as "direction keys and the like") are provided on a main body of the game apparatus or on a controller. For example, in a game system disclosed in Japanese Laid-Open Patent Publication No. 2000-317137, a player controls the action of a player character that appears in a game image (i.e., an image representing the game space) by operating the direction keys and the like at appropriate times. Japanese Laid-Open Patent Publication No. 2000-317137 discloses a soccer game apparatus in which a player designates the action of one of athlete characters by using direction keys and the like to advance the game. In the soccer game apparatus of Japanese Laid-Open Patent Publication No. 2000-317137, a map showing the entire field in an abridged manner is displayed in a bottom center region of the display area. The map shows team and opponent players in different colors, so that the game player can recognize the positioning of all player team characters and opponent characters on the entire field by looking at this map.

There are also game systems having a touch panel provided on a display screen for controlling player characters. For example, in a game system disclosed in Japanese Laid-Open Patent Publication No. 2002-939, a player controls a player character appearing in a game image by touch-operating a touch panel at appropriate times. Japanese Laid-Open Patent Publication No. 2002-939 discloses a game in which a golf swing can be executed by touching and dragging a PUSH button which is displayed as a game image on a touch panel. A player character can be made to jump by being touched. In these games, as a player touches on a game image via a touch panel, a player character moves in accordance with the touched position.

In the aforementioned games disclosed in Japanese Laid-Open Patent Publication No. 2000-317137 and Japanese Laid-Open Patent Publication No. 2002-939, a game image which is suited to the type of operation means is displayed. As an example, a game in which a player switches between a plurality of player characters while advancing the game may be considered. In such a game, when the game is being played by using the direction keys and the like, it is necessary to indicate which player character is to be activated through an operation of the direction keys and the like. Therefore, for example, the game disclosed in Japanese Laid-Open Patent Publication No. 2000-317137 employs a game image in which a mark is displayed at the feet of a player character which is currently controllable. On the other hand, when the game is being played by using the touch panel, touching on a player character image results in activation of the player character. Since a plurality of player character images can be activated one after another by being touched, it is unnecessary to display the aforementioned mark.

However, in the case where the game is being played by using a touch panel, if a plurality of player characters are being displayed on the screen so as to overlap one another, it may be unclear as to which character is currently controllable, or it may be impossible to control any player character that is positioned behind another character. Moreover, when one wants to designate a moving direction for a player character in the case where the game images are 3D images, it is difficult, with a touching trajectory, to accurately designate a direction in the 3D space.

The above description is only exemplary—it does not mean that it is always necessary to display a mark in a game which is played by using direction keys and the like, nor that game images in which characters are unlikely to overlap one another must be employed in any game which is played by using a touch panel. Neither does it mean that 3D images can never be provided in a game which is played by using a touch panel.

For example, even in a game which is played by using direction keys and the like, a mark indication may be unnecessary in the case where the character being controlled by the player is obvious. As for games which are played by using a touch panel, enemies which are displayed in the form of overlapping 3D images may not be problematic in a game in which enemies on the screen are to be erased by being directly touched. The enemies can simply be erased one after another by being attacked. As can be seen from such examples, it depends on the type of game and the game design as to which game images are suitable for operations via direction keys and the like and which game images are suitable for touch panel operations. There is no generalization as to which are suitable for operations via direction keys and the like, and which are suitable for touch panel operations. However, it can still be said in many cases that game images which are suitable for operations via direction keys and the like and game images which are suitable for being controlled by a touch panel are generally different.

As discussed above, game images which are suitable for operations using a touch panel and game images which are suitable for operations via direction keys and the like may exist on the same game screen. Specifically, in the case where the game apparatus is provided with a touch panel, the player executes a game program for the touch panel. She can make direct inputs to the game image, thus obtaining a comfortable operational environment. In the case where the game apparatus is provided with direction keys and the like, the player executes a game program for such operation means, and make indirect (if anything) inputs to the game images via the direction keys and the like, thus obtaining a comfortable operational environment. However, in the case where a game image which is not suitable for operations using the operation means provided for the game apparatus, the player's operational environment is greatly deteriorated, possibly making the entire game operation difficult or impossible.

Consider a case where the game apparatus is provided with both a touch panel and direction keys and the like. If a game image which is suitable only to the operation means such as direction keys or the like is displayed on this game apparatus, a comfortable operational environment cannot be obtained when using the touch panel. Consequently, it may follow that only the direction keys and the like can be used for this game, and that the touch panel is never used. On the other hand, if a game image which is suitable only for the touch panel is displayed on this game apparatus, a comfortable operational environment cannot be obtained when using the direction keys and the like; it may follow that only the touch panel can be used for this game, and that the direction keys and the like are never used. In other words, even in the case where the game apparatus is provided with both a touch panel and direction keys and the like, the operational environment in conjunction with either one of them will be degraded, so that only one of the operation means may in effect be used. Even if game images which are compatible with the operational environments for both types of operation means are somehow devised and displayed, the characteristics of each type of operation means may be partly lost.

In the game apparatus disclosed in Japanese Laid-Open Patent Publication No. 2000-317137, an abridged map is displayed separately from the game image which is displayed in the main display area. This game apparatus displays the abridged map separately; although the abridged map may allow the positioning of all player characters to be recognized, the player can only watch the abridged map. The player generally cannot control the player characters displayed on the abridged map. Therefore, the player is only able to control a specific player character in a game image which is displayed in the main display area, by using the operation keys and the like.

An exemplary illustrative non-limiting implementation of the technology herein provides a game apparatus which is provided with a touch panel and another operation means other than the touch panel, such that game progression is realized while best utilizing the characteristics of both operation means. The technology herein further provides a storage medium having a game program stored therein which provides such features.

The exemplary illustrative non-limiting implementation has the following exemplary features. The reference numerals, step numbers, and the like provided in parentheses merely illustrate correspondence with the below-described implementations for assisting in the understanding of the exemplary illustrative non-limiting implementation, and by no means limit the scope of invention.

A game apparatus (1) according to an exemplary illustrative non-limiting implementation displays a game image representing an operable object (P, X, It) in a game space, the operable object being controllable in response to an operation performed by a player. The game apparatus comprises a first display section (11), an input section (14), first action control means (e.g. first action controller) (S15, S304), and first display control means (e.g. first display controller) (S29, S311). The first action control means controls an action of an operable object in accordance with an operation performed on the input section. The first display control means displays, on the first display section a first game image representing at least a portion of the game space.

The game apparatus further comprises a second display section (12), a touch panel (13), second action control means (e.g. second action controller) (S18, S21, S307), and second display control means (e.g. second display controller) (S30, S312). The second display section is different from the first display section. The touch panel is provided on a surface of the second display section. The second action control means controls an action of an operable object in accordance with a touch operation performed on the touch panel. The second display control means displays on the second display section a second game image representing at least a portion of the game space, the second game image being different from the first game image. In other words, the first game image and the second game image are images of different expressions of the same game space.

The first action control means and the second action control means may control the operations of respectively different operable objects, or control the operation of the same operable object. The first display section and the second display section may be physically separate, or may be constructed from a screen which is physically a single entity but is split into two. In a presently preferred exemplary illustrative non-limiting implementation, a "game space" is a notion including a game field and any game object which is present on the game field. The first display section and the second display section each display at least a partial area of the game field and any game object which exists in that area.

The game apparatus may further comprise game parameter storing means (e.g. game parameter storage locations) (22), first changing means (e.g. first changing programmed logic circuitry) (S24, S52, S60, S61, S323, S324), and second changing means (e.g. second changing programmed logic circuitry) (S18, S21, S307). The game parameter storing means stores a game parameter pertaining to the game space. The first changing means changes the game parameter stored in the game parameter storing means in accordance with the action of the operable object controlled by the first action control means. The second changing means changes the game parameter stored in the game parameter storing means in accordance with the action of the operable object controlled by the second action control means. The input section detects the movement of a body part of the player (e.g., a finger, a hand, or a foot). It may be disposed so as to protrude from the surface of the housing (18) and so as to be movable, such that the input section can be moved with respect to the housing in response to the player's operation. For example, the input section may be a button-type operation switch or a joystick, although not limited thereto. The input section may be a lever-type or a rotational-type, or may be a controller which is to be operated by being stamped under the player's foot. The input section may be a game controller imitating an actual device, such as:

a steering-wheel-type controller for a racing game,
a fishing-rod-type controller for a fishing game,
a turntable-type controller for a DJ game,
a gun controller for a gun-shooting game,
a musical-instrument-type controller for a music-playing game, or a controller imitating a controlling element in a cockpit in an airplane game or a train game.

Furthermore, the input section may be a controller of a mouse or track ball type, or may be that which detects the movement of a body part of the player (e.g., a finger, a hand, or a foot) by means of an acceleration sensor, a gyro-sensor, an infrared sensor, or the like.

The first display control means displays on the first display section, a first game image representing at least a portion of the game space generated based on the game parameter. The second display control means displays on the second display section a second game image representing at least a portion of the game space generated based on the game parameter. The game parameters stored in the game parameter storing means may be parameters pertaining to game objects (e.g., position data of athlete objects and a ball object in the game field as described later), or may be parameters pertaining to the game field.

In one example, the second game image displayed on the second display section is an image selected from the group consisting of:

a game image which is a 2D expression of the game space as -viewed in plan from above;

an image representing a portion of the game space broader than and encompassing the first game image displayed on the first display section; and an image representing the entire game space.

In another example, the first game image displayed on the first display section is an image at least containing an image representing the operable object whose action is controlled by the first action control means, and the second game image displayed on the second display section is an image at least containing an image representing the operable object whose action is controlled by the second action control means.

The game space may comprise a plurality of operable objects. In this case, the game apparatus further comprises first operable object selection means (e.g. first operable object selector) (S12) and second operable object selection means (e.g. second operable object selector) (S82). The first operable object selection means selects at least one of the plurality of operable objects as a first operable object, the selection being made automatically or by the player. The second operable object selection means selects at least one of the plurality of operable objects as a second operable object, the selection being made in accordance with coordinates obtained from the touch operation. The first action control means controls an action of the first operable object. The second action control means controls an action of the second operable object.

Which one of the plurality of operable objects should become a first operable object to be controlled by means of the input section, and which one of the plurality of operable objects should become a second operable object to be controlled by means of the touch panel, may be set depending on the characteristics of the input section and the touch panel. The operational characteristics of the input section, for example direction keys, operation switches, etc. may be an operation which is widely adopted in commonly-used game apparatuses, so that the player can freely activate an operable object by using the input section in conventional ways. However, basically, in one exemplary illustrative non-limiting arrangement, an operation using the input section can only control a single operable object (first operable object). On the other hand, an input to the touch panel can be made as if directly touching the game space in a second game image which is displayed through the touch panel, so that an intuitive, simple, and rapid operation can be performed. Since the operation is simple, it is possible to issue instructions to a plurality of operable objects (second operable objects) in a short period of time. However, since an operational instruction is given by touching a game image, it is generally undesirable in some exemplary arrangements for a plurality of targets of control to be displayed so as to overlay one another in the second game image.

By taking into consideration the aforementioned characteristics, an object (e.g., a main object) which it is important to be able to be freely controllable by the player may be set as an object to be controlled by means of the input section Objects (e.g., sub-objects) which might as well be roughly controllable by the player may be set as objects to be controlled by means of the touch panel. In the case where the object which it is important to be able to be freely controllable by the player varies depending on the game situation, the object which is controllable by means of the input section may be made changeable depending on the game situation. It may be ensured that a plurality of operable objects act in accordance with the player's intention by, while controlling one operable object by means of the input section, giving instructions to the other operable objects by means of the touch panel.

The second action control means may comprise continuous action control means (e.g. continuous action control programmed logic circuitry) (S158, S171 to S177, S181 to S186, S308). After a touch operation is performed on the touch panel, the continuous action control means controls the second operable object to continuously perform an action which is in accordance with the touch operation. Moreover, the game apparatus may further comprise control selection means (e.g. control selector) (S53 to S56). If the second operable object which is acting under the control of the continuous action control means is selected as the first operable object by the first operable object selection means during the action thereof, the control selection means ensures that the first operable object is controlled to act by the continuous action control means while no operation is performed on the input section. The first operable object is controlled to act by the first action control means if an operation is performed on the input section.

The game apparatus may further comprise corresponding trajectory calculation means (e.g. corresponding trajectory calculation programmed logic circuitry) (S78 to S81) and moving direction determination means (e.g. moving direction determination programmed logic circuitry) (S143, S145). In response to an input trajectory obtained from the touch operation performed on the touch panel, the corresponding trajectory calculation means calculates a corresponding trajectory in the game space so as to correspond to the input trajectory. The moving direction determination means determines a moving direction for the second operable object in the game space in accordance with the corresponding trajectory calculated by the corresponding trajectory calculation means. In this case, the continuous action control means controls the second operable object to continuously perform an action of moving in a moving direction determined by the moving direction determination means. For instance, as a first example of the moving direction determination means, a direction along a corresponding trajectory may be determined as a moving direction (H, I) for the second operable object. As a second example of the moving direction determination means, a direction approaching the corresponding trajectory may be determined as a moving direction (a direction approaching K) for the second operable object. In this case, the continuous action control means may control a plurality of second operable objects to continuously perform an action of simultaneously moving in the moving direction determined by the moving direction determination means.

The second display control means may comprise trajectory display control means (S209 to S211) for displaying, in the second game image, the corresponding trajectory calculated by the corresponding trajectory calculation means. Furthermore, the game apparatus may further comprise movable trajectory setting means (S91, S96). When a touch operation is performed on the touch panel so as to touch on the corresponding trajectory displayed in the second game image, the movable trajectory setting means sets the corresponding trajectory as a movable trajectory. In this case, the corresponding trajectory calculation means comprises corresponding trajectory calculation means (S73) for calculating a new corresponding trajectory by moving the movable trajectory set by the movable trajectory selection means within the game space in accordance with a touch operation performed on the touch panel. The moving direction determination means extemporaneously determines a moving direction for the second operable object in the game space in accordance with the new corresponding trajectory calculated by the corresponding trajectory calculation means.

The game apparatus may further comprise corresponding coordinates calculation means (S331). In response to input coordinates obtained from the touch operation performed on the touch panel, the corresponding coordinates calculation means calculates corresponding coordinates in the game space so as to correspond to the input coordinates. In this case, the continuous action control means controls the second operable object to move toward the corresponding coordinates calculated by the corresponding coordinates calculation means.

The game apparatus may further comprise automatic action control means (e.g. automatic action control programmed logic circuitry) (S159) and control selection means (e.g. control selection programmed logic circuitry) (S151 to S154, S156). The automatic action control means automatically controls the action of the operable object according to predetermined rules. The control selection means ensures that the second operable object is controlled to act by the automatic action control means while no touch operation is performed on the touch panel and that the second operable object is controlled to act by the second action control means if a touch operation is performed on the touch panel.

The game space may comprise a plurality of operable objects. In this case, the game apparatus further comprises first operable object selection means (S12) and second operable object selection means (S82). The first operable object selection means selects one of the plurality of operable objects as a first operable object. The second operable object selection means selects at least one of the plurality of operable objects, excluding the first operable object, as a second operable object. The first action control means controls an action of the first operable object. The second action control means controls an action of the second operable object. For example, the first operable object is controlled to act by the first action control means in accordance with an operation performed on the input section, and is not controlled to act by the second action control means in accordance with an operation performed on the touch panel.

The game apparatus may further comprise corresponding coordinates calculation means (S77). In response to input coordinates obtained from the touch operation performed on the touch panel, the corresponding coordinates calculation means calculates corresponding coordinates in the game space so as to correspond to the input coordinates. In this case, the second display control means displays an enlarged version of the second game image on the second display section, the enlarged version being enlarged around a central point represented by the corresponding coordinates calculated by the corresponding coordinates calculation means.

A game program stored in a storage medium according to presently preferred exemplary illustrative non-limiting implementations is to be executed by a computer in a game apparatus. The storage medium may include:
  a first display section and a second display section each for displaying a game image representing an operable object in a game space, the operable object being controllable in response to an operation performed by a player;
  a touch panel provided on a surface of the second display section;
  an input section which does not comprise a touch panel; and
  a storage section.

The game program stored in the storage medium causes the computer to function as first action control means and first display control means. The first action control means controls an action of an operable object in accordance with an operation performed on the input section. The first display control means displays on the first display section a first game image representing at least a portion of the game space. The game program stored in the storage medium causes the computer to function further as second action control means and second display control means. The second action control means controls an action of an operable object in accordance with a touch operation performed on the touch panel. The second display control means displays on the second display section a second game image representing at least a portion of the game space, the second game image being different from the first game image.

The game program may cause the computer to function further as game parameter storing means and first changing means. The game parameter storing means stores a game parameter pertaining to the game space to the storage section. The first changing means changes the game parameter stored in the storage section in accordance with action of the operable object controlled by the first action control means. The second changing means changes the game parameter stored in the storage section in accordance with action of the operable object controlled by the second action control means. The first display control means displays on the first display section the first game image representing at least a portion of the game space and being generated based on the game parameter. The second display control means displays on the second display section the second game image representing at least a portion of the game space and being generated based on the game parameter.

In one example, the second game image displayed on the second display section is an image selected from the group consisting of: a game image which is a 2D expression of the game space as plan-viewed from above; an image representing a portion of the game space broader than and encompassing the first game image displayed on the first display section; and an image representing the entire game space. In another example, the first game image displayed on the first display section is an image at least containing an image representing the operable object whose action is controlled by the first action control means, and the second game image displayed on the second display section is an image at least containing an image representing the operable object whose action is controlled by the second action control means.

The game space may comprise a plurality of operable objects. In this case, the game program stored in the storage medium causes the computer to function further as first operable object selection means and second operable object selection means. The first operable object selection means selects at least one of the plurality of operable objects as a first operable object, the selection being made automatically or by the player. The second operable object selection means selects at least one of the plurality of operable objects as a second operable object, the selection being made in accordance with coordinates obtained from the touch operation. The first action control means controls an action of the first operable object. The second action control means controls an action of the second operable object.

The second action control means may comprise continuous action control means. After the touch operation is performed on the touch panel, continuous action control means controls the second operable object to continuously perform an action which is in accordance with the touch operation. The game program may cause the computer to function further as control selection means. If the second operable object which is acting under the control of the continuous action control means is selected as the first operable object by the first operable object selection means during the action thereof, the control selection means ensures that the first operable object is controlled to act by the continuous action control means while no operation is performed on the input section and that the first operable object is controlled to act by the first action control means if an operation is performed on the input section.

The game program may cause the computer to function further as corresponding trajectory calculation means and moving direction determination means. In response to an input trajectory obtained from the touch operation performed on the touch panel, the corresponding trajectory calculation means calculates a corresponding trajectory in the game space so as to correspond to the input trajectory. The moving direction determination means determines a moving direction for the second operable object in the game space in accordance with the corresponding trajectory calculated by the corresponding trajectory calculation means. The continuous action control means controls the second operable object to continuously perform an action of moving in the moving direction determined by the moving direction determination means. In this case, the continuous action control means may control a plurality of second operable objects to continuously perform an action of simultaneously moving in the moving direction determined by the moving direction determination means.

The second display control means may comprise trajectory display control means for displaying, in the second game image, the corresponding trajectory calculated by the corresponding trajectory calculation means. The game program may cause the computer to function further as movable trajectory setting means. When a touch operation is performed on the touch panel so as to touch on the corresponding trajectory displayed in the second game image, the movable trajectory setting means sets the corresponding trajectory as a movable trajectory. In this case, the corresponding trajectory calculation means comprises corresponding trajectory calculation means for calculating a new corresponding trajectory by moving the movable trajectory set by the movable trajectory selection means within the game space in accordance with a touch operation performed on the touch panel. The moving direction determination means extemporaneously determines a moving direction for the second operable object in the game space in accordance with the new corresponding trajectory calculated by the corresponding trajectory calculation means.

The game program may cause the computer to function further as corresponding coordinates calculation means. In response to input coordinates obtained from the touch operation performed on the touch panel, the corresponding coordinates calculation means calculates corresponding coordinates in the game space so as to correspond to the input coordinates. In this case, the continuous action control means controls the second operable object to move toward the corresponding coordinates calculated by the corresponding coordinates calculation means.

The game program may cause the computer to function further as automatic action control means and control selection means. The automatic action control means automatically controls the action of the operable object according to predetermined rules. The control selection means ensures that the second operable object is controlled to act by the automatic action control means while no touch operation is performed on the touch panel and that the second operable object is controlled to act by the second action control means if a touch operation is performed on the touch panel.

The game space may comprise a plurality of operable objects. In this case, the game program causes the computer to function further as first operable object selection means and second operable object selection means. The first operable object selection means selects one of the plurality of operable objects as a first operable object. The second operable object selection means selects at least one of the plurality of operable objects, excluding the first operable object, as a second operable object. The first action control means controls an action of the first operable object. The second action control means controls an action of the second operable object. For example, the first operable object is controlled to act by the first action control means in accordance with an operation performed on the input section, and is not controlled to act by the second action control means in accordance with an operation performed on the touch panel.

The game program may cause the computer to function further as corresponding coordinates calculation means. In response to input coordinates obtained from the touch operation performed on the touch panel, the corresponding coordinates calculation means calculates corresponding coordinates in the game space so as to correspond to the input coordinates. In this case, the second display control means displays an enlarged version of the second game image on the second display section, the enlarged version being enlarged around a central point represented by the corresponding coordinates calculated by the corresponding coordinates calculation means.

In accordance with the game apparatus of presently preferred exemplary illustrative non-limiting implementations, an input section and a touch panel are comprised, and two display sections are comprised. Therefore, by displaying a game image which is suited to an operation by means of the input section on one of the display sections, while displaying a game image which is suited to an operation by means of the touch panel on the other display section, it becomes possible to reconcile input section operations and touch panel operations, such that a game which utilizes the characteristics of both operation means can be provided. Since the first game image and the second game image are different images, such that a plurality of images representing a single game space are simultaneously displayed, the player is required to play the game while watching the game space from a plurality of perspectives, whereby the complexity and fun of the game are enhanced. Since the game space can be simultaneously watched from a plurality of perspectives, a more proper judgment of the situation in the game space can be made, thus making it easier to perform appropriate game operations. Furthermore, since the actions of operable objects are controlled by means of the input section and the touch panel, the operable objects being displayed in game images, the player can experience the fun of exploiting input section operations and touch panel operations, while watching the one image or the other image depending on the situation, to appropriately change the situation in the game space for making favorable advancements of the game. In the second game image, the operable objects are displayed together with the game image so as to enable an intuitive, simple, and rapid operation using the touch panel. Therefore, an operation can be performed in parallel to an input section operation.

In the case where a 2D expression of the second game image representing the game space as plan-viewed from above is provided and the action of an operable object is controlled on the basis of a touch-operated point, an instruction for the action to be made by the operable object can be easily given. This makes for the reconciliation of input section operations and touch panel operations.

In the case where the first operable object which is controllable by means of the input section and the second operable object which is controllable by means of the touch panel are different from each other, it is possible to control an operable object by means of the input section and concurrently control another operable object by means of the touch panel. Thus, the player can concurrently control two or more operable objects, whereby a highly strategic game which involves a variety of operations can be provided. By using two characteristic types of operation means, i.e., the input section and the touch panel, and displaying images which are respectively suitable for them, it becomes possible to allow the operable objects to make various actions and thus advance the game in a strategic manner.

In the case where a continuous action control means is comprised, the second operable object continues to make an action after a touch operation has been performed. As a result, the need to make frequent touch operations is eliminated, and the controlling of the first operable object by means of the input section and the controlling of the second operable object by means of the touch panel can be reconciled, so that the game operation can be prevented from becoming too complex or difficult.

In the case where a control selection means is comprised, priority is given to an operation using the input section even while the second operable object is making a continuous action. Thus, an appropriate controlling of the object can be performed by switching to the more-flexible input section operations.

In the case where a corresponding trajectory calculation means and a moving direction determination means are comprised, the second operable object makes an action in accordance with an input trajectory on the touch panel. Thus, the operation is facilitated, and little time is required for the controlling of a single second operable object. Therefore, even in the presence of a plurality of second operable objects, the player can adequately perform operations for all of the objects. Since the second operable object automatically moves in accordance with the touching trajectory, and moves during a certain period of time after the touch operation is performed, it is possible for the player to control the first operable object or another second operable object while the second operable object is moving to follow the trajectory. Thus, the game operation can be prevented from becoming too complex or difficult.

In the case where the continuous action control means continuously causes a plurality of second operable objects to make an action of simultaneously moving in the moving direction as determined by the moving direction determination means, it becomes possible to collectively control a plurality of second operable objects in accordance with a touching trajectory. As a result, a plurality of second operable objects can be caused to make a collective action, concurrently with the controlling of the first operable object by means of the input section, thereby making it possible to allow the plurality of player objects to make various actions for advancing the game.

In the case where a corresponding trajectory is displayed in the second game image, it becomes clear how the second operable object will move, which facilitates the strategy-making in the game. Once a touching trajectory has been drawn, the trajectory itself can be moved to cause a collective movement of a plurality of second operable objects, thus enabling various movements of a plurality of player objects through simple operations. For example, in a soccer game or the like, a defense line can be easily set for realizing a strategic defense, or an offside trap can be easily plotted.

In the case where a corresponding coordinates calculation means is comprised, the second operable object automatically moves once a destination is designated. As a result, the need to make frequent touch operations is eliminated, and reconciliation with the controlling of the first operable object and reconciliation with the controlling of a plurality of second operable objects can be realized. Thus, the game operation can be prevented from becoming too complex or difficult.

In the case where an automatic action control means and a control selection means are comprised, the second operable object acts automatically, but the player can still alter its acting principles. In other words, the player can give a degree of instructions concerning the action of the second operable object while controlling the first operable object. Thus, the player can advance the game while appropriately controlling the plurality of operable objects.

In the case where the second display control means displays an enlarged version of the second game image, a predetermined area of the game space can be enlarged to facilitate the controlling of the action of the second operable object by means of the touch operation. Since it is possible to designate a position for enlargement through a touch operation, an enlargement can be performed according to the player's need.

In the case where the second operable object is within a predetermined range from the touch-operated coordinates and is the closest one to the touch-operated coordinates, it becomes possible to perform an action control even if the second operable object is not accurately touched upon, as long as its neighborhood is touched. As a result, a fast and easy touch operation can be performed.

In accordance with a game program stored in a storage medium according to presently preferred exemplary illustrative non-limiting implementations, the game program stored in the storage medium can be executed by a computer in the game apparatus, whereby effects similar to those attained by the aforementioned game apparatus can be obtained.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 2 is a block diagram illustrating an internal structure of the game apparatus 1 of FIG. 1;

FIG. 34 is a diagram illustrating the relationship between touch panel coordinates and game field coordinates;

DETAILED DESCRIPTION

Figure 1:
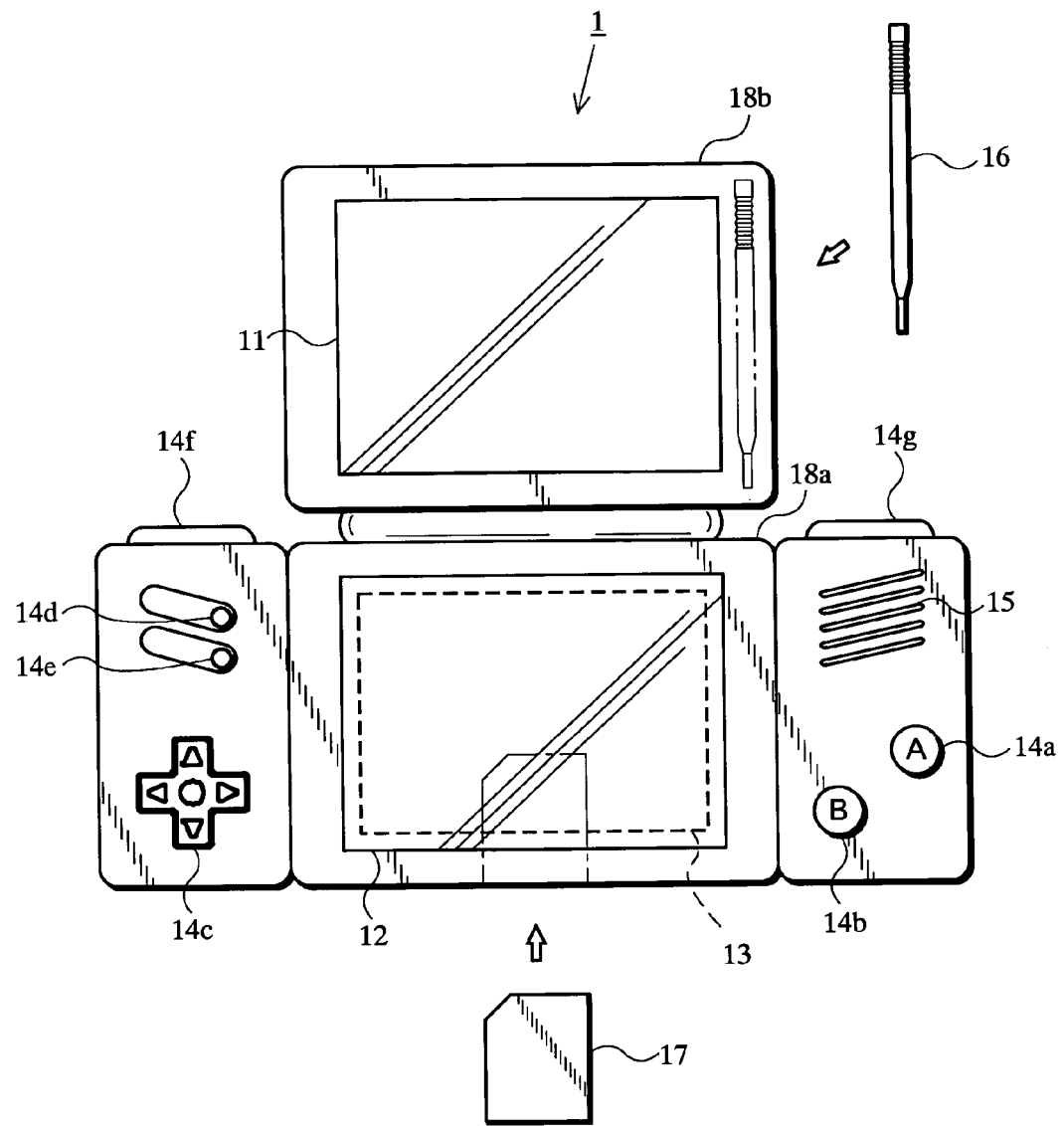
FIG. 1 is a view showing an outer appearance of a game apparatus 1 according to an exemplary non-limiting implementation.

A game apparatus which executes a game program according to the present exemplary non-limiting implementation will be described with reference to the figures. FIG. 1 is a view showing an outer appearance of a game apparatus 1 which executes a game program according to the present exemplary non-limiting implementation. As an example of the game apparatus 1, a hand-held type game apparatus is illustrated herein.

In FIG. 1, the game apparatus 1 of an exemplary non-limiting implementation is accommodated in a housing 18 so that two liquid crystal display devices (hereinafter referred to as "LCDs") 11 and 12 are placed in predetermined positions. Specifically, in the case where the first LCD 11 and the second LCD 12 are to be disposed one on top of the other, the housing 13 is composed of a lower housing 18a and an upper housing 18b, the upper housing 18b being supported by a portion of the upper side of the lower housing 18a so as to be pivotable. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); and a direction switch (cross key) 14c, a start switch 14d, a select switch 14e, and side switches 14f and 14g, which are provided on a principal face of the left wing of the lower housing 18a (lying to the left of the second LCD 12). The operation switches 14a and 14b are used for giving instructions such as: "pass", "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14c is used by a player for providing instructions concerning directions on the game screen, e.g., instructions of a moving direction for (i.e., a direction in which to move) a player object (or a player character) that can be controlled by using the operation switch section 14, or instructions of a moving direction for a cursor, for example. The side switches ("L" button) 14f and ("R" button) 14g are provided at the left and right ends of an upper face (upper side face) of the lower housing 18a. As necessary, more operation switches may be added. The operation switch section 14 as such is a mere example of the input section according to the present exemplary non-limiting implementation.

A touch panel 13 (an area marked by dotted lines in FIG. 1) is mounted on the upper principal face of the second LCD 12. The touch panel 13 may be of any one of a resistive film type, an optical type (infrared type), or a capacitive coupling type. When a stick 16 (or a finger) is pressed against or moved or dragged on the upper principal face of the touch panel 13, the touch panel 13 detects the coordinate position of the stick 16 and outputs coordinate data.

As necessary, a hole (an area marked by double-dot lines in FIG. 1) for accommodating the stick 16 with which to manipulate the touch panel 13 is provided near a side face of the upper housing 18b. The hole can hold the stick 16. In a portion of a side face of the lower housing 18a is provided a cartridge receptacle (an area marked by dash-dot lines in FIG. 1), into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Next, referring to FIG. 2, the internal structure of the game apparatus 1 will be described. FIG. 2 is a block diagram illustrating an internal structure of the game apparatus 1 of FIG. 1.

In FIG. 2, a CPU core 21 is mounted on the electronic circuit board accommodated in the housing 18. Via a predetermined bus, the CPU core 21 is connected to a connector 28 for enabling connection with the cartridge 17, an input/output interface (I/F) circuit 27, a first graphics processing unit (first GPU) 24, a second graphics processing unit (second GPU) 26, and a working RAM(WRAM) 22.

The cartridge 17 is detachably connected to the connector 28. As described above, the cartridge 17 is a storage medium for storing a game program. Specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22.

Thus, the ROM 171 has recorded therein a game program which comprises instructions and data which are of a format executable by a computer in the game apparatus 1, in particular by the CPU core 21. The game program is loaded to the WRAM 22 as appropriate, and executed. Although the present arrangement illustrates an example where the game program and the like are recorded on the cartridge 17, the game program and the like may be supplied via any other medium or via a communications circuit.

The operation switch section 14, the touch panel 13, and the loudspeaker 15 are connected to the I/F circuit 27. The loudspeaker 15 is placed inside the aforementioned sound hole.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image on the basis of the data used for image generation which is stored in the WRAM 22, and writes images into the first VRAM 23. In accordance with an instruction from the CPU core 21, the second GPU 26 generates a second game image on the basis of the data used for image generation which is stored in the WRAM 22, and writes images into the second VRAM 25.

The first GPU 24 is connected to the first LCD 11, and the second GPU 26 is connected to the second LCD 12. The first GPU 24 outputs to the first LCD 11 the first game image which has been written into the first VRAM 23 in accordance with an instruction from the CPU core 21, and the first LCD 11 displays the first game image having been output from the first GPU 24. The second GPU 26 outputs to the second LCD 12 the second game image which has been written into the second VRAM 25 in accordance with an instruction from the CPU core 21, and the second LCD 12 displays the second game image having been output from the second GPU 26.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a coordinate system corresponding to the coordinate system of the second VRAM 25, and outputs data of position coordinates corresponding to a position which is input (designated) by means of the stick 16 or the like. For example, the display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Next, prior to specifically describing a game which is executed by the game apparatus in accordance with the game program according to the present exemplary non-limiting implementation, the outline of the exemplary non-limiting implementation which is embodied by the game apparatus 1 executing the game program will be described, in order to facilitate the understanding of the present exemplary non-limiting implementation.

Firstly, according to the present exemplary non-limiting implementation, a first game image which is to be manipulated by means of the operation switch section 14 is displayed on the first LCD 11, and a second game image which is to be manipulated by means of the touch panel 13 is displayed on the second LCD 12. Specifically, the first game image and the second game image are generated so as to express an identical game space, which is created by executing the game program, from different perspectives (e.g., viewpoints). It is ensured that a game image which is suitable for manipulation using the operation switch section 14 is generated as the first game image, and that a game image which is suitable for manipulation using the touch panel 13 is generated as the second game image. In other words, the first LCD 11 displays a first game which is suitable for manipulation using the image operation switch section 14, whereas the second LCD 12 displays a second game image which expresses the same space as the game space represented by the first game image and which is suitable for manipulation using the touch panel 13. For example, a game image which allows coordinate inputs to the game space to be directly made by means of the touch panel 13 is displayed as the second game image. The touch panel 13 is a device which has a coordinate system and which is suitable for outputting data of position coordinates corresponding to an input position. For example, by ensuring that the position coordinates which can be designated on the touch panel 13 correspond to the position coordinates in the game space, an operational environment can be provided in which the player can directly designate a position in the game space.

Moreover, in the present exemplary non-limiting implementation, an operable object(s) which can be controlled by the player appears in the game space. A typical example of an operable object is a player object which can be controlled by the player and which performs the role of a main character in the game. The operable objects may be always controllable by the player. Alternatively, there may be player objects which are sometimes controllable by the player but at other times uncontrollable by the player. Examples of operable objects are: a plurality of athlete objects belonging to one team; sub-objects which become controllable by the player under predetermined conditions; cursor objects for indicating a position in the game space; and item objects which perform simple actions in accordance with the player's operation. The operable objects are controllable by means of the operation switch section 14 and/or the touch panel 13. Specifically, the two types of operation means may be arranged so as to control different operable objects, or arranged so as to control the same operable object(s). Such arrangements can be selected at an appropriate time in accordance with the characteristics of the game to be executed. As the player operates the operation switch section 14 or the touch panel 13, an operable object(s) which is currently controllable performs an action, whereby the parameters of the operable object may be changed, and the parameters of non-operable objects or other parameters pertaining to the game space may be changed concordantly. Hereinafter, the present exemplary non-limiting implementation will be more specifically described with reference to FIG. 3 and the subsequent figures.

(Exemplary Non-Limiting Implementation)

Figure 16:
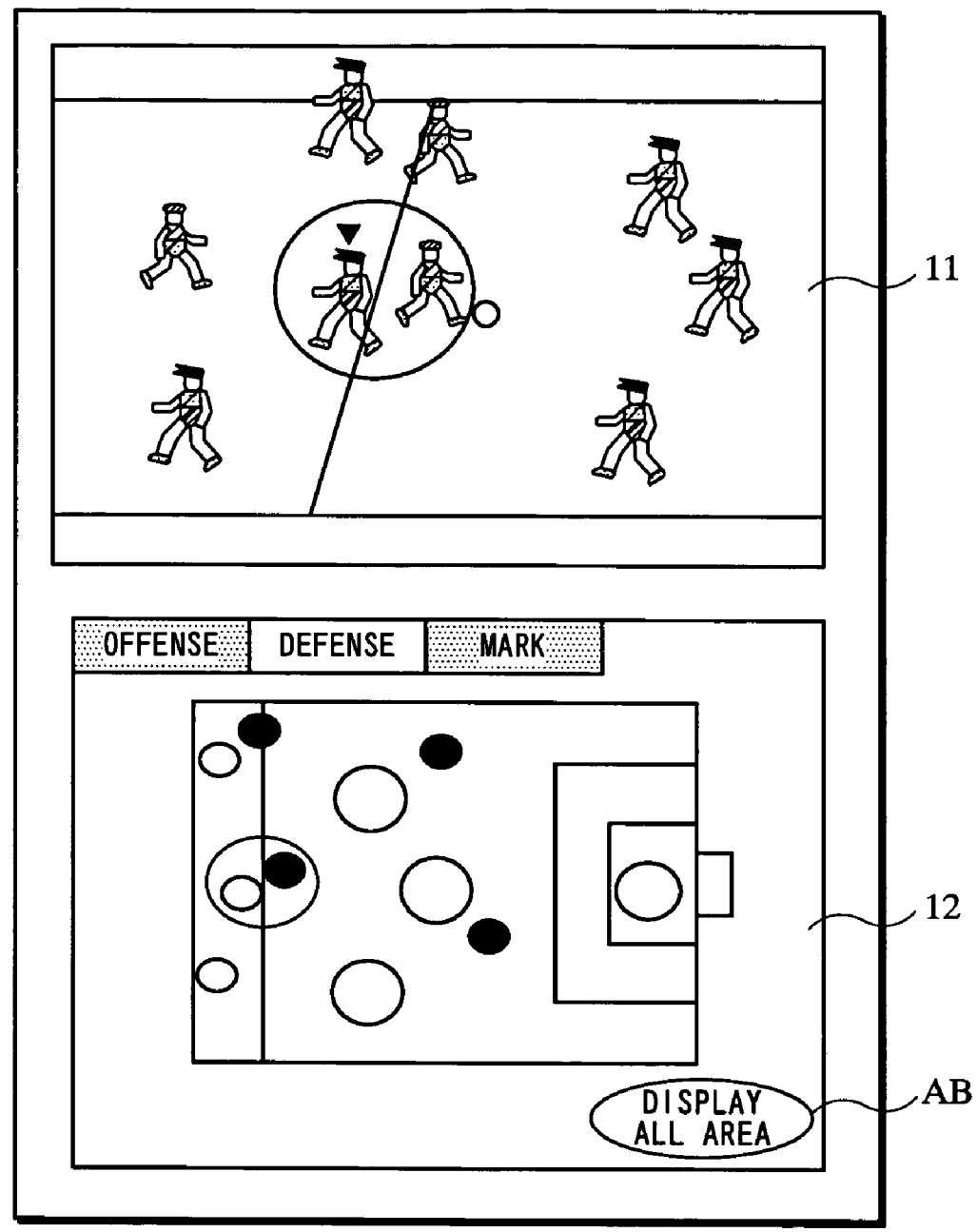
FIG. 16 is a diagram illustrating an exemplary first game image and an exemplary enlarged second game image.
Figure 17:
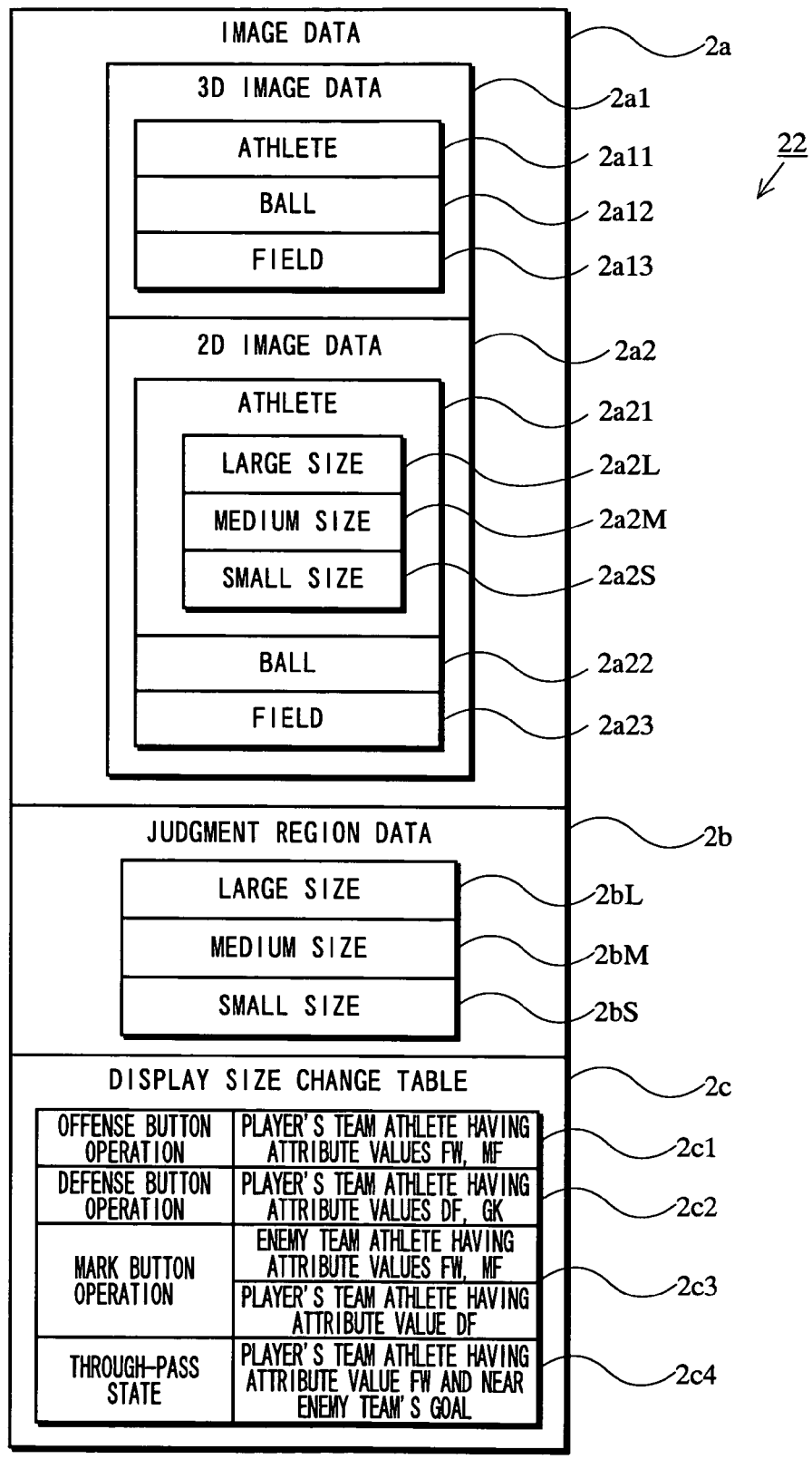
FIG. 17 is a RAM image diagram of a WRAM 22 according to an exemplary non-limiting implementation.
Figure 18:
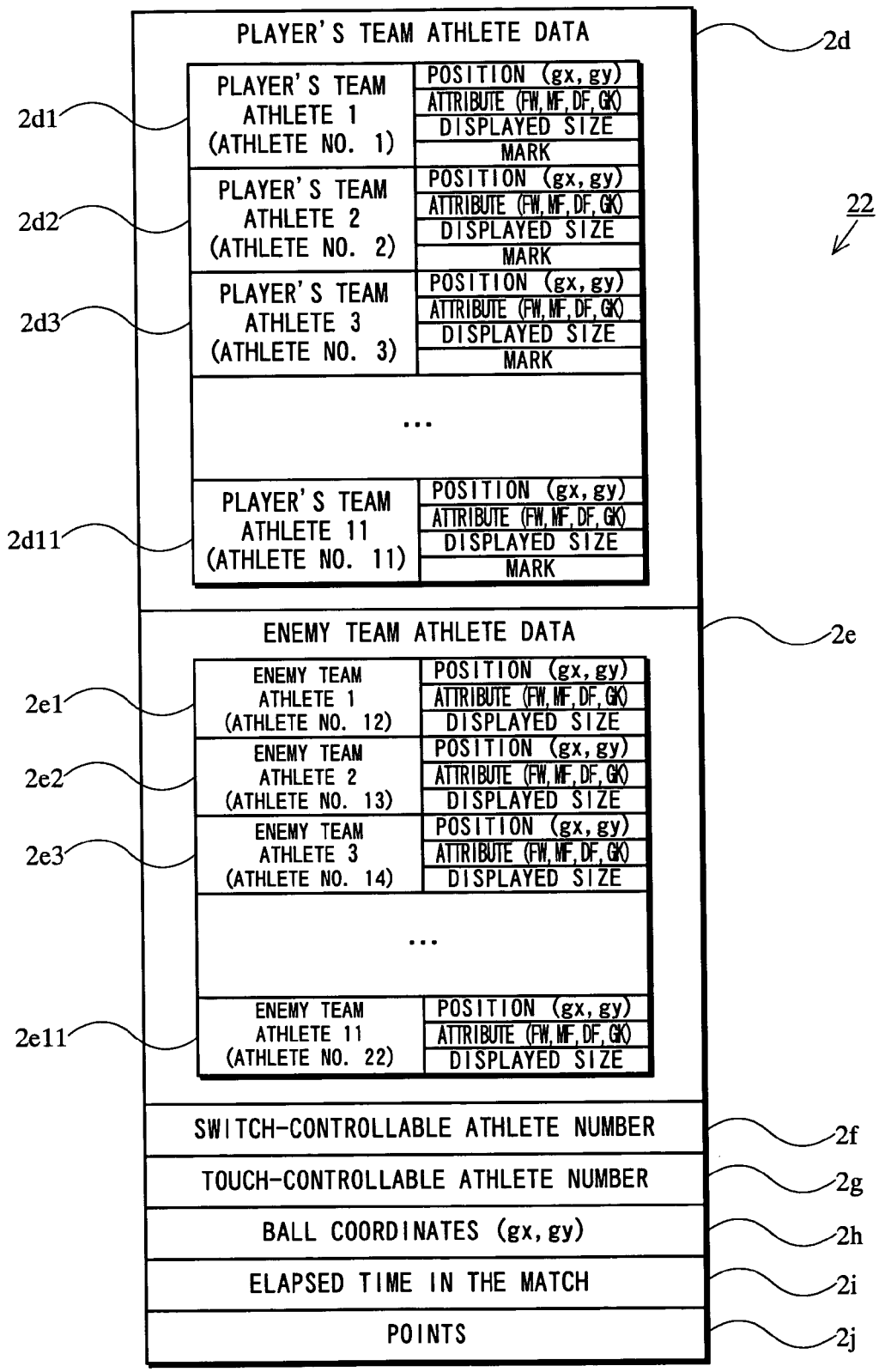
FIG. 18 is a RAM image diagram of the WRAM 22 according to an exemplary non-limiting implementation.
Figure 19:
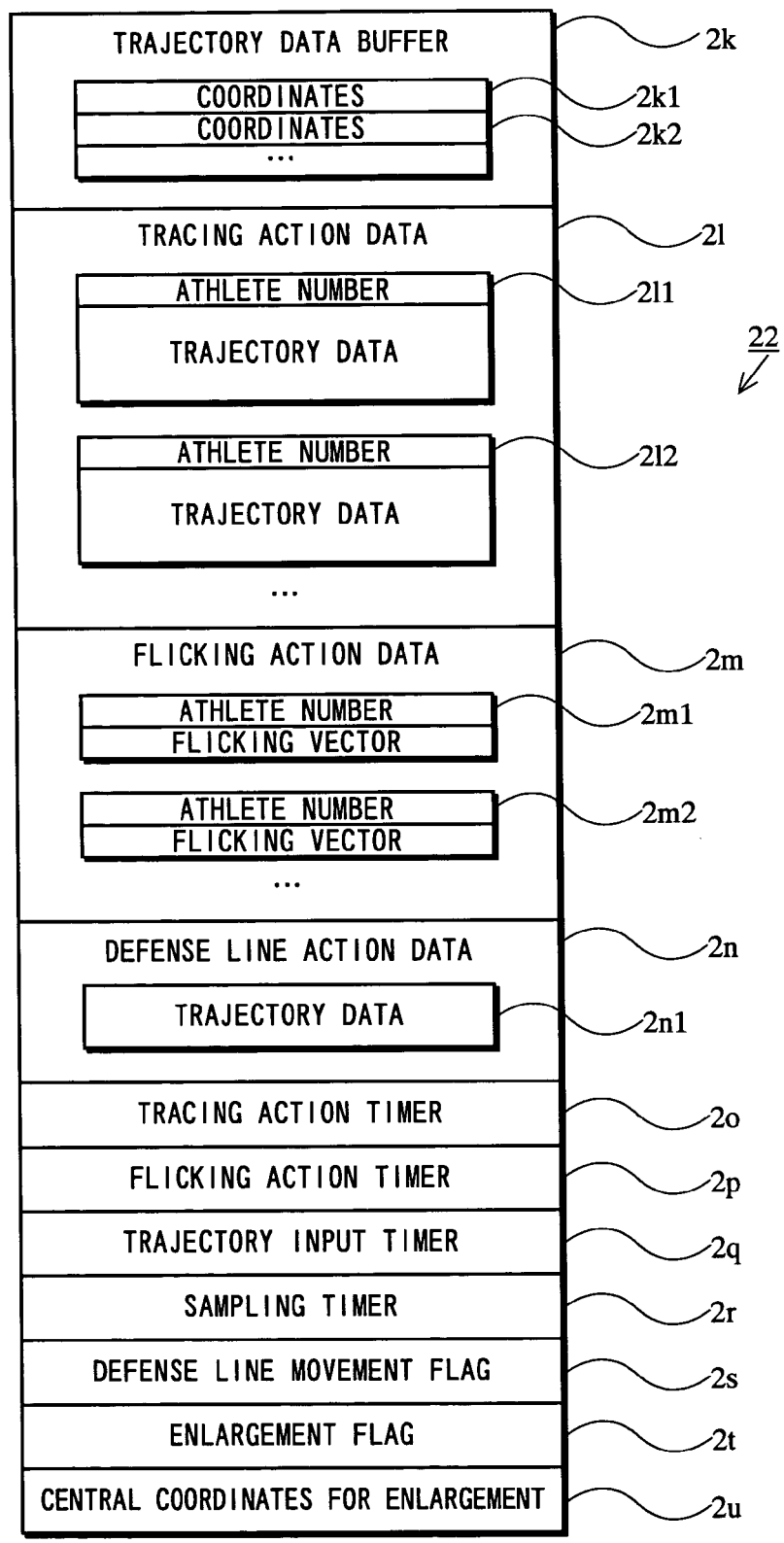
FIG. 19 is a RAM image diagram of the WRAM 22 according to an exemplary non-limiting implementation.

Hereinafter, a game apparatus which executes a game program according to a first embodiment of the present exemplary non-limiting implementation will be described with reference to FIGS. 3 to 34. A game which is provided by a game program according to the first embodiment is a soccer game in which a plurality of player objects that are controllable by the player appear in a game space. FIGS. 3 to 16 are diagrams illustrating exemplary game images to be displayed on the first LCD 11 and the second LCD 12. FIGS. 17 to 19 are diagrams for explaining RAM images of the WRAM 22. FIGS. 20 to 33 are flowcharts which are to be executed by the game apparatus 1 in accordance with the game program. FIG. 34 is a diagram for explaining coordinate data to be used in the game program.

Figure 3:
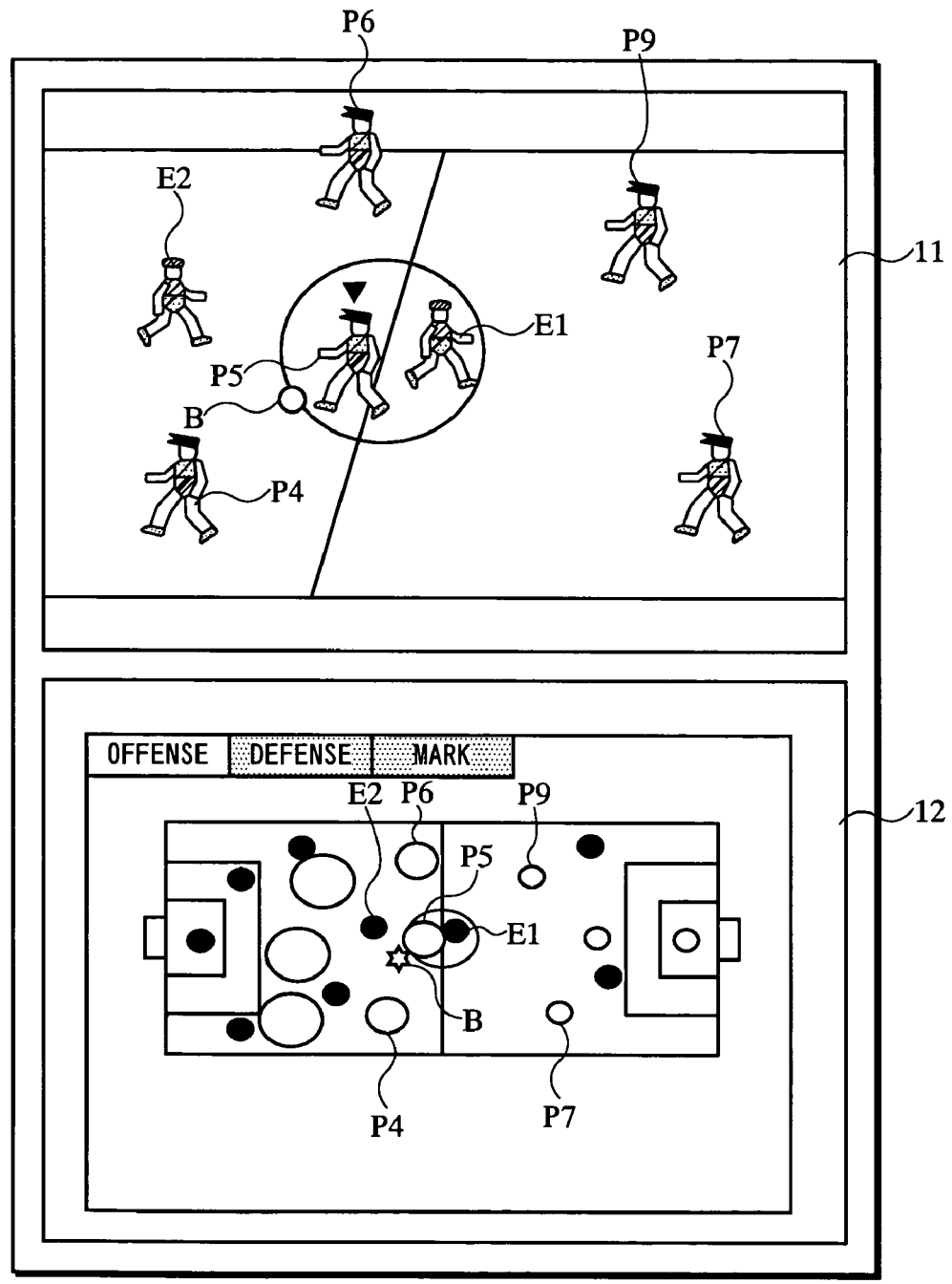
FIG. 3 is a diagram showing an example of a first game image and an example of a second game image to be displayed on a first LCD 11 and a second LCD 12, respectively, according to an exemplary non-limiting implementation.

FIG. 3 shows an example of a first game image to be displayed on the first LCD 11 and an example of a second game image to be displayed on the second LCD 12. The first game image is a 3D expression of a part of a game field (soccer field) which is provided in the game space. The second game image is a 2D image expression of the same game space as plan-viewed from above. In other words, the first game image and the second game image are images representing the same game space, such that each object acts similarly in both images. In the second game image, a 2D image of the entire game field is presented, on which a simplified version of each object is shown so as to correspond to its position in the game field. In other words, the second game image is a radar representation of the entire soccer field and all objects thereon. Thus, the present exemplary non-limiting implementation illustrates an example where the first game image is presented as a 3D expression and the second game image is presented as a 2D expression of the entire game field in the game space. Alternatively, both game images may be 2D expressions, or both game images may be 3D expressions.

FIG. 3 shows a state in which the player's team is on the offensive. In the first game image, a predetermined range of game space, substantially centered around an athlete object which is keeping the ball, is being displayed. Specifically, in the first game image of FIG. 3, player objects P4 to P7 and P9, which constitute part of the athlete objects composing the player's team, and enemy objects E1 and E2, which constitute part of the athlete objects composing an enemy team, are shown. In the first game image, a ball object B representing a soccer ball is also displayed. A plurality of athlete objects composing the player's team are the player objects that are controllable by the player. Specifically, one of the plurality of athlete objects composing the player's team is controllable by means of the operation switch section 14, and all of the athlete objects composing the player's team are controllable by means of the touch panel 13.

While on the offense, the player object which is keeping the ball object B is automatically selected as a switch-controllable athlete. As used herein, a "switch-controllable athlete" is a player object which is controllable by the player by using the operation switch section 14, e.g., the operation switches 14a and 14b or the direction switch 14c. In FIG. 3, the player object P5 is set as a switch-controllable athlete, and is being displayed with a mark (e.g., a solid triangle) so as to be distinguishable from the other objects. On the other hand, while the player is on the defense, the player object which is closest to the ball object B is set as the aforementioned switch-controllable athlete. The first game image is a 3D expression of a game space which at least contains the player object that is set as the switch-controllable athlete.

The second game image is a radar representation, as plan-viewed from above, of the entire soccer field (game field) which is set in the game space. The second game image shows all of the athlete objects composing the player's team, each being symbolized as a blank circle or the like. In the second game image, each of the player objects P4 to P7 and P9 which are shown in the first game image is symbolized at the same position on the game field as in the first game image. The second game image shows all of the plurality of athlete objects composing the enemy team, each being symbolized as a solid circle or the like. In the second game image, each of the athlete objects E1 and E2 shown in the first game image is symbolized at the same position on the game field as in the first game image. The second game image also shows the ball object B representing a soccer ball, which is symbolized by a star, for example.

Figure 4:
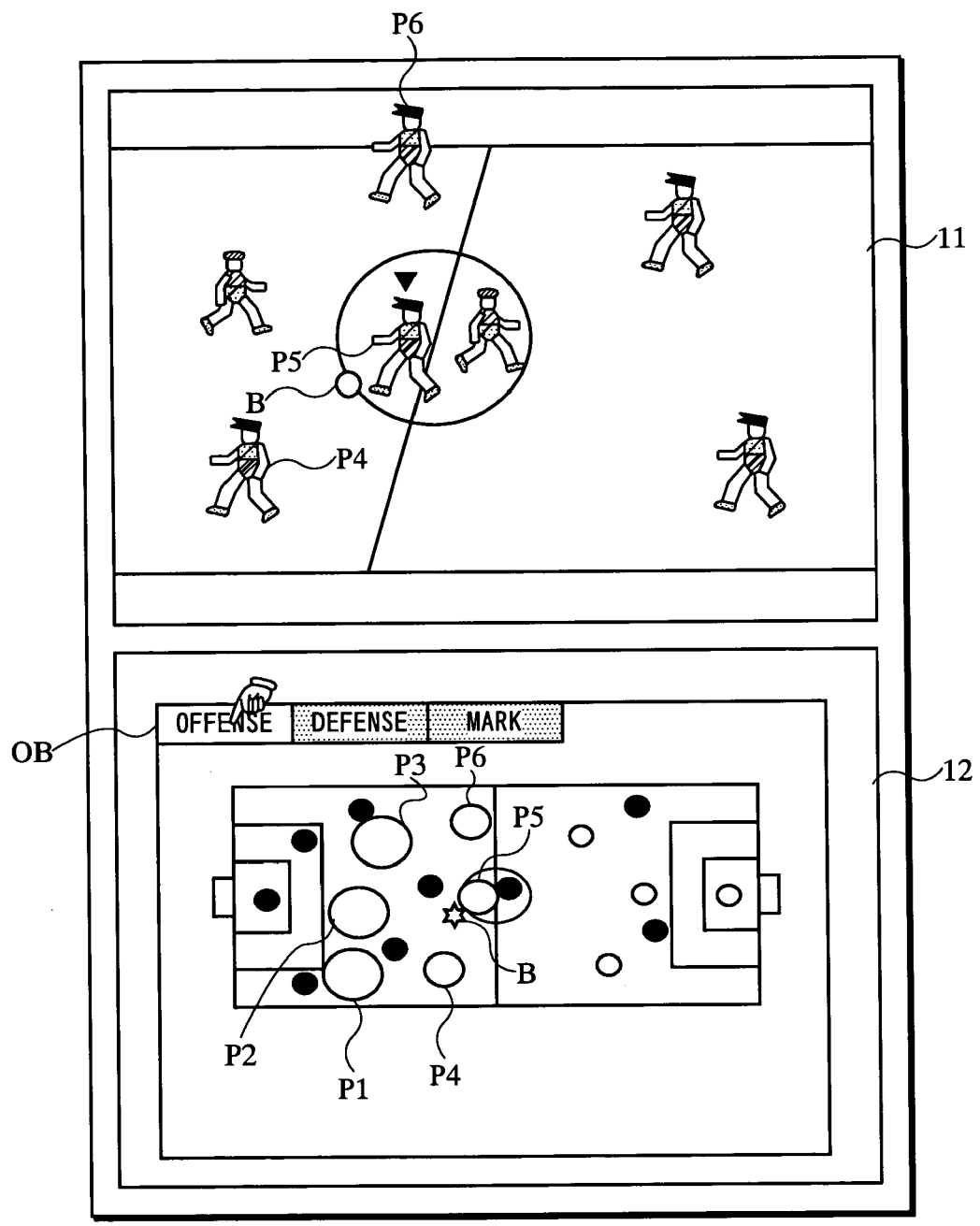
FIG. 4 is a diagram illustrating an exemplary first game image and an exemplary second game image to be displayed in the case where an offense button OB is touch-operated.

In FIG. 4, in an upper left region of the second game image, an offense button OB is displayed. If the player touch-operates the touch panel 13 so as to touch on the offense button OB, the symbolized representation of any "offense athlete" among the plurality of athlete objects composing the player's team becomes relatively large. In FIG. 4, a mark representing a hand is shown at the position of the offense button OB, which is a schematic representation of the player's hand performing the touch operation (the same is also true in FIG. 5 and any subsequent figure). The player objects and enemy objects in the soccer game are classified by attribute values as follows: forward (hereinafter also referred to as "FW"), midfielder (hereinafter also referred to as "MF"), defender (hereinafter also referred to as "DF"), and goalkeeper (hereinafter also referred to as "GK"). For example, the aforementioned "offense athletes" correspond to the player objects of the attribute values FW and MF. In FIG. 4, the player objects P1 to P3 (attribute value FW) and the player objects P4 to P6 (attribute value MF) are symbolized so as to appear relatively large as compared to the other player objects (attribute values DF and GK).

If the player touch-operates the offense button OB, the symbolized representation of any player object which is capable of receiving a through-pass becomes even larger. For example, "player objects which are capable of receiving a through-pass" are player objects of the attribute value FW which are deployed near a penalty area of the enemy team in a state where a player object of the attribute value MF is keeping the ball object B. In FIG. 4, since the player object P5 of the attribute value MF is keeping the ball object B, the symbolized representations of the player objects P1 to P3 of the attribute value FW are made larger than the other player objects, thus being indicated as player objects which are capable of receiving a through-pass.

The above illustrates an example in which the symbolized representations of the player objects in the second game image are changed in size when the player has touch-operated the offense button OB. Alternatively, an automatic size change may be made in accordance with the position at which each player object is located. For example, while a given player object is keeping the ball on the enemy side of the field, the symbolized representations of the player objects corresponding to offense athletes may automatically be made relatively large. Moreover, the symbolized representations of the player objects corresponding to offense athletes may automatically be made relatively large also while a given enemy object is keeping the ball on its own side of the field (i.e., the enemy side from the standpoint of the player).

Figure 5:
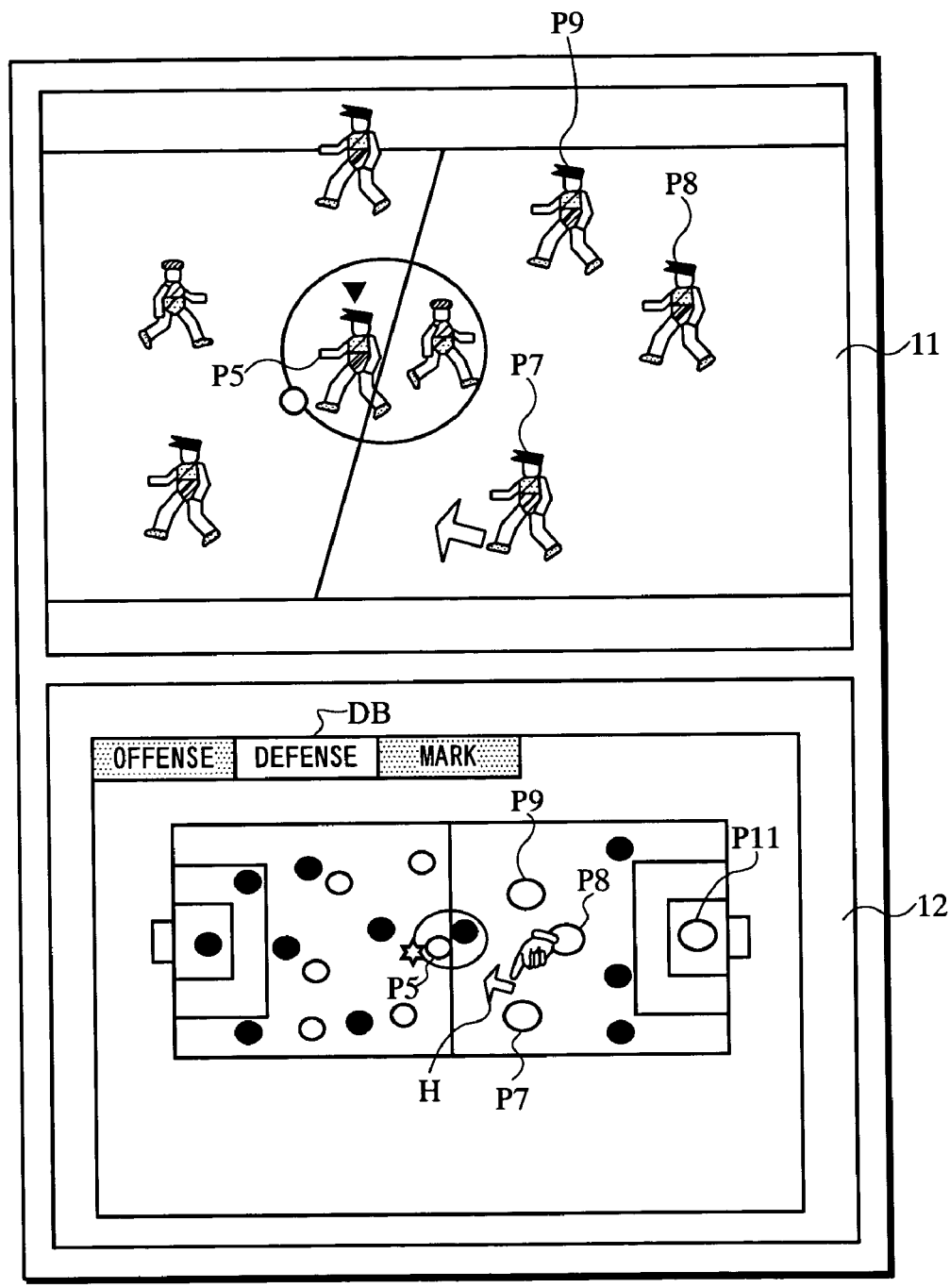
FIG. 5 is a diagram illustrating an exemplary first game image and an exemplary second game image to be displayed in the case where a defense button DB is touch-operated, in which a flicking action is shown.

In FIG. 5, in the upper left region of the second game image, a defense button DB is also displayed. If the player touch-operates the touch panel 13 so as to touch on the defense button DB, the symbolized representation of any "defense athlete" among the plurality of player objects composing the player's team becomes relatively large. For example, the aforementioned "defense athletes" correspond to the player objects of the attribute values DF and GK. In FIG. 5, the player objects P7 to P9 (attribute value FW) and P11 (attribute value GK) are symbolized so as to appear relatively large as compared to the other player objects (attribute values FW and MF). Thus, by increasing the displayed size of those player objects which are likely to be touch-operated given the game situation, the operation of the player objects using the touch panel 13 is facilitated.

By using the touch panel 13, the player can select a player object from among the plurality of player objects shown in the second game image, and control the player object. A first example of an action to be made by a player object in response to an operation using the touch panel 13 is a flicking action. For example, suppose that the player has performed a touch operation in a manner of flicking the touch panel 13, in a direction from the root of arrow H to the tip of arrow H. In this case, one of the player objects (referred to as a "touch-controllable athlete") is selected in accordance with the start point of the touch operation (referred to as the "touch operation start point"), and this player object moves linearly in the direction of arrow H for a predetermined period of time (flicking action). As used herein, a "touch-controllable athlete" is an athlete object which, when a certain touch operation is performed, moves in accordance with the touch operation. Hereinafter, with reference to FIG. 6, the touch-controllable athlete to be selected in accordance with the touch operation start point will be described.

Figure 6:
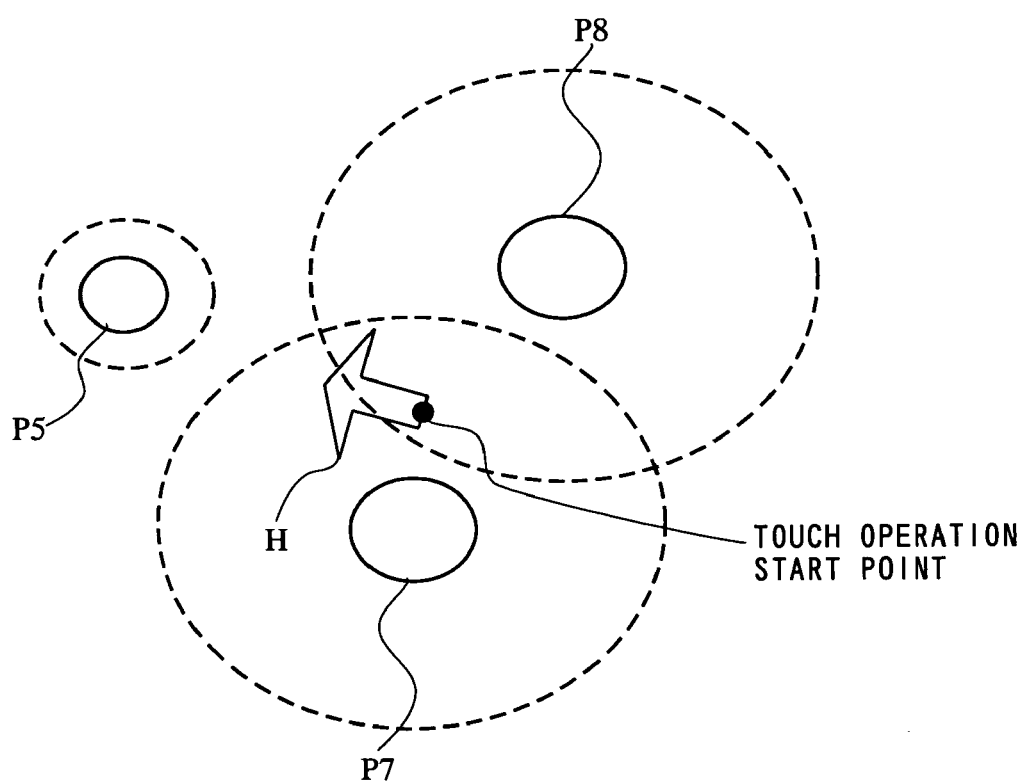
FIG. 6 is a diagram for explaining a touch-controllable athlete that is selected in accordance with a touch operation start point.

FIG. 6 is a schematic enlarged diagram showing a portion of the second game image. In FIG. 6, each player object displayed in the second game image has a judgment region extending around itself. In FIG. 6, judgment regions corresponding to the player objects P5, P7, and P8 are each shown by a broken line. The size of each such judgment region is proportional to the size of the symbolized representation of the player object. Any player object whose judgment region happens to accommodate the touch operation start point is a candidate for a touch-controllable athlete. For example, if the player has performed a touch operation in a manner of flicking the touch panel 13 in the direction of arrow H, the player objects P7 and P8 become touch-controllable athlete candidates. Out of these candidates, the player object whose symbolized representation's outer periphery lies closest to the touch operation start point is selected as a touch-controllable athlete. For example, in the case of FIG. 6, the player object P7 is selected as the touch-controllable athlete.

As described above, in the present exemplary non-limiting implementation, among the player objects whose judgment regions accommodate a touch operation start point, the player object whose symbolized representation's outer periphery lies closest to the touch operation start point is selected as a touch-controllable athlete. In another example, among the player objects whose judgment regions accommodate the touch operation start point, the player object whose symbolized representation's center (or whose judgment region's center) lies closest to the touch operation start point may be selected as a touch-controllable athlete. In still another example, among the player objects whose judgment regions accommodate the touch operation start point, the player object which minimizes the value of the ratio "distance between the touch operation start point and the center of the judgment region/radius of the judgment region" may be selected.

Referring back to FIG. 5, the player object P7 which is selected as the touch-controllable athlete makes a flicking action, and moves linearly in the direction of arrow H on the second game image for the duration of a predetermined period of time. Simultaneously on the first game image, the player object P7 also moves linearly in the direction of the arrow shown, for the duration of the predetermined period of time. Even before the lapse of the predetermined period of time, the linear movement may be ceased when a predetermined condition is satisfied (e.g., when going beyond a touch line). In the present exemplary non-limiting implementation, a "certain period of time" is a notion which not only refers to a predetermined period of time, but also encompasses a period which may vary depending on predetermined conditions.

Figure 7:
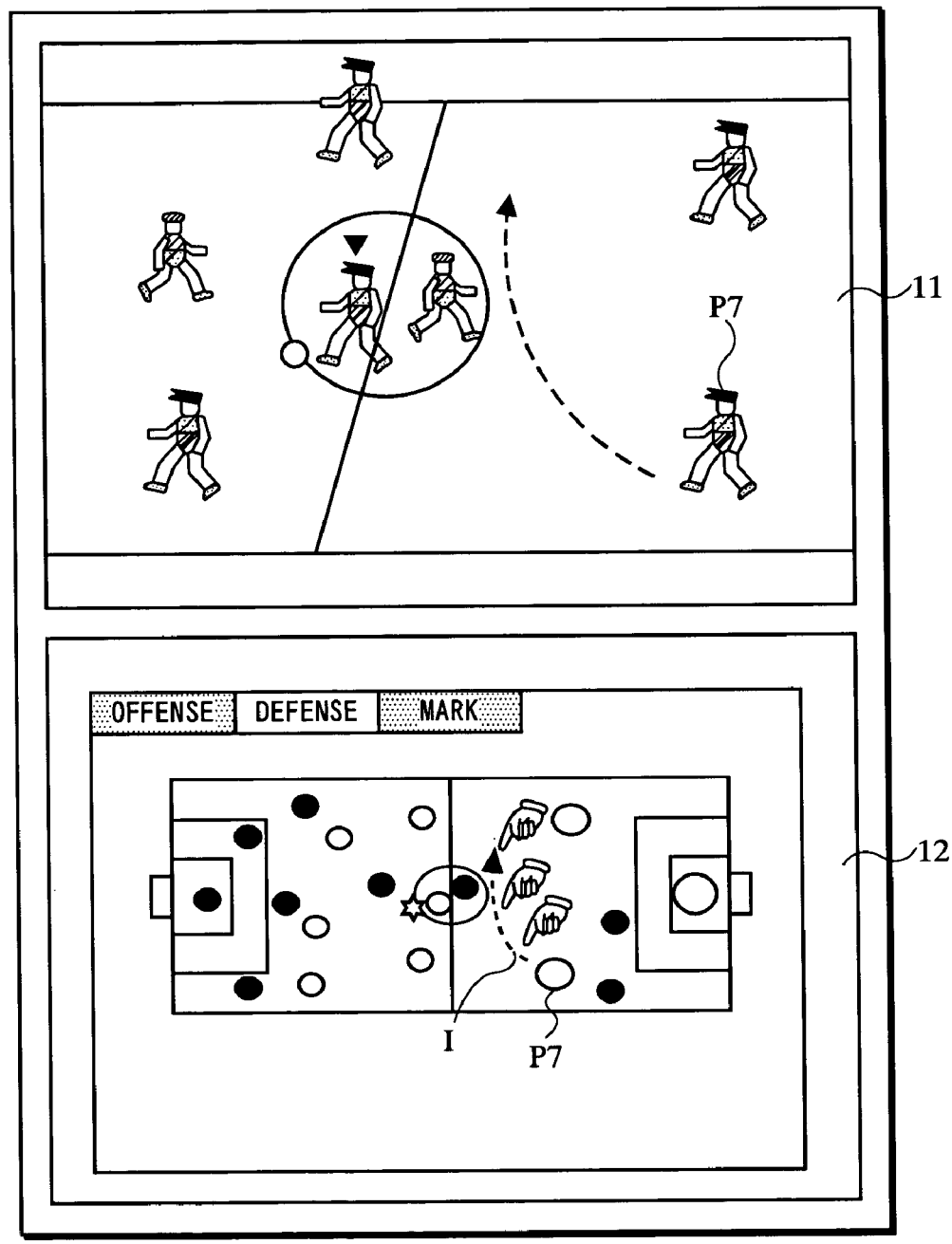
FIG. 7 is a diagram illustrating an exemplary first game image and an exemplary second game image in which a tracing action is shown.

A second example of an action to be made by a player object in response to an operation using the touch panel 13 is a tracing action. Suppose that, as shown in FIG. 7, the player has performed a touch operation on the touch panel 13 so as to draw a trajectory (as indicated by a broken line) in the direction of arrow I. In this case, in a similar manner to the above, the player object P7 is selected as a touch-controllable athlete in accordance with the touch operation start point. Then, the trajectory of the touch operation is displayed on the second game image, and the player object P7 moves along the displayed trajectory (tracing action). Simultaneously on the first game image, the player object P7 moves along a trajectory in the direction of the arrow shown. Note that among the two arrows shown in FIG. 7, the arrow on the second game image is actually displayed but the arrow on the first game image is only illustrative and not actually displayed on the game screen. Alternatively, the arrow on the first game image may also be displayed.

Figure 8:
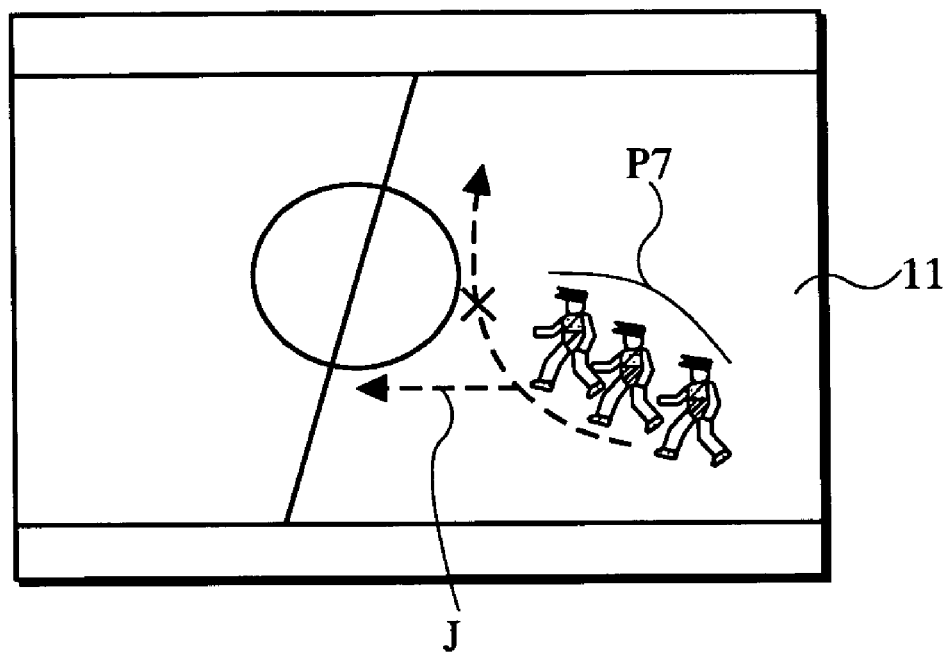
FIG. 8 is a diagram for explaining an exemplary action of a player object P7 which is set to be a switch-controllable athlete during a movement of a tracing action.

Note that a player object which is moving in a flicking action or tracing action as described above may be set as a switch-controllable athlete during the movement (for example, if the ball comes near a player object undergoing a flicking action, the player object undergoing the flicking action will be set as a switch-controllable athlete). In this case, unless a further instruction for movement is given from the player by means of the operation switch section 14, the flicking action or tracing action is continued. On the other hand, if a further instruction for movement is given by operating the operation switch section 14 during the movement, the player object gives priority to the instruction for movement given by means of the operation switch section 14. For example, as shown in FIG. 8, if the player object P7 which is undergoing a movement of a tracing action is set as a switch-controllable athlete and the player presses "left" of the direction switch 14c, the player object P7 will cease the tracing action and move in the direction of arrow J.

Figure 9:
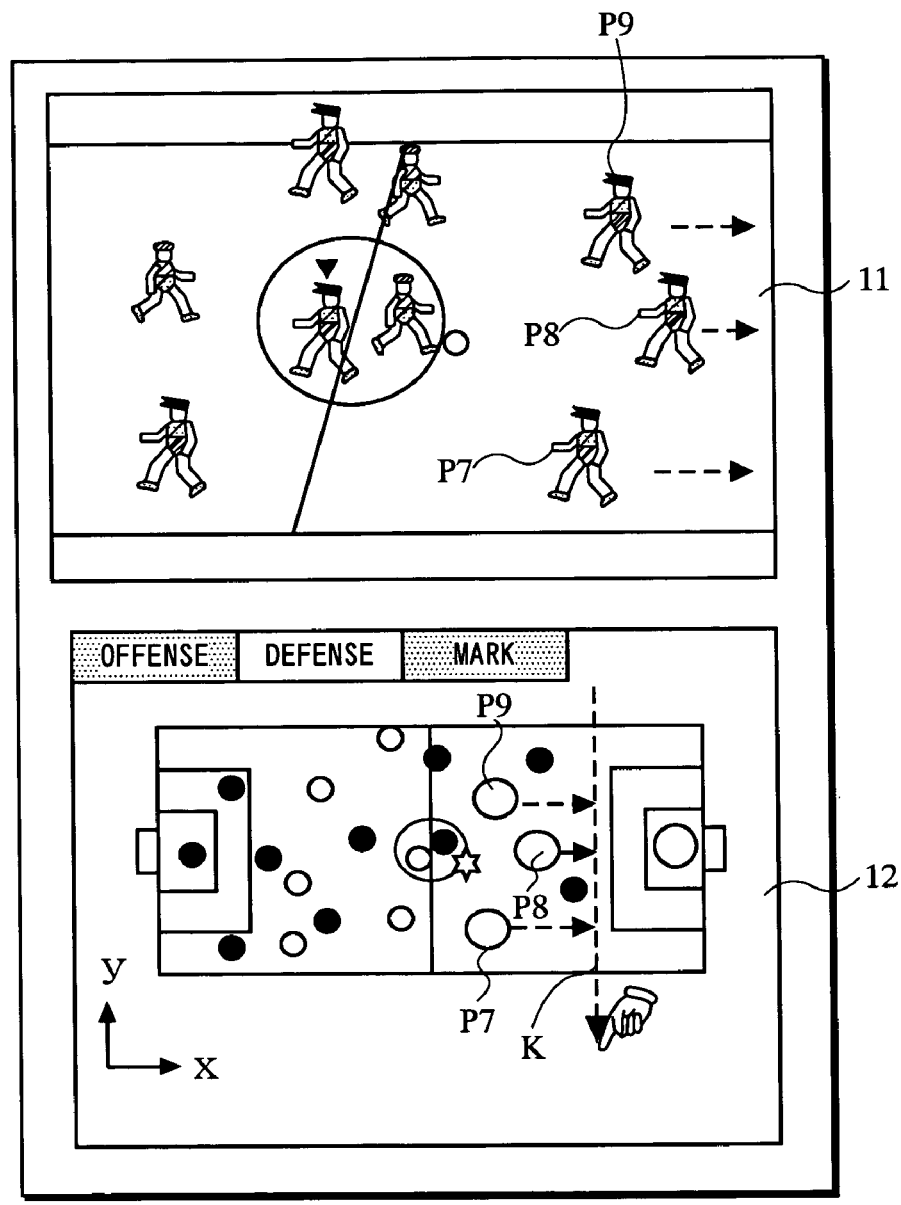
FIG. 9 is a diagram illustrating an exemplary first game image and an exemplary second game image in which a defense line action is shown.

A third example of an action to be made by a player object in response to an operation using the touch panel 13 is a defense line action. As shown in FIG. 9, suppose that the player has performed a touch operation on the touch panel 13 so as to draw a trajectory across the field in the direction of arrow K, as indicated by a dotted line (vertical direction in FIG. 9; hereinafter x-y coordinates will be defined by referring to this direction as the y direction and referring to a direction perpendicular to the y direction as the x direction). In this case, the trajectory (hereinafter referred to as "defense line K) of the touch operation is displayed on the second game image, and the player objects of the attribute value DF move so as to line up along the defense line K (defense line action). Specifically, the player objects of the attribute value DF move along the x direction so as to approach the defense line K by a predetermined distance in a unit period of time. For example, in FIG. 9, the player objects P7 to P9 of the attribute value DF move toward the defense line K. Simultaneously on the first game image, the player objects P7 to P9 move toward the defense line K which has been set in the second game image.

Figure 10:
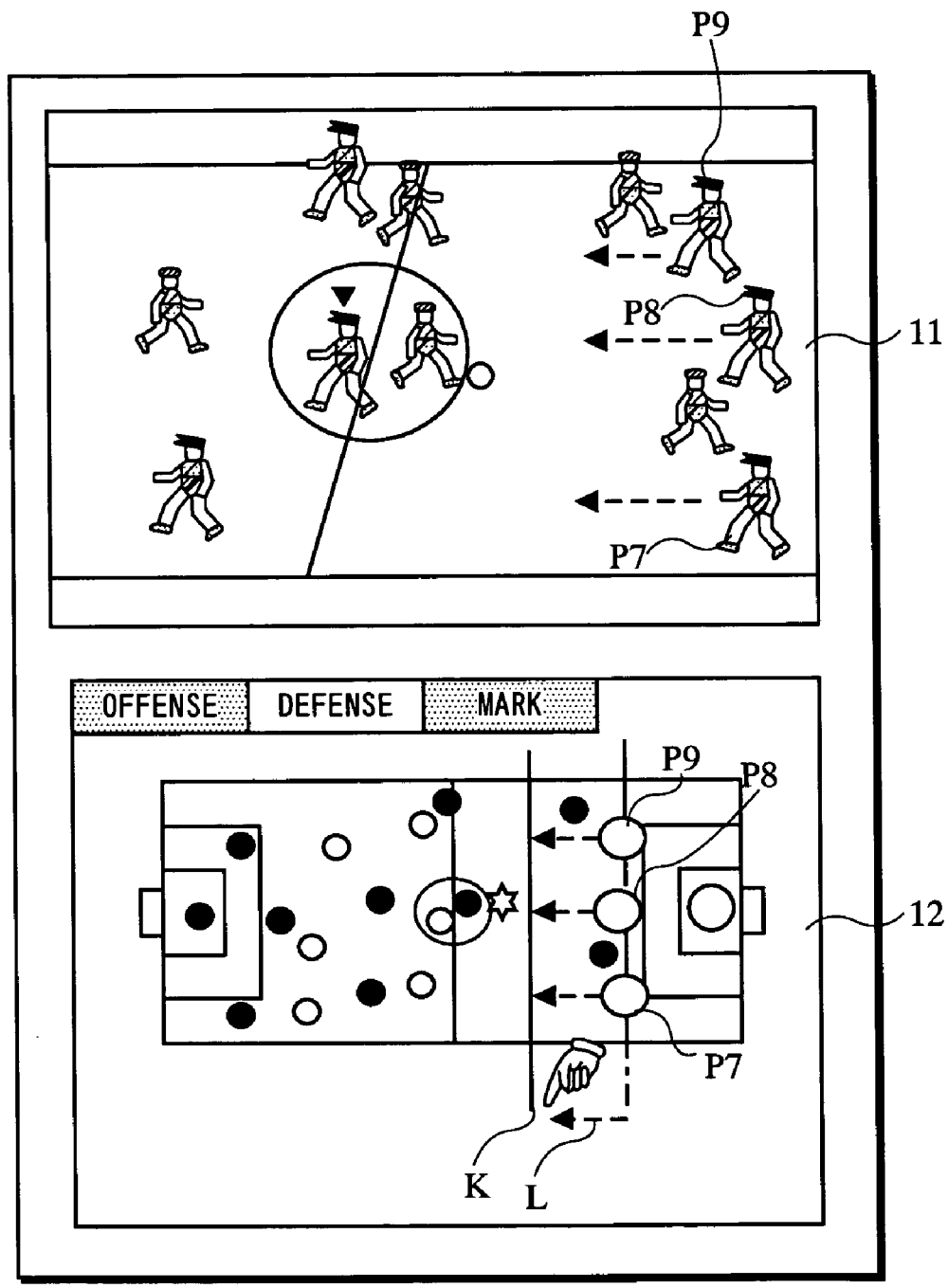
FIG. 10 is a diagram illustrating an exemplary first game image and an exemplary second game image to be displayed when a drag operation is performed for a defense line.

The defense line K drawn on the second game image can be translated along the x direction if the player performs a touch operation in a manner of dragging on the touch panel 13. As shown in FIG. 10, suppose that the player has performed a touch operation on the touch panel 13 so as to drag the defense line K in the direction of arrow L. In this case, the defense line K displayed on the second game image is translated along the x direction in accordance with the touch operation. As a result, the player objects of the attribute value DF move so as to line up along the translated defense line K. For example, in FIG. 10, the player objects P7 to P9 of the attribute value DF move toward the translated defense line K. Simultaneously on the first game image, the player objects P7 to P9 move toward the defense line K which has been translated in the second game image.

Figure 11:
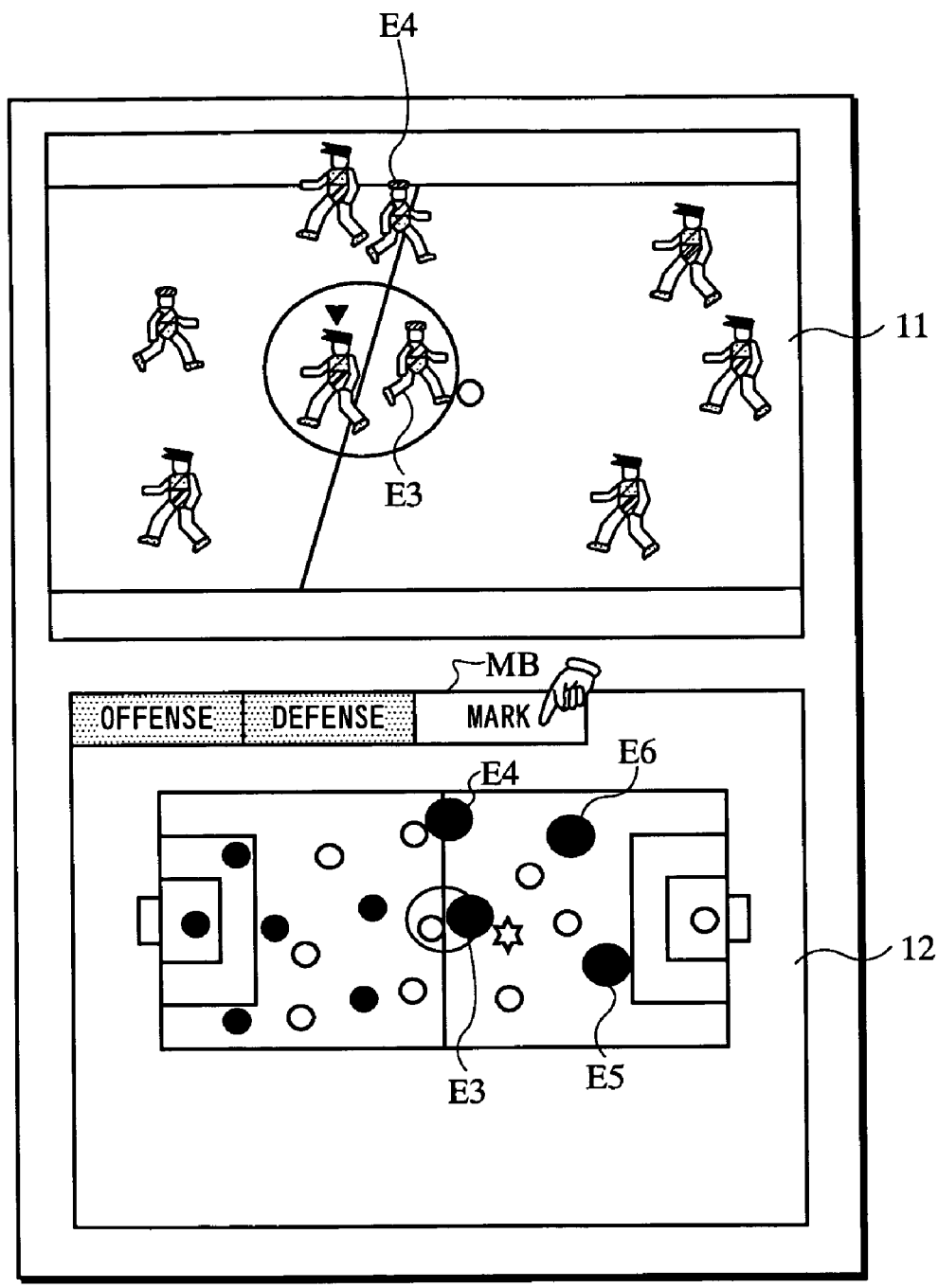
FIG. 11 is a diagram illustrating an exemplary first game image and an exemplary second game image to be displayed in the case where a mark button MB is touch-operated.
Figure 12:
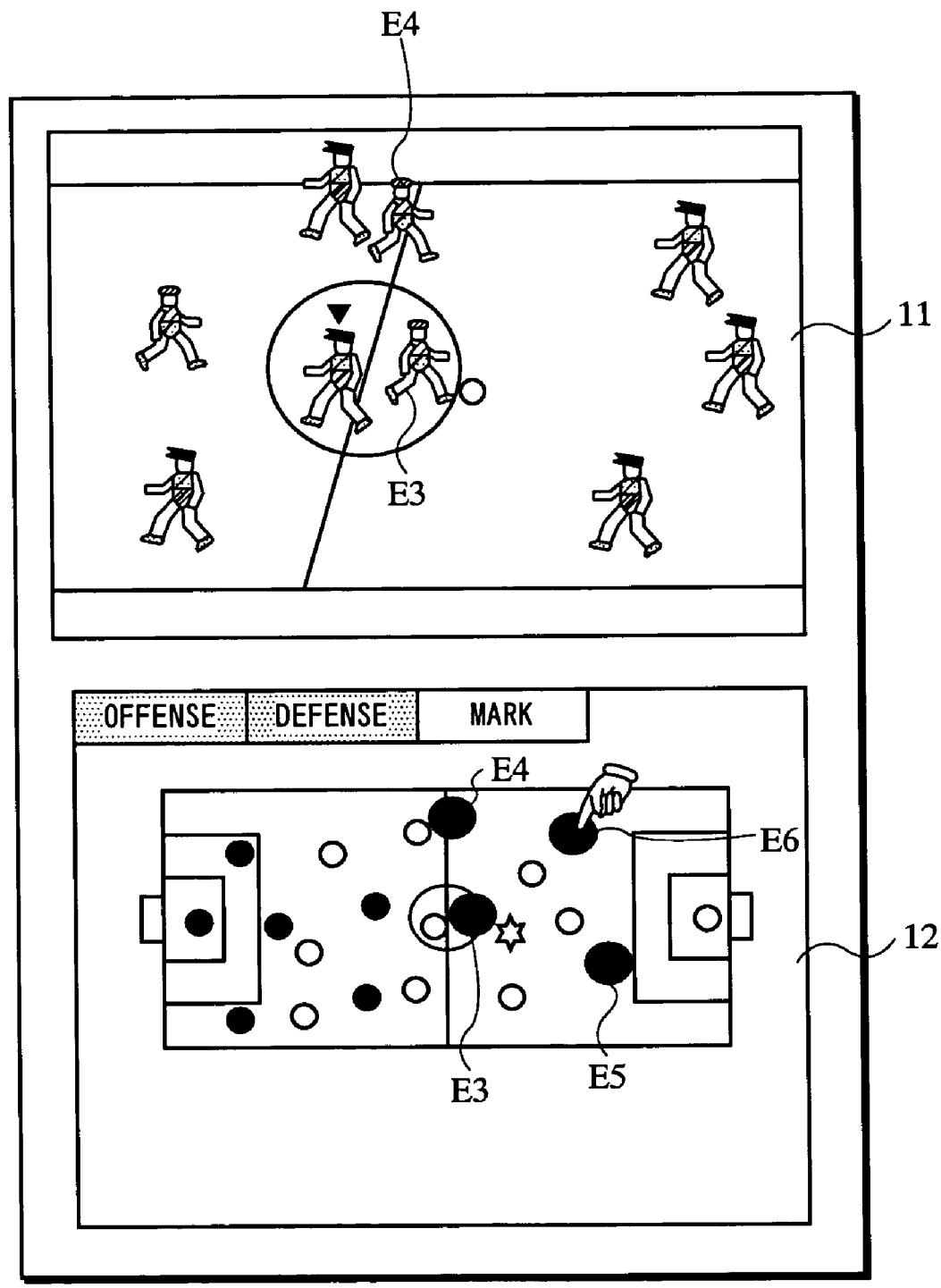
FIG. 12 is a diagram illustrating an exemplary first game image and an exemplary second game image to be displayed when selecting an athlete to become a target of marking.
Figure 13:
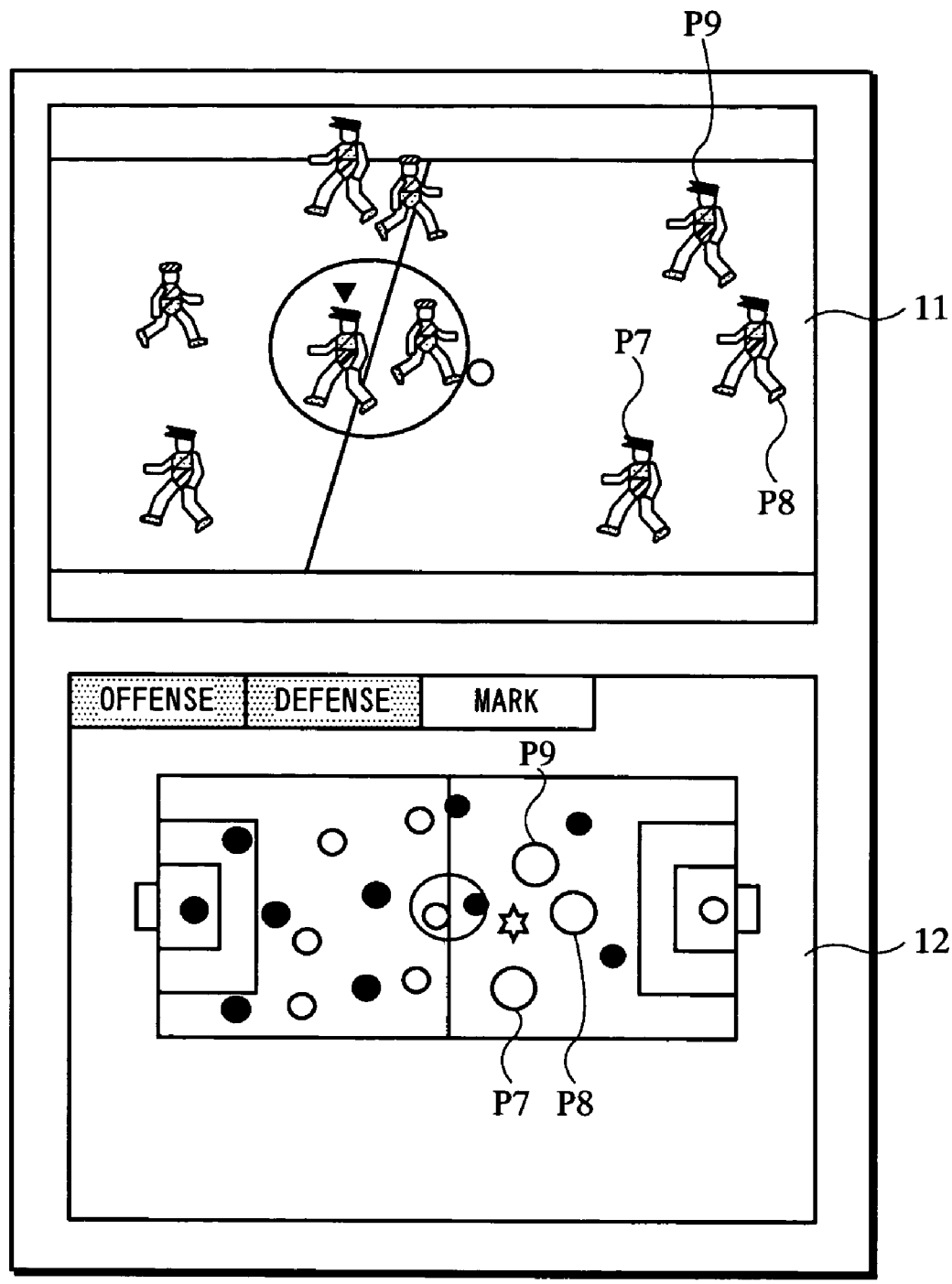
FIG. 13 is a diagram illustrating an exemplary first game image and an exemplary second game image to be displayed after an athlete to become a target of marking is selected.
Figure 14:
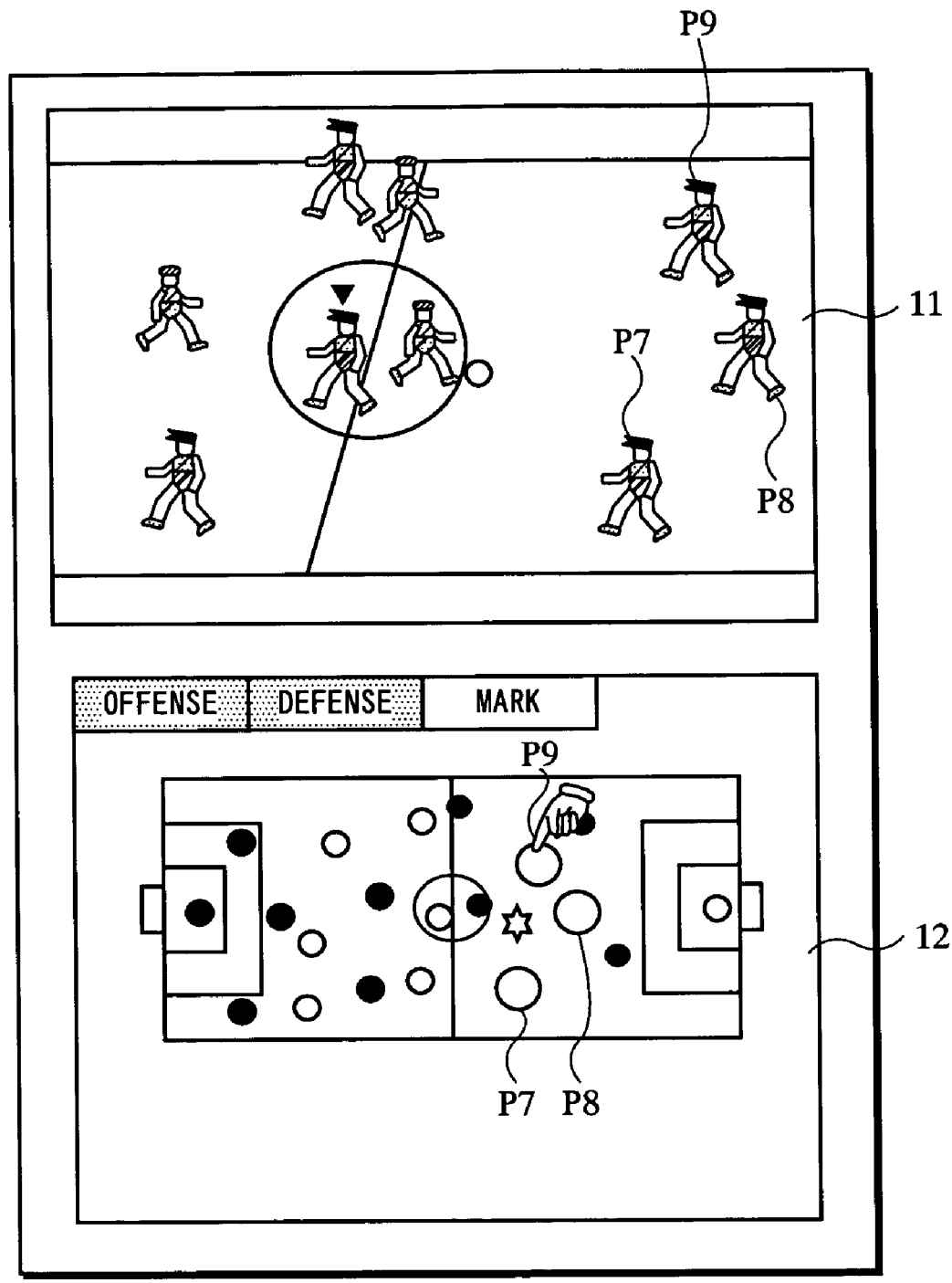
FIG. 14 is a diagram illustrating an exemplary first game image and an exemplary second game image to be displayed when selecting an athlete to perform a marking action.
Figure 15:
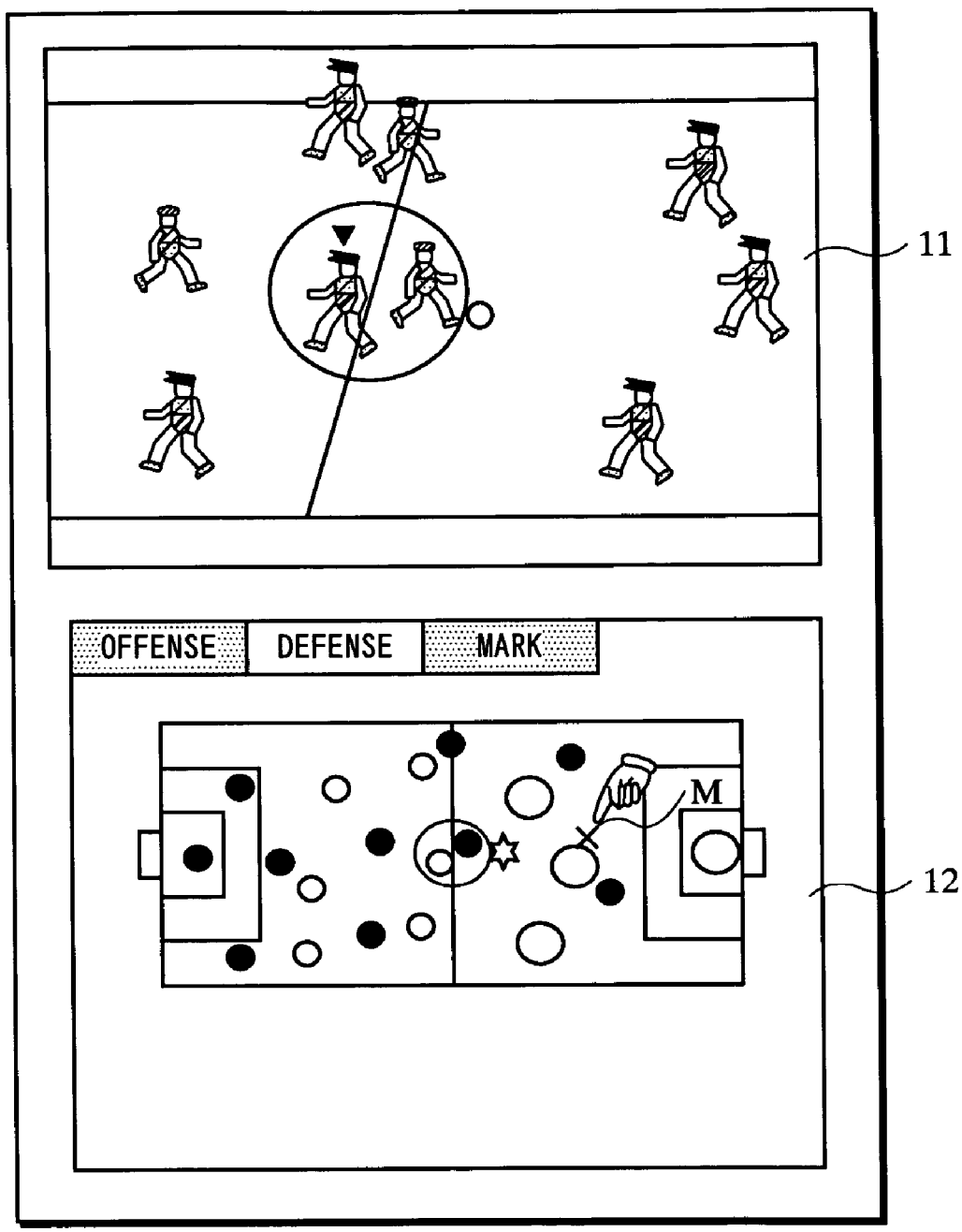
FIG. 15 is a diagram of an exemplary first game image and an exemplary second game image, illustrating a touch operation to be performed when displaying an enlarged second game image.

A fourth example of an action to be made by a player object in response to an operation using the touch panel 13 is a marking action. As shown in FIG. 11, a mark button MB is displayed in an upper central region of the second game image. If the player touch-operates the touch panel 13 so as to touch on the mark button MB, among the plurality of athlete objects composing the enemy team (hereinafter also referred to as "enemy objects"), the symbolized representations of offense athletes in the second game image become relatively large. For example, the offense athletes correspond to the enemy objects of the attribute values FW and MF. In the second game image of FIG. 11, enemy objects E3 and E4 (attribute value MF) and E5 and E6 (attribute value FW) are symbolized so as to appear relatively large as compared to the other enemy objects (attribute values DF and GK).

Next, the player selects an enemy object to be marked, and touch-operates the symbolized representation of this enemy object in the second game image, on the surface of the touch panel 13. Note that the symbolized representations of the enemy objects (FW and MF) which are likely to be marked are made relatively large to facilitate touch operation. For example, in FIG. 12, the player is touch-operating the enemy object E6 shown in the second game image. Once the enemy object to be marked is selected and touch-operated, among the plurality of player objects composing the player's team, the symbolized representations of the player objects of the attribute value DF in the second game image become relatively large. Moreover, the enemy objects, which have been symbolized in a relatively large size, are changed to the same size as that of the other enemy objects. In the second game image of FIG. 13, the player objects P7 to P9 (attribute value DF) are symbolized so as to appear relatively large as compared to the other player objects (attribute values FW, MF, and GK).

Next, the player selects a player object with which to mark the selected enemy object (E6 in FIG. 12), and touch-operates the symbolized representation of this player object in the second game image, on the surface of the touch panel 13. Note that the symbolized representations of the player objects which are likely to be marked (DF) are made relatively large to facilitate touch-operation. For example, in FIG. 14, the player is touch-operating the player object P9 shown in the second game image. As a result of these operations, the selected player object (P9) will automatically (i.e., even without player operations) move so as to mark the selected enemy object (E6) (marking action).

Moreover, in the second game image, the game field to be displayed in the second LCD 12 can be enlarged when the player performs a predetermined touch operation on the touch panel 13. For example, suppose that, while pressing the player side switch 14f or 14g, the player performs a touch operation on the touch panel 13 so as to touch point M on the field in the second game image shown in FIG. 15. In this case, the second game image displayed in the second LCD 12 will be displayed so as to appear enlarged around the center point M, as shown in FIG. 16. Moreover, a display-all-area button AB is displayed in a lower right region of the enlarged second game image. If the player touch-operates the touch panel 13 so as to touch on the display-all-area button AB, the original second game image, i.e., a radar representation of the entire field, is restored.

Thus, the player can perform various operations by manipulating the operation switch section 14 and the touch panel 13 while looking at the first game image and the second game image. According to the present exemplary non-limiting implementation, in addition to the operation for the switch-controllable athlete using the operation switch section 14, which has conventionally been possible, it is also possible to select and control any of the player's team athletes at an appropriate time by using the touch panel 13.

Next, referring to FIGS. 17 to 19, RAM images of the WRAM 22 will be described. As shown in FIGS. 17 to 19, the WRAM 22 stores instructions and data which are of a format executable by a computer in the game apparatus 1, in particular by the CPU core 21. Moreover, the WRAM 22 stores game data which is generated by the CPU core 21 executing the game program. The game program is loaded to the WRAM 22 from the cartridge 17 as appropriate, and executed.

In FIG. 17, the WRAM 22 stores image data 2a, judgment region data 2b, and a display size change table 2c are stored. These data are read from the cartridge 17, and stored as data which are independent of the game progression.

The image data 2a, which is data for displaying operable objects and the like in the first game image and the second game image, includes 3D image data 2a1, 2D image data 2a2, and the like. The 3D image data 2a1, which is data for displaying operable objects and the like in the first game image, includes: data 2a11 for displaying images of athletes (player objects and enemy objects); data 2a12 for displaying an image of a ball (ball object); data 2a13 for displaying an image of a field (soccer field); and the like. The 2D image data 2a2, which is data for displaying operable objects and the like in the second game image, includes: data 2a21 for displaying images of athletes; data 2a22 for displaying an image of a ball; data 2a23 for displaying an image of a field; and the like. The data 2a21 for displaying images of athletes, which is contained in the 2D image data 2a2, includes data of large size 2a2L, medium size 2a2M, and small size 2a2S in order to enable changing of the symbolized representation size. In the case where image data is to be enlarged when performing a displaying process, it is unnecessary to store image data in each different size.

The judgment region data 2b, which is region data for enable selection of the aforementioned touch-controllable athlete, includes: data of large size 2bL (corresponding to athletes 2a21 of the large size 2a2L); medium size 2bM (corresponding to athletes 2a21 of the medium size 2a2M); and small size 2bS (corresponding to athletes 2a21 of the small size 2a2S). Specifically, data concerning the value of the radius of the judgment region may be stored, for example.

The display size change table 2c is a table indicating targets to be subjected to the aforementioned enlargement of symbolized representation size, and describes attribute values with respect to various touch operations to be performed on the touch panel 13 and various game situations. For example, the display size change table 2c describes which object needs to have its displayed size changed and how much the change should be, with respect to the following cases: a case where an offense button operation has been made (2c1); a case where a defense button operation has been made (2c2); a case where a mark button operation has been made (2c3); a case where a through-pass state occurs (2c4); and the like. It is described that, if an offense button operation has been made (2c1), athletes (player objects) of the player's team having the attribute values FW and MF are to be displayed by using image data of the medium size 2a2M. It is also described that, if a defense button operation is made (2c2), athletes (player objects) of the player's team having the attribute values DF and GK are to be displayed by using image data of the medium size 2a2M. It is also described that, if a mark button operation has been made (2c3), athletes (enemy objects) of the enemy team having the attribute values FW and MF are displayed by using image data of the medium size 2a2M in a first phase; and in a second phase, athletes (player objects) of the player's team having the attribute value DF are displayed by using image data of the medium size 2a2M. It is also described that, if the game situation is in a through-pass state (2c4), athletes (player objects) of the player's team having the attribute value FW which are positioned near the enemy team's goal have their displayed size incremented by one step. Any object that is not described in this table is to be displayed by using image data of the small size 2a2S.

As shown in FIG. 18, player's team athlete data 2d, enemy team athlete data 2e, a switch-controllable athlete number 2f, a touch-controllable athlete number 2g, ball coordinates 2h, elapsed time 2i in the match, and points 2j are further recorded in the WRAM 22. These are data which are generated by the CPU core 21 executing the game program, and whose descriptions vary in accordance with game progression.

The player's team athlete data 2d includes data 2d1 to 2d11 for managing a plurality of player's team athletes (player objects) which are respectively assigned with athlete Nos. 1 to 11. Each piece of player's team athlete data 2d1 to 2d11 includes: an athlete number; a position on the field (game field coordinates (gx, gy)); an attribute value, a displayed size in the second game image; mark data (the athlete number of an enemy object in a marking action); and the like.

The enemy team athlete data 2e includes data 2e1 to 2e11 for managing a plurality of enemy team athletes (enemy objects), which are respectively assigned with athlete Nos. 12 to 22. Each piece of enemy team athlete data 2e1 to 2e11 includes: an athlete number; a position on the field (game field coordinates (gx, gy)); an attribute value; a displayed size in the second game image; and the like.

The switch-controllable athlete number 2f designates an athlete number which is set for the aforementioned switch-controllable athlete. The touch-controllable athlete number 2g designates an athlete number which is set for the aforementioned touch-controllable athlete. The ball coordinates 2h designate the position of the ball object on the game field (game field coordinates (gx, gy)). The elapsed time 2i in the match designates an amount of time which has elapsed with game progression. The points 2j designates points which have been scored by the player's team and the enemy team.

As shown in FIG. 19, a trajectory data buffer 2k, tracing action data 2l, flicking action data 2m, defense line action data 2n, a tracing action timer 2o, a flicking action timer 2p, a trajectory input timer 2q, a sampling timer 2r, a defense line movement flag 2s, an enlargement flag 2t, and central coordinates for enlargement 2u are further recorded in the WRAM 22. These data are also data which are generated by the CPU core 21 executing the game program, and whose descriptions vary in accordance with game progression.

The trajectory data buffer 2k records, as appropriate, coordinate data which is input by the player using the touch panel 13 and which has been converted to game field coordinates (gx, gy). The trajectory data buffer 2k includes coordinate data 2k1, coordinate data 2k2, and so on. The trajectory data buffer 2k is an area for temporarily storing trajectory data which is input by the player, and stores a sequence of (one round of) trajectory inputs. Depending on the type of input trajectory, it is determined whether a tracing action has been input, a flicking action has been input, or a defense line has been input. In the case where a tracing action or a defense line has been input, the trajectory data in the trajectory data buffer 2k is copied to the tracing action data area 2l or the defense line action data area 2n. In the case where a flicking action has been input, a flicking vector is determined from the trajectory data in the trajectory data buffer 2k, and is stored to the flicking action data area 2m. Thereafter, the trajectory data in the trajectory data buffer 2k is erased. The tracing action data 2l stores, for each given player's team athlete (player object) which makes a tracing action, trajectory data defining the action of each athlete number, including tracing action data 2l1, tracing action data 2l2, and so on. The flicking action data 2m records, for each given player's team athlete (player object) which makes a flicking action, a flicking vector defining the action of each athlete number, including flicking action data 2m1, flicking action data 2m2, and so on. The defense line action data 2n includes trajectory data 2n1 for a defense line which is formed on the field. Note that the coordinates or trajectory data which are stored in the trajectory data buffer 2k, the tracing action data 2l, the flicking action data 2m, and the defense line action data 2n are trajectory data based on game field coordinates, and not trajectory data based on touch panel coordinates.

The tracing action timer 2o is a timer for measuring a predetermined amount of time in a tracing action process (described later with reference to FIG. 30), such that an athlete object will move along a trajectory at the interval of every predetermined amount of time. As described earlier, when the player has performed a touch operation in a manner of flicking, a touch-operable object makes a flicking action for a certain period of time (Th). The flicking action timer 2p is a timer for causing a touch-operable object to make a flicking action for a certain period of time. The flicking action timer 2p is started at the beginning of a flicking action, and is used for determining the end timing of the flicking action, which comes after the lapse of the certain period of time. The trajectory input timer 2q is a timer for determining whether a trajectory input which has been made by the player is an input for a flicking action, or an input for a tracing action. Specifically, as will be described later, the input is determined as an input for a tracing action if the touch operation has continued for one second or more, and determined as an input for a flicking action if the touch operation has continued for less than one second. The trajectory input timer 2q is started when the player performs a touch operation, and is stopped when a sequence of touch operation is ended. The sampling timer 2r is a timer for measuring an interval at which trajectory data is sampled.

The defense line movement flag 2s is a flag indicating whether or not to move a defense line in response to a drag operation performed by the player using the touch panel 13. The enlargement flag 2t and the central coordinates for enlargement 2u are, respectively, a flag indicating whether or not to enlarge the second game image and central coordinates used during the enlargement, which are recorded in response to an instruction to enlarge the second game image which is input by the player using the touch panel 13.

Figure 20:
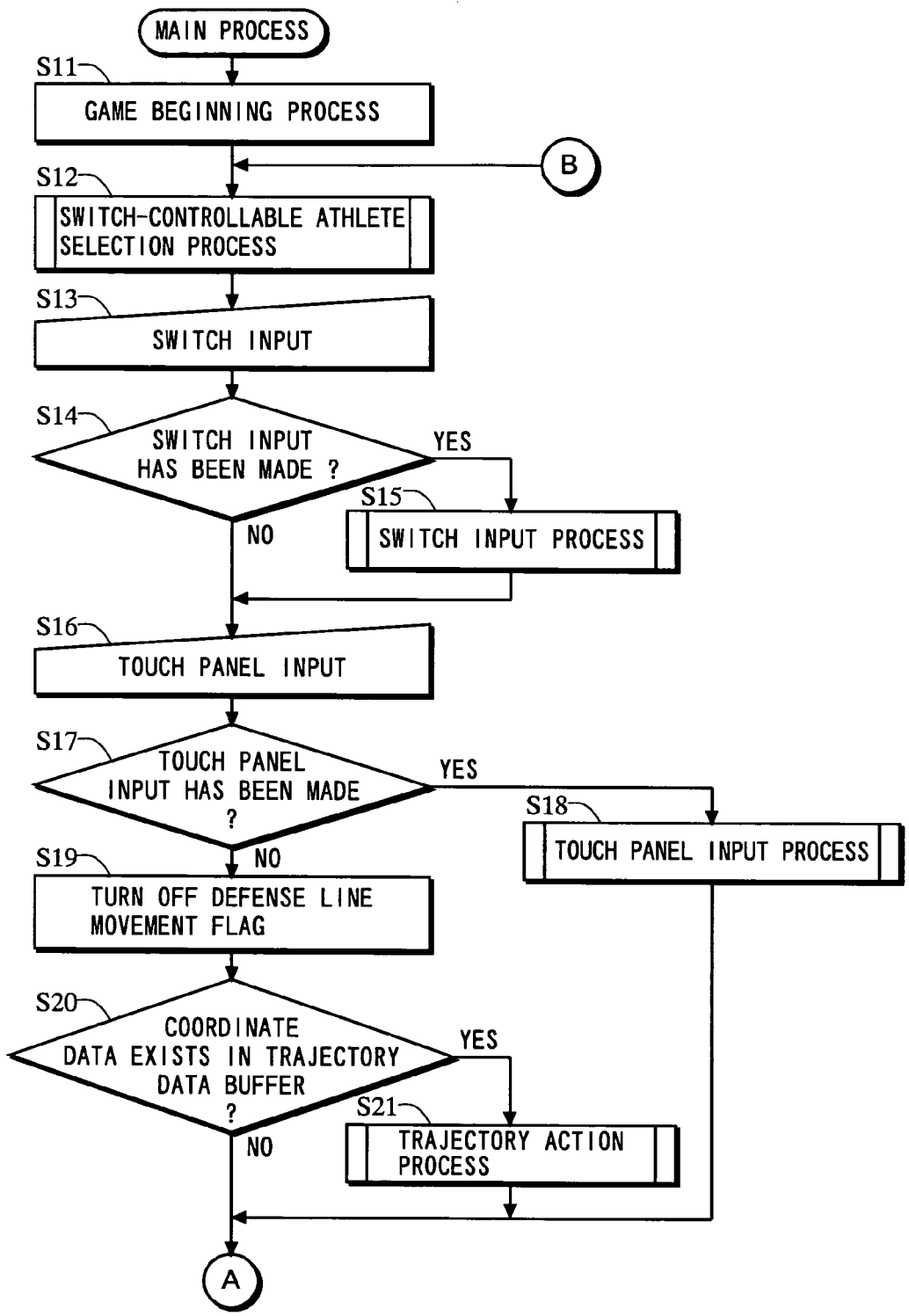
FIG. 20 is a flowchart illustrating a former half of a main process executed in the game apparatus 1 in accordance with a game program according to an exemplary non-limiting implementation.
Figure 21:
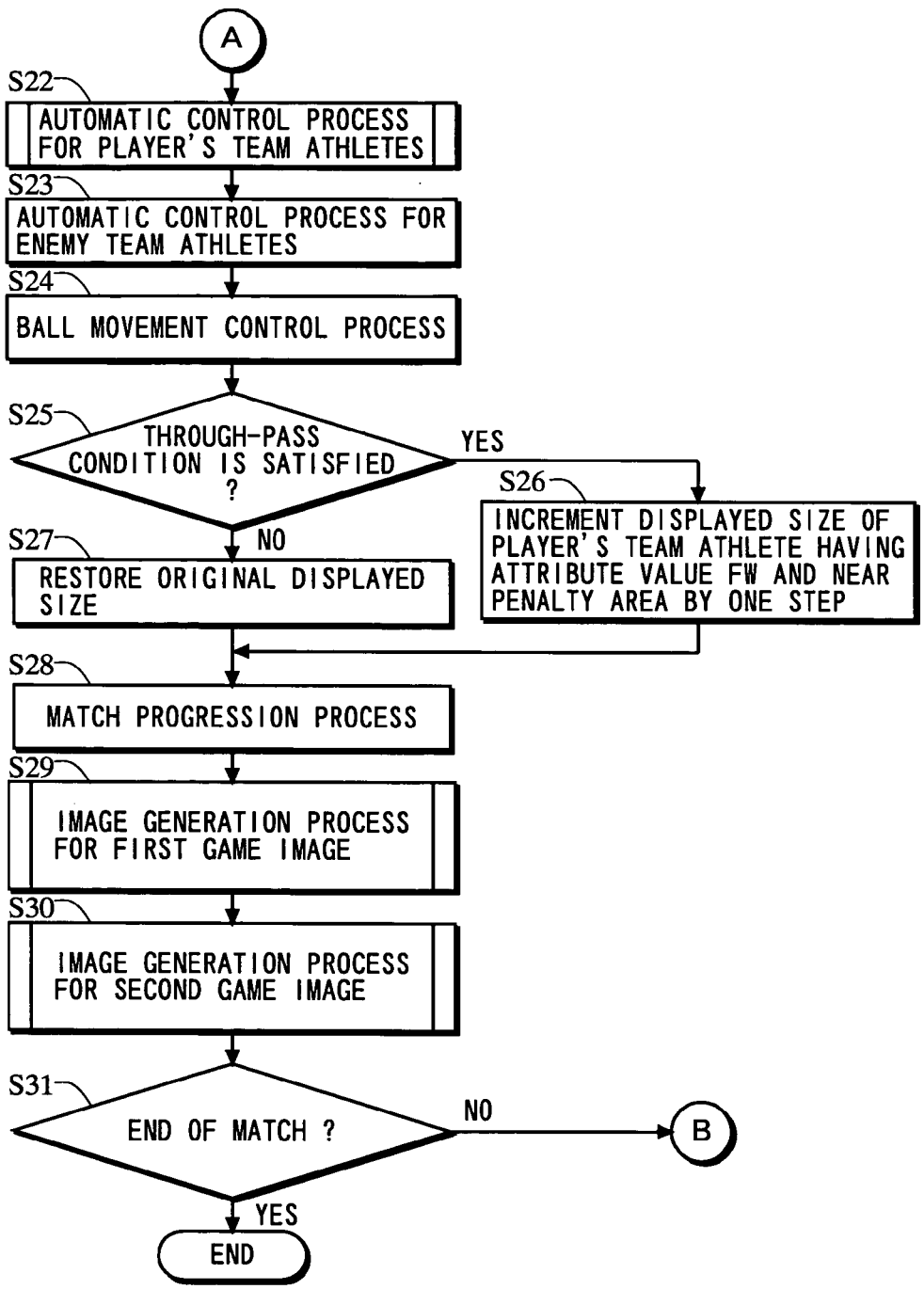
FIG. 21 is a flowchart illustrating a latter half of the main process shown in FIG. 20.
Figure 22:
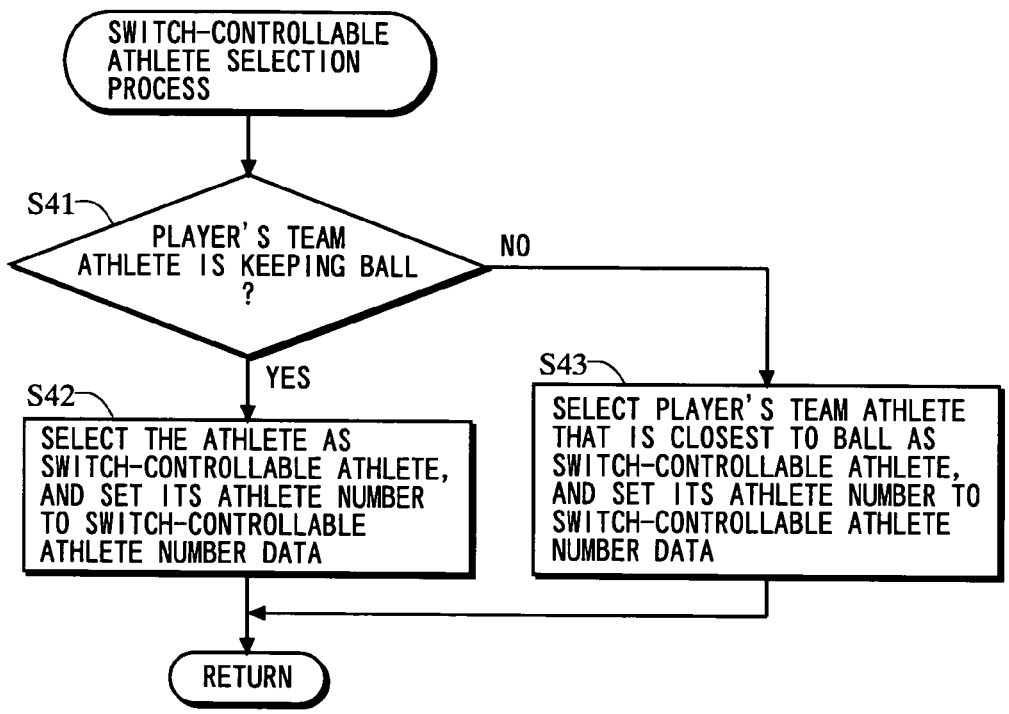
FIG. 22 shows the subroutine of a switch-controllable athlete selection process to be performed at step S12 of FIG. 20.
Figure 23:
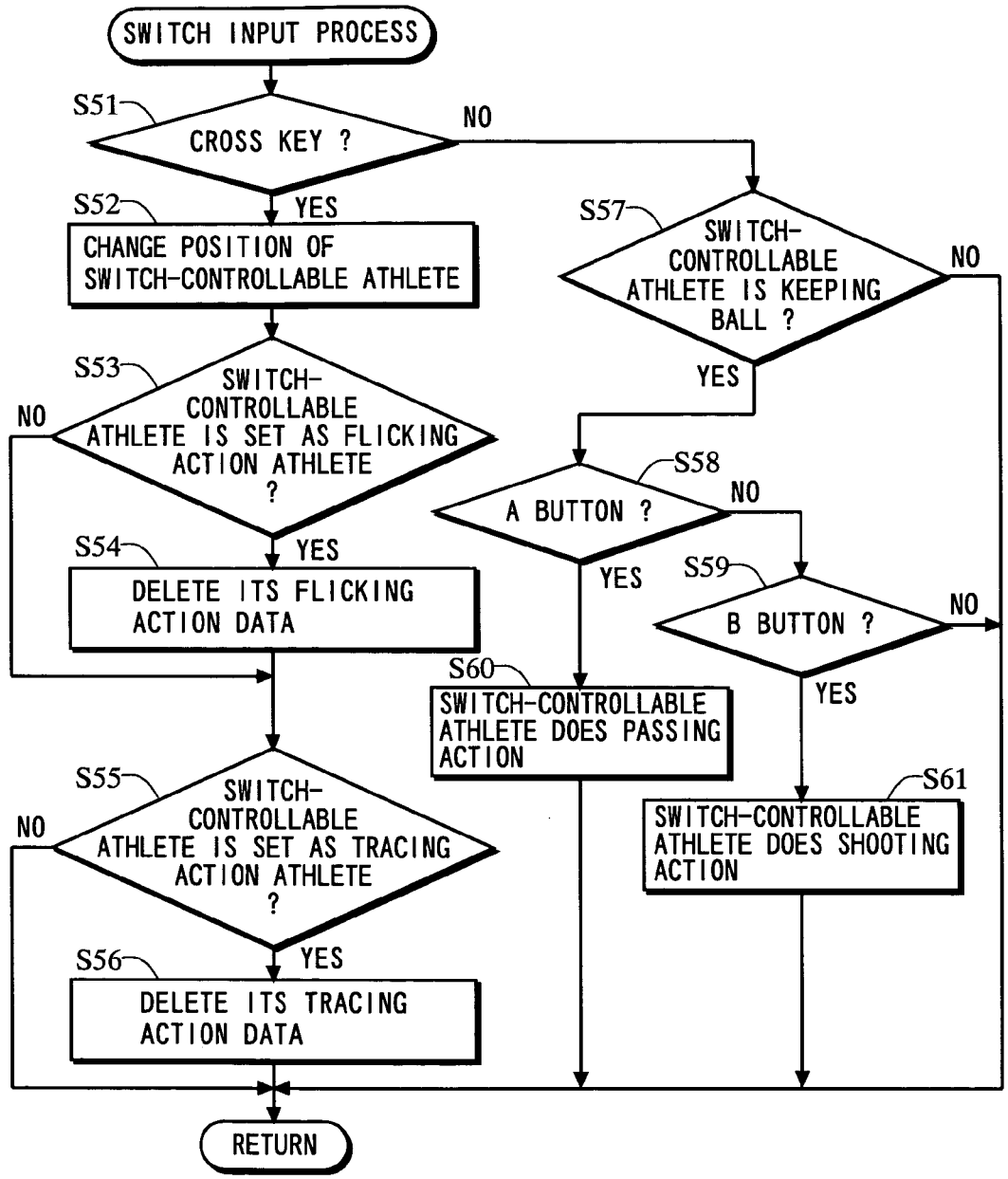
FIG. 23 shows the subroutine of a switch input process to be performed at step S15 of FIG. 20.
Figure 24:
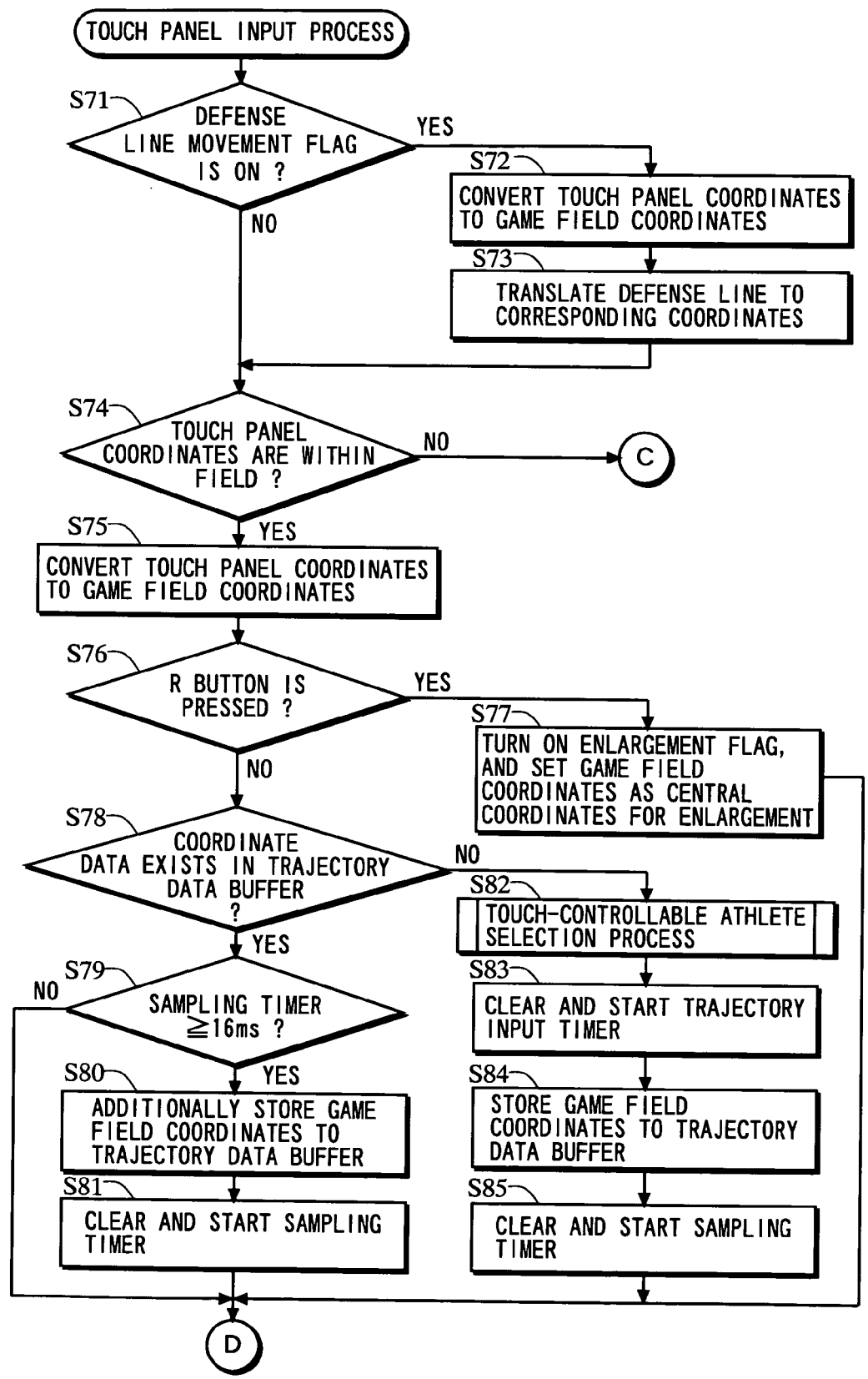
FIG. 24 shows the subroutine of a former half of a touch panel input process to be performed at step S18 of FIG. 20.
Figure 25:
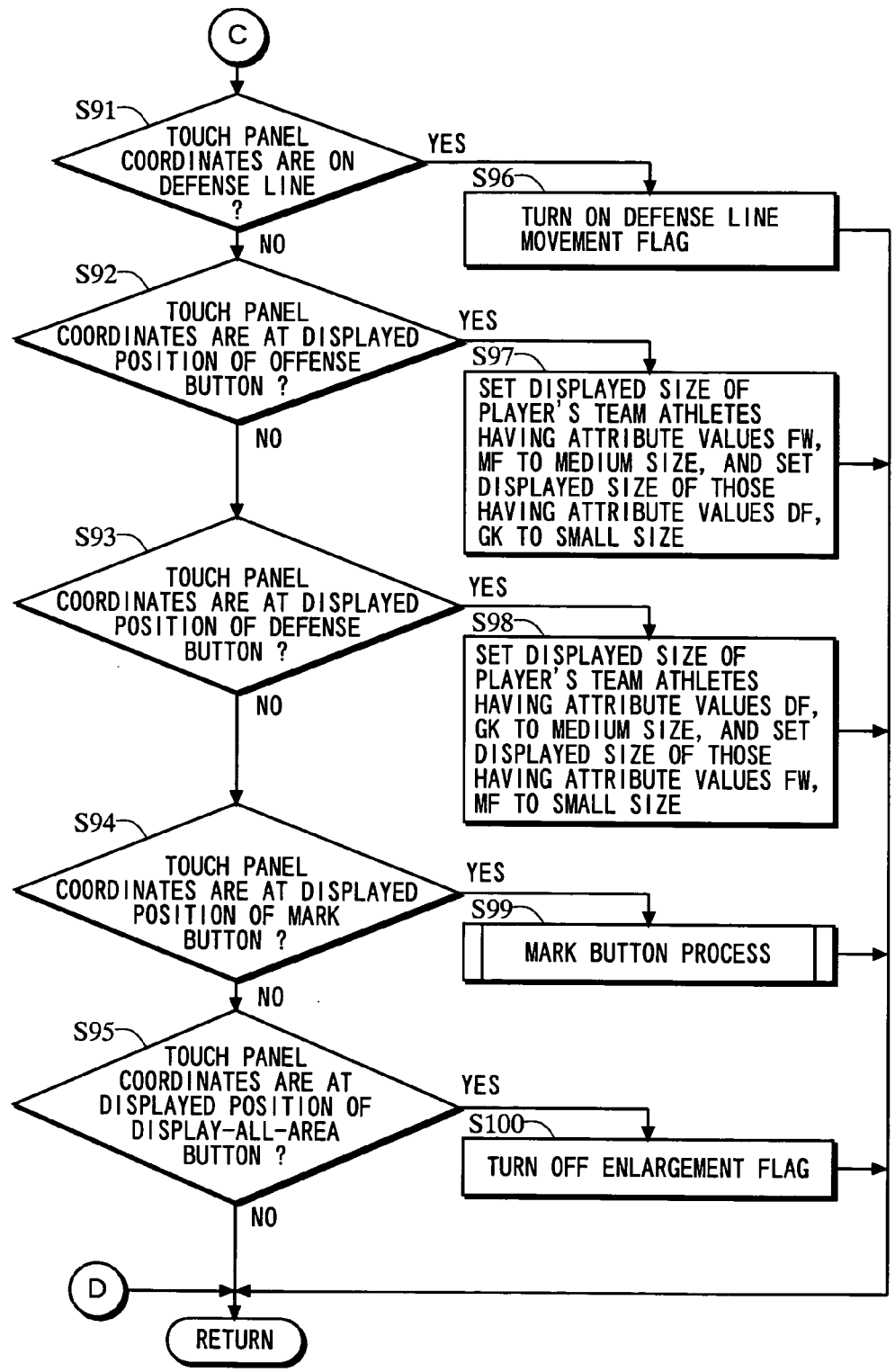
FIG. 25 shows the subroutine of a latter half of a touch panel input process to be performed at step S18 of FIG. 20.
Figure 26:
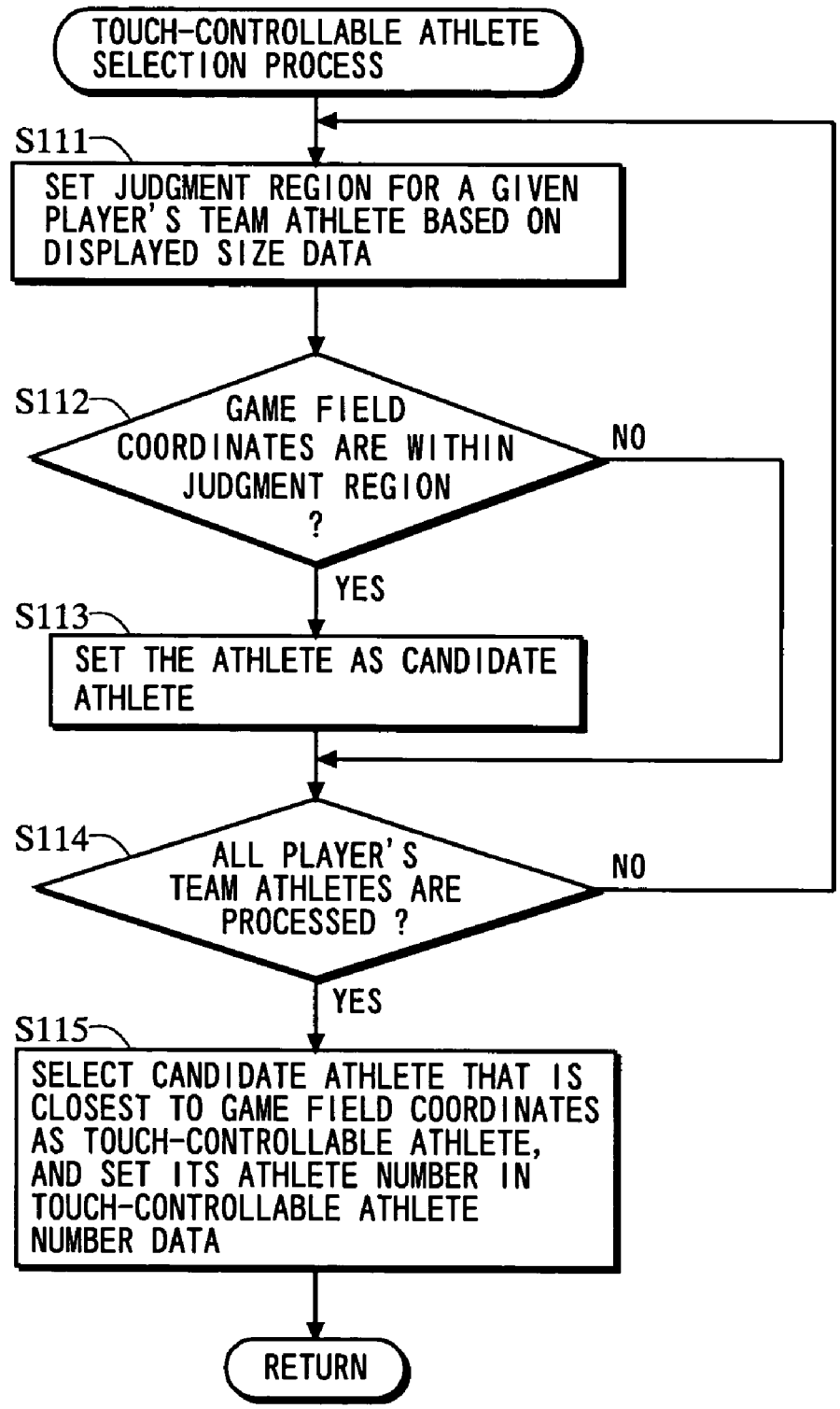
FIG. 26 shows the subroutine of a touch-controllable athlete selection process to be performed at step S82 of FIG. 24.
Figure 27:
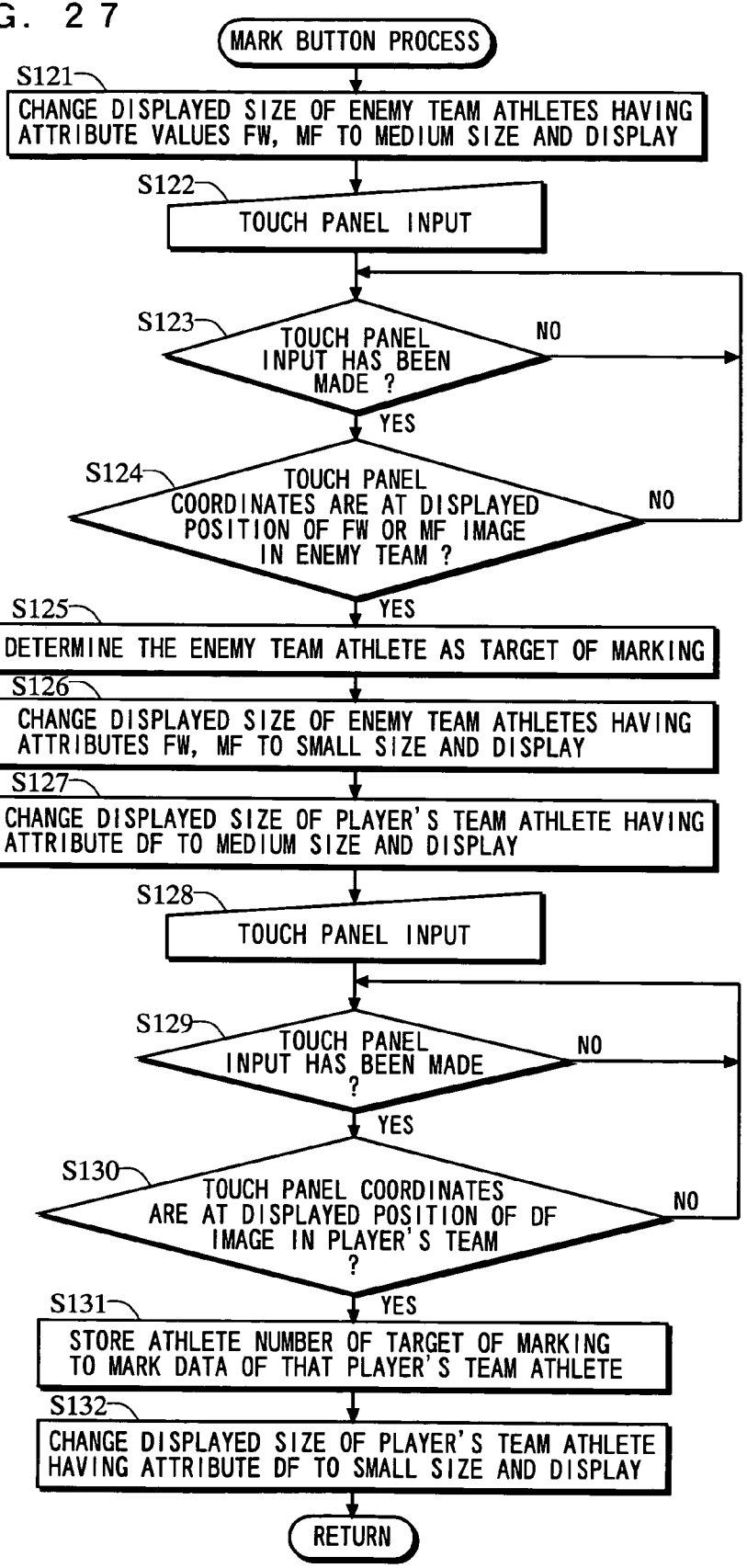
FIG. 27 shows the subroutine of a mark button process to be performed at step S99 of FIG. 25.
Figure 28:
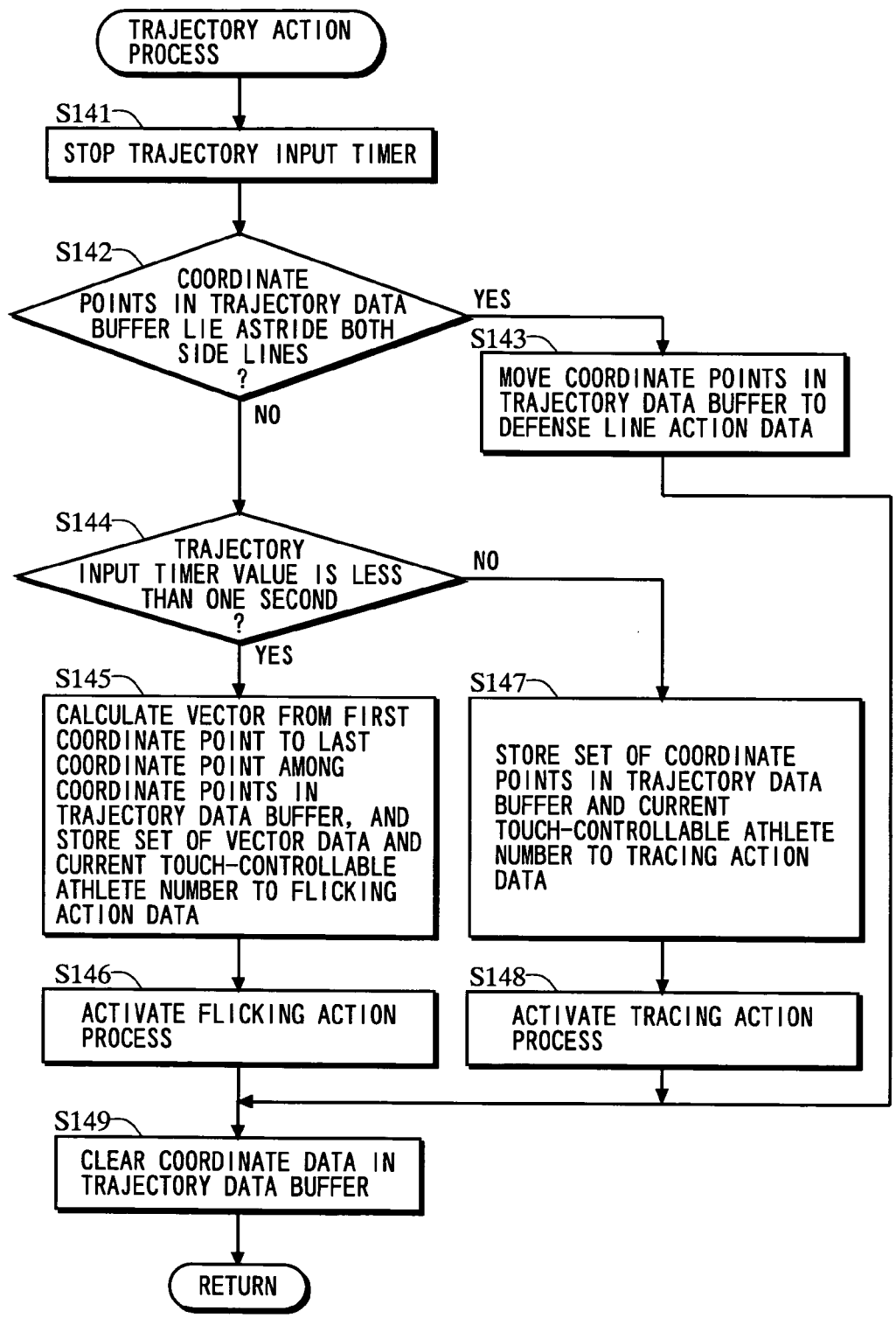
FIG. 28 shows the subroutine of a trajectory action process to be performed at step S21 of FIG. 20.
Figure 29:
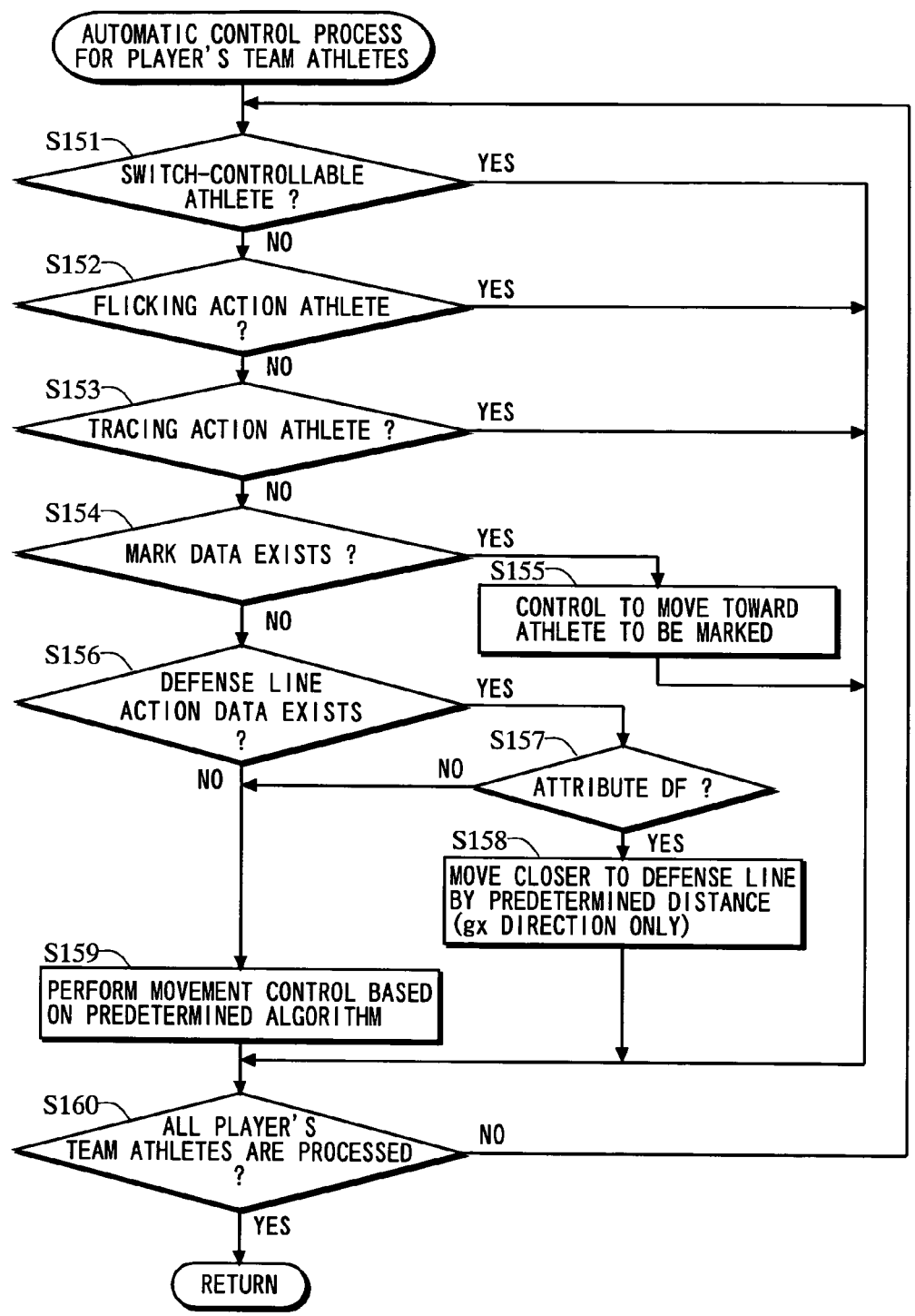
FIG. 29 shows the subroutine of an automatic control process for player's team athletes to be performed at step S22 of FIG. 21.
Figure 30:
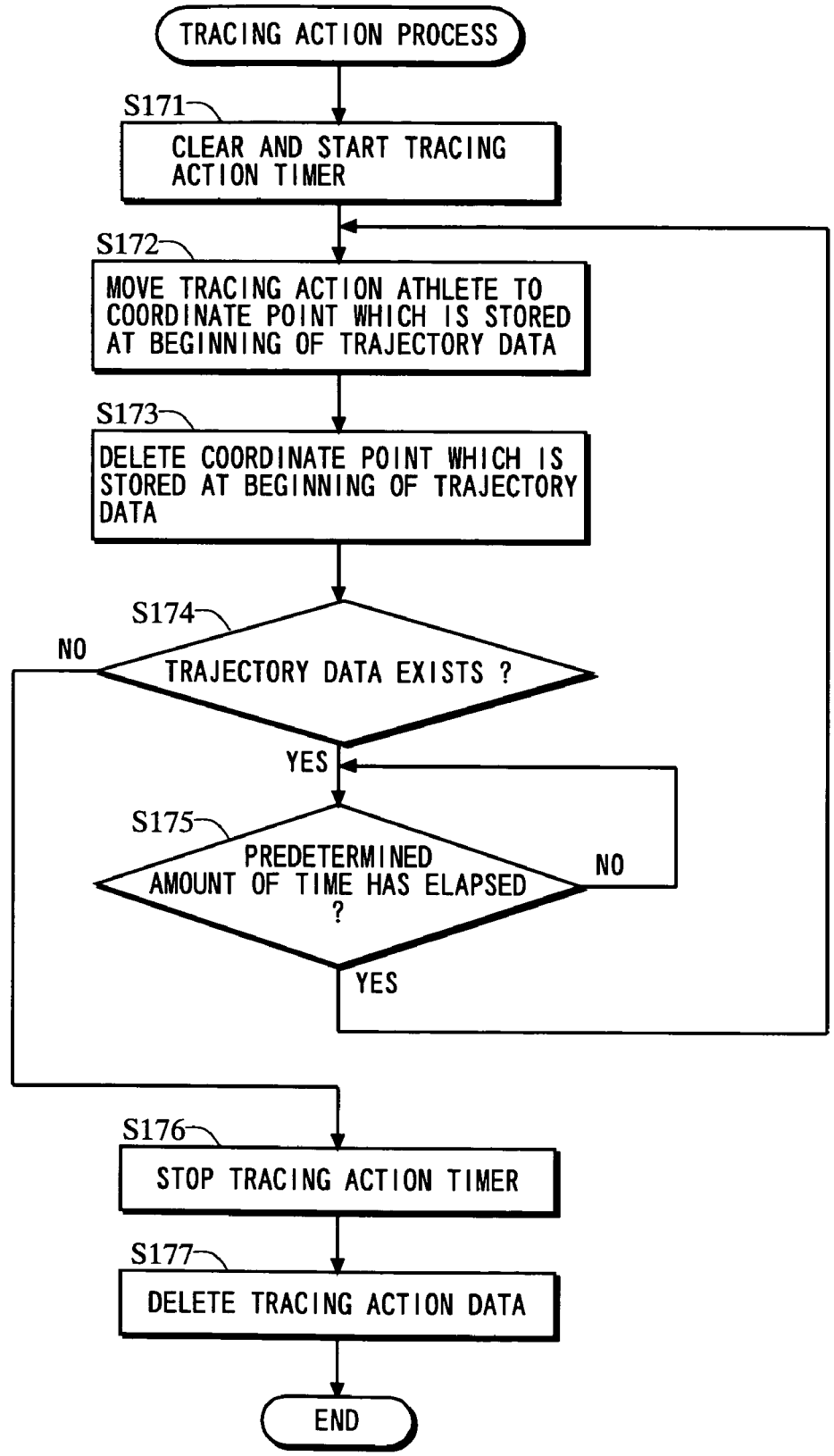
FIG. 30 is a flowchart showing a tracing action process to be performed in parallel to the main process of FIG. 20 and FIG. 21.
Figure 31:
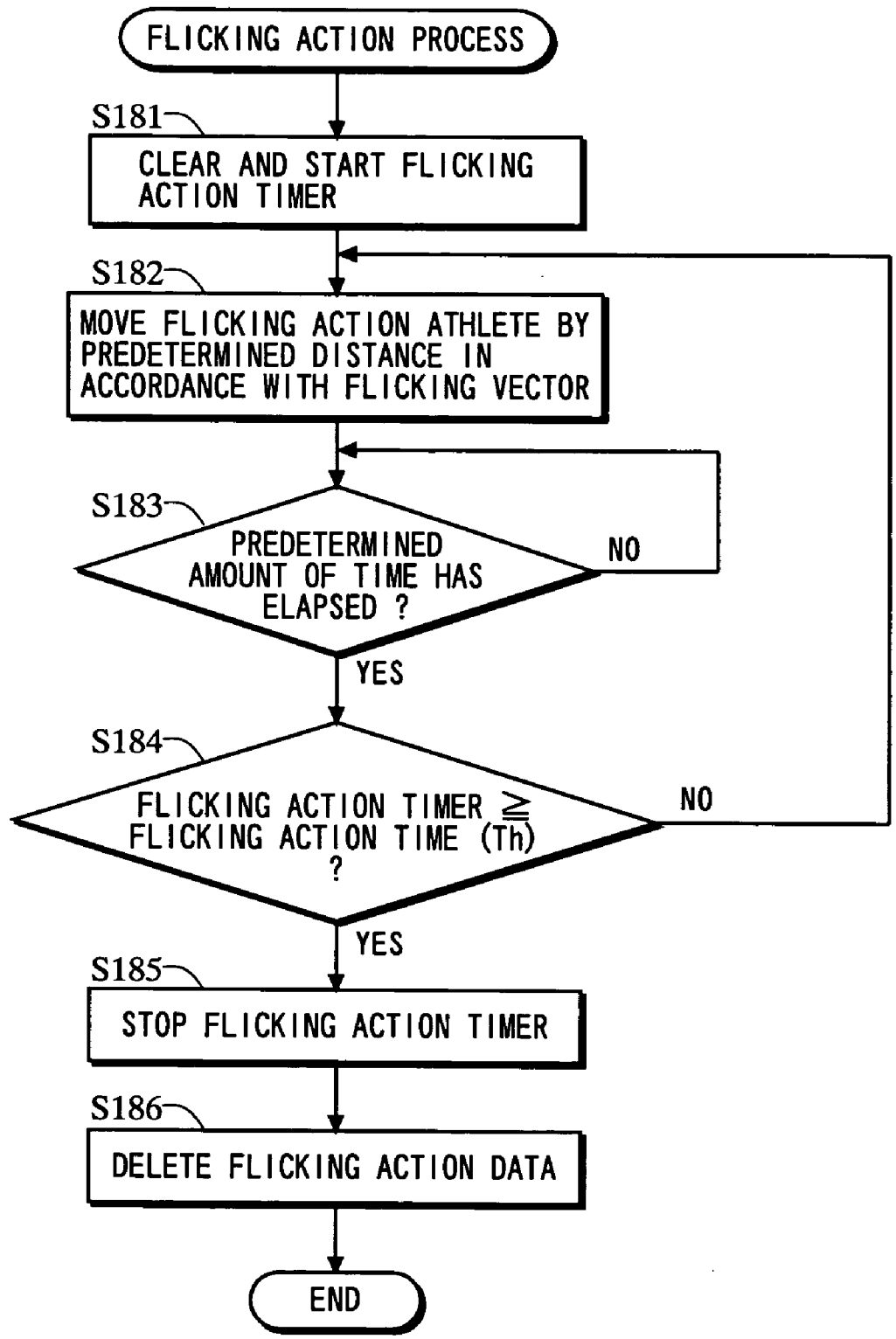
FIG. 31 is a flowchart showing a flicking action process to be performed in parallel to the main process of FIG. 20 and FIG. 21.
Figure 32:
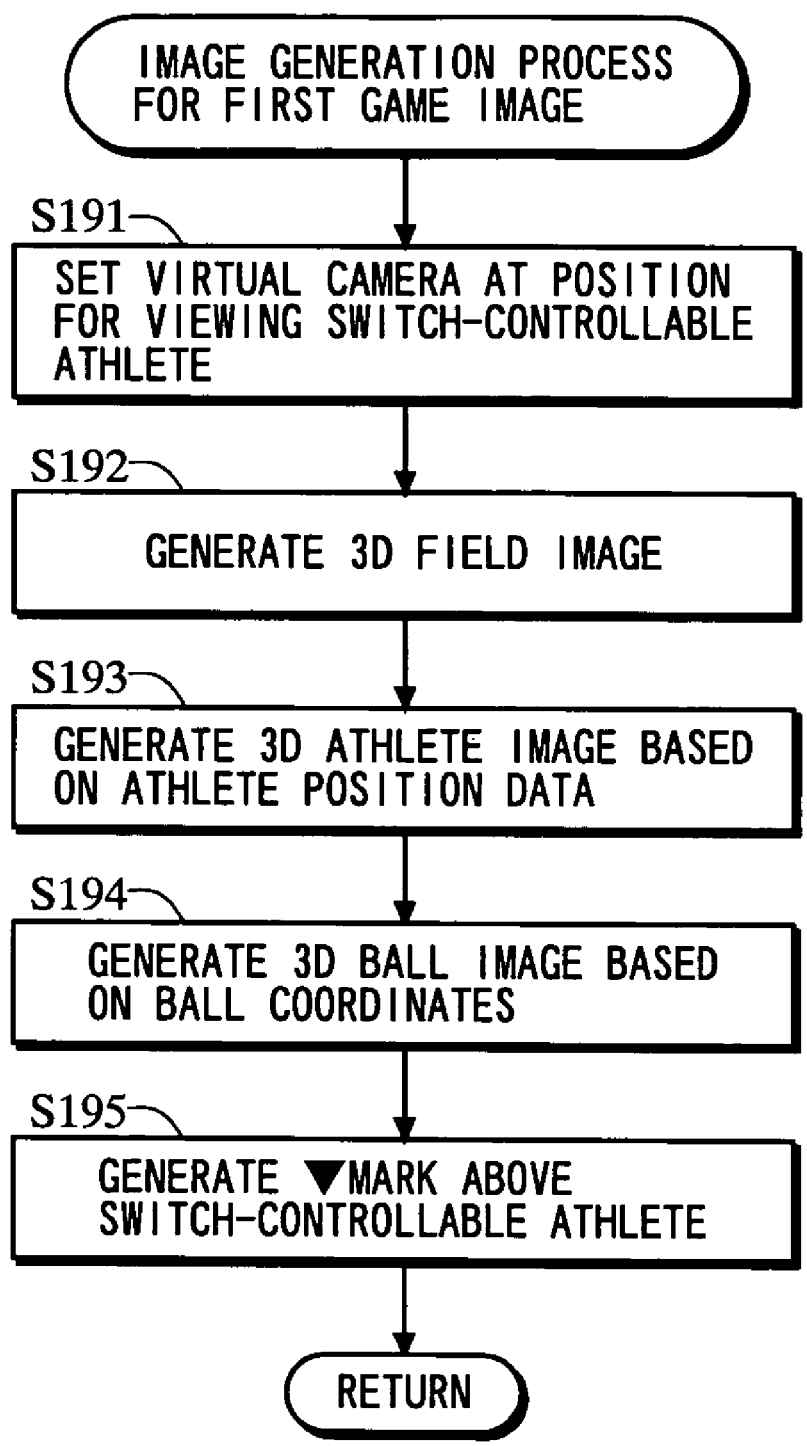
FIG. 32 shows the subroutine of an image displaying process for a first game image to be performed at step S29 of FIG. 21.
Figure 33:
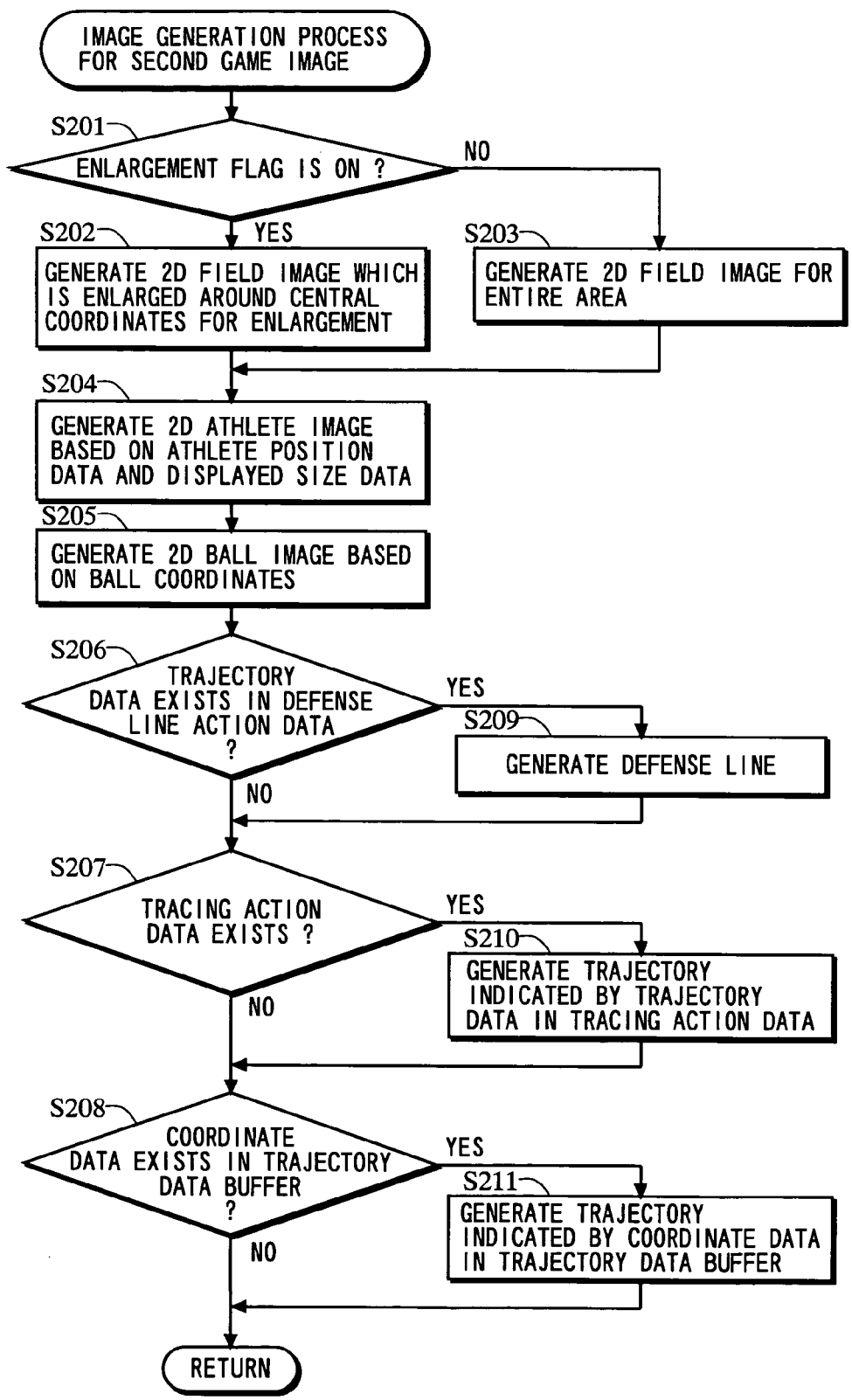
FIG. 33 shows the subroutine of an image displaying process for a second game image to be performed at step S30 of FIG. 21.

Hereinafter, the processes to be performed by a computer in realizing the present exemplary non-limiting implementation will be described with reference to the flowcharts of FIGS. 20 to 33. FIGS. 20 and 21 are flowcharts illustrating a main process executed in the game apparatus 1 in accordance with the game program. FIG. 22 shows the subroutine of a switch-controllable athlete selection process to be performed at step S12 of FIG. 20. FIG. 23 shows the subroutine of a switch input process to be performed at step S15 of FIG. 20. FIGS. 24 and 25 show the subroutine of a touch panel input process to be performed at step S18 of FIG. 20. FIG. 26 shows the subroutine of a touch-controllable athlete selection process to be performed at step S82 of FIG. 24. FIG. 27 shows the subroutine of a mark button process to be performed at step S99 of FIG. 25. FIG. 28 shows the subroutine of a trajectory action process to be performed at step S21 of FIG. 20. FIG. 29 shows the subroutine of an automatic control process for player's team athletes to be performed at step S22 of FIG. 21. FIG. 30 is a flowchart showing a tracing action process to be performed in parallel to the main process of FIG. 20 and FIG. 21. FIG. 31 is a flowchart showing a flicking action process to be performed in parallel to the main process of FIG. 20 and FIG. 21. FIG. 32 shows the subroutine of an image displaying process for a first game image to be performed at step S29 of FIG. 21. FIG. 33 shows the subroutine of an image displaying process for a second game image to be performed at step S30 of FIG. 21. The programs for performing these processes are contained in the game program which is stored in the ROM 171, and loaded from the ROM 171 to the WRAM 22 when power to the game apparatus 1 is turned on, so as to be executed by the CPU core 21.

Referring to FIG. 20, when power to the game apparatus 1 is turned on, various initialization processes for the game apparatus 1 are performed in accordance with a program in a boot ROM (not shown). Furthermore, at least part of the programs stored in the ROM 171 are read and stored to the WRAM 22. Thereafter, the player operates the operation switch section 14 and the like to cause a game to be started. In response, the CPU core 21 begins executing the game program, and performs a game beginning process (specifically, a soccer game match is begun; step S11). Then, the CPU core 21 selects a switch-controllable athlete from among a plurality of player object (step S12), and control proceeds to the next step. The detailed procedure of the switch-controllable athlete selection process at step S12 will be described later.

Next, the CPU core 21 awaits a switch input from the player (step S13). As used herein, a "switch input" in this process is an input made by the player using any operation means other than the touch panel 13, and corresponds specifically to an operation input using the operation switch section 14. Then, the CPU core 21 determines whether a switch input has been made by the player or not (step S14). If a switch input has been made, a switch input process (step S15) is performed, and control proceeds to the next step S16. The detailed procedure of the switch input process at step S15 will be described later. On the other hand, if no switch input is made, the CPU core 21 proceeds to the next step S16.

At step S16, the CPU core 21 awaits a touch panel input from the player. As used herein, a "touch panel input" in this process is an input made through a touch operation by the player using the touch panel 13 as an operation means. Then, the CPU core 21 determines whether the player has made a touch panel input or not (step S17). If a touch panel input has been made, a touch panel input process (step S18) is performed, and control proceeds to the next step S22. The detailed procedure of the touch panel input process at step S18 will be described later.

On the other hand, if no touch panel input is made at step S17, the CPU core 21 sets the defense line movement flag 2s (see FIG. 19) to "off" (step S19), and determines whether coordinate data exists in the trajectory data buffer 2k (see FIG. 19) (step S20). If coordinate data exists in the trajectory data buffer 2k, the CPU core 21 performs a trajectory action process (step S21), and control proceeds to the next step S22. The detailed procedure of the trajectory action process at step S21 will be described later. On the other hand, if no coordinate data exists in the trajectory data buffer 2k, the CPU core 21 proceeds to the next step S22.

Referring to FIG. 21, at step S22, the CPU core 21 performs an automatic control process for the player's team athletes (player objects). The automatic control process for the player's team athletes at step S22, whose detailed procedure of will be described later, is to be performed for any player's team athlete other than the athletes which are set as a switch-controllable athlete, a flicking action athlete, and a tracing action athlete described below. Next, the CPU core 21 performs an automatic control process for the enemy team athletes (enemy objects) (step S23). Then, in accordance with the results of the automatic control processes for the player objects and the enemy objects at steps S22 and S23, the CPU core 21 performs a movement control process for the ball (ball object) (step S24), and control proceeds to the next step. The processes of steps S23 and S24 are to be performed by the CPU core 21 using a predetermined thinking routine as in conventional techniques, and any detailed description thereof is omitted here.

Next, the CPU core 21 determines whether the current game situation satisfies a through-pass condition (step S25). For example, if a player object of the attribute value MF is keeping the ball object B, and a player object of the attribute value FW is positioned near the penalty area of the enemy team, it is determined that the through-pass condition is satisfied. The CPU core 21 can determine whether the through-pass condition is satisfied or not by referring to the player's team athlete data 2d and the ball coordinates 2h (see FIG. 18). If the through-pass condition is satisfied, the CPU core 21 proceeds to the next step S26. If the through-pass condition is not satisfied, control proceeds to the next step S27.

At step S26, in accordance with the through-pass state 2c4 described in the display size change table 2c, the CPU core 21 updates the displayed size which is stored in the player's team athlete data 2d. Specifically, the displayed size stored in any piece of player's team athlete data 2d having the attribute value FW relevant to the aforementioned through-pass condition (e.g., player's team athlete data 2d for a player object of the attribute value FW positioned near the penalty area of the enemy team) is set so as to be enlarged one step larger. The displayed size in the player's team athlete data 2d is set so that an athlete 2a21 of either the large size 2a2L, medium size 2a2M, or small size 2a2S contained in the 2D image data 2a2 is selected. For example, if the displayed size of a piece of player's team athlete data 2d having the attribute value FW relevant to the through-pass condition is currently set at the medium size 2a2M, the CPU core 21 sets the displayed size to the large size 2a2L. If the displayed size of a piece of player's team athlete data 2d having the attribute value FW relevant to the through-pass condition is currently set at the small size 2a2S, the CPU core 21 sets the displayed size to the medium size 2a2M. Then, the CPU core 21 proceeds to the next step S28. On the other hand, at step S27, if the displayed size has been changed due to the through-pass condition being met, the CPU core 21 restores the displayed size to the original size, and control proceeds to the next step S28. Thus, a player object to which a through-pass can be made will have its displayed size in the second game image increased relative to the other player objects.

Next, the CPU core 21 performs a match progression process (step S28), an image generation process for a first game image (step S29), and an image generation process for a second game image (step S30). The detailed procedures of the image generation processes at steps S29 and S30 will be described later. Then, the CPU core 21 determines whether the end of the match has been reached (step S31). If the match is to be continued, control returns to the aforementioned step S12 to continue with the process. If the match is to be ended, the main process in accordance with the flowchart is ended.

Referring to FIG. 22, the detailed procedure of the switch-controllable athlete selection process at step S12 will be described. First, the CPU core 21 determines whether a player's team athlete (player object) is keeping the ball (step S41). If a player's team athlete (player object) is keeping the ball, the CPU core 21 selects the player's team athlete as a switch-controllable athlete, and sets an athlete number which is designated for this athlete in the player's team athlete data 2d as the switch-controllable athlete number 2f (see FIG. 18) (step S42), and ends the processing of this subroutine.

On the other hand, if a player's team athlete (player object) is not keeping the ball, the CPU core 21 determines whether an operation switch 14 (e.g., the side switch (L button) 140 has been pressed (step S43). If the side switch 14f has been pressed, the CPU core 21 selects a player's team athlete as a switch-controllable athlete in accordance with a total number of times the side switch 14f has been pressed; sets an athlete number which is designated for this athlete in the player's team athlete data 2d as the switch-controllable athlete number 2f (step S44); and ends the processing of this subroutine. Through this process, a player object which is selected in accordance with a selection operation by the player is set as a switch-controllable athlete. For example, if the player's team which has been on the offense switches to defense, the player may operate the operation switches 14 to set a desired player object as a switch-controllable athlete. In the case where the side switch 14f is not pressed ("No" at step S43), the CPU core 21 retains the current setting as to the switch-controllable athlete, and ends the processing of this subroutine.

Although illustrations are omitted in order to avoid complication, if step S41 finds that a player's team athlete is not keeping the ball, a player's team athlete that is closest to the ball may automatically be selected as a switch-controllable athlete, and an athlete number which is designated for this athlete in the player's team athlete data 2d may be set as the switch-controllable athlete number 2f. Furthermore, a player's team athlete that is next closest to the ball may consecutively be selected in response to an operation of the side switch 14f.

Referring to FIG. 23, the detailed procedure of the switch input process at step S15 will be described. First, the CPU core 21 determines whether an input has been made by the player using the direction switch (cross key) 14c (step S51). If an input has been made using the direction switch 14c, the CPU core 21 proceeds to the next step S52. If no such input has been made, control proceeds to the next step S57.

At step S52, the CPU core 21 changes the position of the switch-controllable athlete in accordance with the input from the direction switch 14c. Specifically, by referring to a piece of player's team athlete data 2d corresponding to the athlete number which is set in the switch-controllable athlete number 2f, the CPU core 21 changes the position of the player's team athlete data 2d (game field coordinates (gx, gy)) in accordance with the input from the direction switch 14c. Next, the CPU core 21 determines whether the switch-controllable athlete is set as a flicking action athlete (step S53). This is determined based on whether the athlete number which is designated in the switch-controllable athlete number 2f coincides with any of the athlete numbers designated in the flicking action data 2m (see FIG. 19). If the switch-controllable athlete is being set as a flicking action athlete, the CPU core 21 deletes a piece of flicking action data 2m in which the athlete number of this athlete is designated (step S54), and proceeds to the next step S55. On the other hand, if the switch-controllable athlete is not set as a flicking action athlete, the CPU core 21 proceeds to the next step S55. Through the process of step S54, the player object is controlled so as to act while giving priority, over the flicking action (described later), to any further instruction for movement which is given by means of the direction switch 14c.

At step S55, the CPU core 21 determines whether the switch-controllable athlete is set as a tracing action athlete. This is determined based on whether the athlete number designated in the switch-controllable athlete number 2f coincides with any of the athlete numbers designated in the tracing action data 2l (see FIG. 19). If the switch-controllable athlete is set as a tracing action athlete, the CPU core 21 deletes a piece of tracing action data 2l in which the athlete number of this athlete is designated (step S56), and ends the processing of this subroutine. On the other hand, if the switch-controllable athlete is not set as a tracing action athlete, the processing of this subroutine is ended. Through the process of step S56, the player object is controlled so as to act while giving priority, over the tracing action (described later), to any further instruction for movement which is given by means of the direction switch 14c.

On the other hand, if no input has been made using the direction switch 14c, the CPU core 21 proceeds to step S57. At step S57, the CPU core 21 determines whether the switch-controllable athlete is keeping the ball. If the switch-controllable athlete is keeping the ball, the CPU core 21 causes the switch-controllable athlete to make an action which is in accordance with the manner in which the operation switch section 14 is operated. Specifically, if the player has operated the operation switch (A button) 14a ("Yes" at step S58), the CPU core 21 causes the switch-controllable athlete to make a passing action (step S60), and ends the processing of this subroutine. If the player has operated the operation switch (B button) 14b ("Yes" at step S59), the CPU core 21 causes the switch-controllable athlete to make a shooting action (step S61), and ends the processing of this subroutine. On the other hand, if the switch-controllable athlete is not keeping the ball, or no input has been made from the operation switch 14a or 14b, the CPU core 21 ends the processing of this subroutine. Through the processes of steps S51 to S61, the player object which is set as the switch-controllable athlete is controlled to act in accordance with an input from the operation switch section 14.

Referring to FIGS. 24 to 27, the detailed procedure of the touch panel input process at step S18 will be described. In FIG. 24, the CPU core 21 determines whether the defense line movement flag 2s is on (step S71). If the defense line movement flag 2s is off, the CPU core 21 proceeds to the next step S74. On the other hand, if the defense line movement flag 2s is on, the CPU core 21 converts the coordinates at which the player is currently touching the touch panel 13 (hereinafter referred to as "touch panel coordinates") to game field coordinates (step S72), and proceeds to the next step. Hereinafter, with reference to FIG. 34, the relationship between touch panel coordinates and game field coordinates will be described.

In FIG. 34, the touch panel 13 has a coordinate system corresponding to the coordinate system of the second VRAM 25 as described above, and outputs data of position coordinates corresponding to a position which is input by the player through a touch operation. For example, the touch panel 13 is provided so as to cover the entire display area of the second LCD 12, in which touch panel coordinates (tx, ty) are defined. The touch panel coordinate (tx) indicates a position along the lateral direction (i.e., the horizontal direction in FIG. 34) on the second LCD 12, whereas the touch panel coordinate (ty) indicates a position along the vertical direction on the second LCD 12 (i.e., the vertical direction in FIG. 34). On the other hand, game field coordinates define a coordinate system corresponding to the entire area of the soccer field which is set in the game space, such that the positions of player objects, enemy objects, and the like are to be designated within this coordinate system. For example, game field coordinates (gx, gy) are defined in the soccer field which is set in the game space as plan-viewed from above. The game field coordinate (gx) indicates a position along a direction which is parallel to the side lines (touch lines) in the soccer field (i.e., the horizontal direction in FIG. 34), whereas the game field coordinate (gy) indicates a position along a direction which is parallel to the goal lines in the soccer field (i.e., the vertical direction in FIG. 34). The conversion from touch panel coordinates to game field coordinates is performed by using a predetermined coordinate conversion function which maps any point expressed by touch panel coordinates to a corresponding point on the game field in the second LCD 12.

Referring back to FIG. 24, after the process of step S72, the CPU core 21 performs a process of translating the defense line (step S73), and proceeds to the next step S74. The trajectory data (FIG. 19) which is designated in the defense line action data 2n is composed of a plurality of pieces of game field coordinate data, as described later. The defense line is to be translated along the gx direction by adding or subtracting a predetermined value to or from the gx value of each coordinate point constituting the trajectory data. Specifically, attention is paid to the gy value of the game field coordinates (gx, gy) which have been obtained through the conversion at step S72. In the trajectory data for the defense line, a coordinate point having the same gy value as this gy value is selected (this coordinate point will be referred to as the "coordinate point DY"). Next, the gx value of the game field coordinates (gx, gy) which have been obtained through the conversion at step S72 is compared against the gx value of the coordinate point DY, and a difference therebetween is defined as dx. Then, the difference dx is added to the gx value of each coordinate point in the trajectory data for the defense line action data 2n. Thus, in accordance with the player's drag operation, the CPU core 21 calculates trajectory data for translating the defense line along a direction which interconnects the goals on the soccer field.

At step S74, the CPU core 21 determines whether the player has touched a coordinate point on the game field in the second LCD 12. In other words, it is determined whether the touch panel coordinates which are currently being touched by the player are within the soccer field represented by the second game image displayed on the second LCD 12. If the touch panel coordinates fall within the soccer field, the CPU core 21 proceeds to the next step S75. If the touch panel coordinates fall outside the soccer field, control proceeds to the next step S91.

At step S75, the CPU core 21 converts the touch panel coordinates which are currently being touched by the player to game field coordinates. Next, the CPU core 21 determines whether an input has been made by the player using the side switch (R button) 14g (step S76). If an input has been made using the side switch 14g, the CPU core 21 sets the enlargement flag 2t (see FIG. 19) to "on", sets the game field coordinates obtained by converting the touch panel coordinates as central coordinates for enlargement 2*u* (see FIG. 19) (step S77), and ends the processing of this subroutine. As a result, a flag indicating that enlargement is to be performed for the second game image to be displayed on the second LCD 12 and central coordinates used for the enlargement are set. Note that, at step S76, the operation switch section 14 which is used by the CPU core 21 to determine whether enlargement is to be performed may be other than the side switch 14*g*. On the other hand, if no input has been made using the side switch 14*g*, the CPU core 21 proceeds to the next step S78.

At step S78, the CPU core 21 determines whether coordinate data exists in the trajectory data buffer 2*k* (see FIG. 19). If coordinate data exists in the trajectory data buffer 2*k*, the CPU core 21 proceeds to the next step S79. On the other hand, if no coordinate data exists in the trajectory data buffer 2*k*, the CPU core 21 proceeds to the next step S82. It is while a sequence of trajectory inputs are being continuously made that coordinate data exists in the trajectory data buffer 2*k*. On the other hand, it is when a first touch operation for a sequence of trajectory inputs has just been made that no coordinate data exists in the trajectory data buffer 2*k*.

At step S79, the CPU core 21 determines whether the count of the sampling timer 2*r* (see FIG. 19) has reached a predetermined amount of time (e.g., 16 ms) or above. If the count of the sampling timer 2*r* is equal to or greater than the predetermined amount of time, the CPU core 21 additionally stores to the trajectory data buffer 2*k* the game field coordinates which are obtained through the conversion at step S75 (step S80). Then, after clearing the sampling timer 2*r*, the CPU core 21 causes counting to be started (step S81), and ends the processing of this subroutine. On the other hand, if the count of the sampling timer 2*r* is less than the predetermined amount of time, the CPU core 21 ends the processing of this subroutine. Through repetitions of the processes of steps S79 to S81, game field coordinates obtained by converting the touch panel coordinates as touched by the player in every predetermined amount of time is sampled at the interval of 16 ms, and is stored to the trajectory data buffer 2*k*.

At step S78, if no coordinate data exists in the trajectory data buffer 2*k*, the CPU core 21 proceeds to the next step S82. At step S82, the CPU core 21 performs a touch-controllable athlete selection process (step S82), and proceeds to the next step. Hereinafter, with reference to FIG. 26, the touch-controllable athlete selection process will be described.

In FIG. 26, in accordance with the position and displayed size designated in each piece of player's team athlete data 2*d*, the CPU core 21 sets a judgment region for the athlete (player object) (step S111), and proceeds to the next step. Note that the judgment region is to be set by using one size of judgment region data 2*b* (large size 2*b*L, medium size 2*b*M, or small size 2*b*S). The size is to be selected in accordance with the displayed size designated in the player's team athlete data 2*d*. For example, if the displayed size in the player's team athlete data 2*d* is set at the large size 2*a*2L, then the large size 2*b*L of judgment region data 2*b* is used for the player's team athlete judgment region. By using a position designated in the player's team athlete data 2*d* as a central position, judgment region data 2*b* corresponding to the displayed size is pasted, whereby a judgment region on the game field coordinate system is set (e.g., areas shown by broken lines in FIG. 6).

Next, the CPU core 21 determines whether game field coordinates (game field coordinates corresponding to the touched position) obtained through the conversion at step S75 fall within the judgment region which has been set at step S111 (step S112). If the game field coordinates fall within the judgment region, the CPU core 21 nominates the player's team athlete for which the judgment region has been set at step S111 as a candidate athlete (step S113), and proceeds to the next step S114. On the other hand, if the game field coordinates do not fall within the judgment region, the CPU core 21 proceeds to the next step S114.

At step S114, the CPU core 21 determines whether the processes of steps S111 and S112 have been performed for every player's team athlete. If any unprocessed player's team athlete is still left, the CPU core 21 returns to step S111 to repeat the process for the other player's team athlete(s). On the other hand, if the process has been performed for all player's team athletes, among the candidate athletes which have been nominated at step S113, the CPU core 21 sets the candidate athlete whose symbolized representation's outer periphery lies closest to the game field coordinates obtained through the conversion at step S75 as a touch-controllable athlete, sets an athlete number designated for this athlete in the player's team athlete data 2*d* as the touch-controllable athlete number 2*g* (see FIG. 18) (step S115), and ends the processing of this subroutine. Through these processes, as shown in FIG. 6, on the field, a player object whose judgment region accommodates a touch operation start point and the outer periphery of whose symbolized representation lies closest to the touch operation start point is set as a touch-controllable athlete.

Referring back to FIG. 24, after the process of step S82, the CPU core 21 clears the trajectory input timer 2*q*, and thereafter causes counting to be started (step S83). Thus, a duration for which a sequence of trajectory inputs is continued is measured. Next, the CPU core 21 stores to the trajectory data buffer 2*k* the game field coordinates obtained through the conversion at step S75 (step S84). Then, after clearing the sampling timer 2*r*, the CPU core 21 causes counting to be started (step S85), and ends the processing of this subroutine.

In FIG. 25, if the touch panel coordinates fall outside the soccer field, the CPU core 21 proceeds to the next step S91. In other words, the process of step S91 and the subsequent steps are processes to be performed in the case where the player has performed a touch operation outside the soccer field represented by the second game image displayed on the second LCD 12. The CPU core 21 determines whether the touch panel coordinates which are currently being touched by the player coincide with any of the following positions: a defense line K (see FIG. 10; step S91); a displayed position of the offense button OB (see FIG. 4; step S92); a displayed position of the defense button DB (see FIG. 5; step S93); a displayed position of the mark button MB (see FIG. 11; step S94); and a displayed position of the display-all-area button AB (see FIG. 16; step S95).

If the touch panel coordinates which are currently being touched by the player are on the defense line K ("Yes" at step S91), the CPU core 21 sets the defense line movement flag 2*s* to "on" (step S96), and ends the processing of this subroutine.

If the touch panel coordinates which are currently being touched by the player are at the displayed position of the offense button OB ("Yes" at step S92), the CPU core 21 refers to the description in the display size change table 2*c* corresponding to the case where an offense button operation is performed (2*c*1), and accordingly updates the displayed sizes stored in the player's team athlete data 2*d*. Specifically, the CPU core 21 sets the displayed sizes of any pieces of player's team athlete data 2*d* having the attribute values FW and MF to medium size, and sets the displayed sizes of any pieces of player's team athlete data 2*d* having the attribute values DF and GK to small size. Thus, when the player has touch-operated the offense button OB, the player objects which are responsible for the offense have their displayed sizes in the second game image set so as to be relatively large as compared to the other player objects. Then, the CPU core 21 ends the processing of this subroutine.

If the touch panel coordinates which are currently being touched by the player are at the displayed position of the defense button DB ("Yes" at step S93), the CPU core 21 refers to the description in the display size change table 2c corresponding to the case where a defense button operation has been performed (2c2), and accordingly updates the displayed sizes stored in the player's team athlete data 2d. Specifically, the CPU core 21 sets the displayed sizes of any pieces of player's team athlete data 2d having the attribute values DF and GK to medium size, and sets the displayed sizes of any pieces of player's team athlete data 2d having the attribute values FW and MF to small size. Thus, when the player has touch-operated the defense button DB, the player objects which are responsible for the defense have their displayed sizes in the second game image set so as to be relatively large as compared to the other player objects. Then, the CPU core 21 ends the processing of this subroutine.

If the touch panel coordinates which are currently being touched by the player are at the displayed position of the mark button MB ("Yes" at step S94), the CPU core 21 performs a mark button process (step S99). Hereinafter, the mark button process will be described with reference to FIG. 27.

In FIG. 27, the CPU core 21 refers to the description in the display size change table 2c corresponding to the first phase of the case where a mark button operation has been performed (2c3), and accordingly updates the displayed sizes stored in the enemy team athlete data 2e (see FIG. 18) (step S121). Specifically, the CPU core 21 sets the displayed sizes of any pieces of enemy team athlete data 2e having the attribute values FW and MF to medium size, and sets the displayed sizes of any pieces of enemy team athlete data 2e having the attribute values DF and GK to small size. Next, the CPU core 21 awaits a further touch panel input from the player (step S122), and accepts a further input of touch panel coordinates indicative of the displayed position of an enemy team athlete (enemy object) having the attribute value FW or MF in the second game image (steps S123 and S124).

At step S124, if a further input of touch panel coordinates is made which are indicative of the displayed position of an enemy team athlete of the attribute value FW or MF, the CPU core 21 determines the enemy team athlete which is designated by the touch panel coordinates as a target of marking (step S125). Next, the CPU core 21 restores the displayed size of the enemy team athlete data 2e as set at step S121 to the original size (step S126). Specifically, the CPU core 21 sets the displayed sizes of any pieces of enemy team athlete data 2e having the attribute values FW and MF to small size.

Next, the CPU core 21 refers to the description in the display size change table 2c corresponding to the second phase of the case where a mark button operation has been performed (2c3), and accordingly updates the displayed sizes stored in the player's team athlete data 2d (step S127). Specifically, the CPU core 21 sets the displayed sizes of any pieces of player's team athlete data 2d having the attribute value DF to medium size, and sets the displayed sizes of any pieces of player's team athlete data 2d having the attribute value FW, MF, and GK to small size. Then, the CPU core 21 awaits a further touch panel input from the player (step S128), and accepts a further input of touch panel coordinates indicative of the displayed position of a player's team athlete (player object) having the attribute value DF in the second game image (steps S129 and S130).

At step S130, if a further input of touch panel coordinates is made which are indicative of the displayed position of a player's team athlete having the attribute value DF, the CPU core 21 writes, into the mark data in a piece of player's team athlete data 2d corresponding to that player's team athlete, the athlete number of the enemy team athlete which has been set as a target of marking at step S125. Next, the CPU core 21 restores the displayed size of the player's team athlete data 2d as set at step S127 to the original size (step S132), and ends the processing of this subroutine. Specifically, the CPU core 21 sets the displayed sizes of any pieces of player's team athlete data 2d having the attribute value DF to small size. Thus, when the player has touch-operated the mark button MB, enemy objects which could become targets of marking and the player objects capable of performing the marking have their displayed sizes in the second game image set so as to become relatively large as compared to the other player objects at their respective selection timings. In a manner similar to the above description of FIG. 26, the determinations at steps S124 and S130 are made by relying on judgment regions which are set in accordance with the displayed size data.

Referring back to FIG. 25, if the touch panel coordinates which are currently being touched by the player are at the displayed position of the display-all-area button AB ("Yes" at step S95), the CPU core 21 sets the enlargement flag 2t (see FIG. 19) to "off" (step S100), and ends the processing of this subroutine. If the results of the determinations at steps S91 to S95 are all "No", the CPU core 21 ends the processing of this subroutine.

With reference to FIG. 28, the detailed procedure of the trajectory action process at step S21 will be described. In FIG. 28, the CPU core 21 causes the trajectory input timer 2q to stop counting (step S141). Next, the CPU core 21 determines whether the coordinate data 2k1, 2k2, etc., stored in the trajectory data buffer 2k lie astride both side lines (touch lines) of the soccer field (step S142). If the coordinate data 2k1, 2k2, etc., lie astride both side lines, the CPU core 21 moves the coordinate data 2k1, 2k2, etc., stored in the trajectory data buffer 2k to the trajectory data 2n1 in the defense line action data 2n (step S143), and proceeds to the next step S149. On the other hand, if the coordinate data 2k1, 2k2, etc., stored in the trajectory data buffer 2k do not lie astride both side lines, the CPU core 21 proceeds to the next step S144.

At step S144, the CPU core 21 determines whether the count (time data) by the trajectory input timer 2q, which has stopped counting at step S141, is less than a predetermined amount of time (e.g., one second). If the count of the trajectory input timer 2q is less than the predetermined amount of time, the CPU core 21 extracts, from among the coordinate data 2k1, 2k2, etc., which are recorded in the trajectory data buffer 2k, a coordinate point ("first coordinate point") which was recorded in the buffer at the oldest point in time and a coordinate point ("last coordinate point") which was recorded in the buffer at the latest point in time. Next, the CPU core 21 calculates a vector from the first coordinate point to the last coordinate point, and stores a set of the athlete number designated in the touch-controllable athlete number 2g and the calculated vector data as a set of an athlete number and a flicking vector in the flicking action data 2m (e.g., flicking action data 2m1; see FIG. 19) (step S145). The, the CPU core 21 activates a flicking action process (described later) (step S146), and proceeds to the next step S149. If only one piece of coordinate data is stored in the trajectory data buffer 2k, a zero vector is to be stored as the flicking vector.

On the other hand, if step S144 finds that the count of the trajectory input timer 2q is equal to or greater than the predetermined amount of time, the CPU core 21 records a set of the athlete number designated in the touch-controllable athlete number 2*g* and the coordinate data 2*k*1, 2*k*2, etc., which are recorded in the trajectory data buffer 2*k*, as a set of an athlete number and trajectory data in the tracing action data 2*l* (e.g., tracing action data 2/1; see FIG. 19) (step S147). Then, the CPU core 21 activates a tracing action process (described later) (step S148), and proceeds to the next step S149.

At step S149, the CPU core 21 clears coordinate data 2*k*1, 2*k*2, etc., stored in the trajectory data buffer 2*k*, and ends the processing of this subroutine.

Referring to FIG. 29, the detailed procedure of the automatic control process for the player's team athletes at step S22 will be described. First, the CPU core 21 selects one of the plurality of player's team athletes (player objects), and determines whether the player's team athlete is a switch-controllable athlete (step S151), a flicking action athlete (step S152), or a tracing action athlete (step S153). These determinations can be made by checking whether the athlete number designated for the selected player's team athlete is designated in the switch-controllable athlete number 2*f*, the flicking action data 2*m*, or the tracing action data 2*l*. Then, if the selected player's team athlete is any of the above athletes ("Yes" at one of steps S151 to S153), the CPU core 21 proceeds to the next step S160 (i.e., no process is performed with respect to the player's team athlete). On the other hand, if the selected player's team athlete corresponds to none of the above athletes ("No" at all of steps S151 to S153), the CPU core 21 proceeds to the next step S154.

At step S154, the CPU core 21 determines whether the athlete number of an enemy team athlete to be marked is designated in the player's team athlete data 2*d* of the selected player's team athlete. If the athlete number of an enemy team athlete to be marked is designated in the player's team athlete data 2*d*, the CPU core 21 controls the player's team athlete so as to move toward the enemy team athlete (step S155), and proceeds to the next step S160. Specifically, the movement control is performed so that the position data (game field coordinates) in the player's team athlete data 2*d* is brought closer to the position data (game field coordinates) in the enemy team athlete data 2*e* by a predetermined distance (after moving by the predetermined distance, the player's team athlete follows the enemy team athlete).

On the other hand, if the athlete number of an enemy team athlete is not designated in the player's team athlete data 2*d* of the selected player's team athlete, the CPU core 21 determines whether trajectory data 2*n*1 exists in the defense line action data 2*n* (step S156). If any trajectory data 2*n*1 exists in the defense line action data 2*n*, the CPU core 21 determines whether the attribute value of the player's team athlete data 2*d* of the selected player's team athlete is DF (step S157). If the attribute value is DF, the selected player's team athlete is controlled so as to move toward the defense line by a predetermined distance (step S158), and control proceeds to the next step S160. Specifically, the movement control is performed so that the gx value of the game field coordinates in the player's team athlete data 2*d* is brought closer by a predetermined amount to the gx value of the coordinate data (among the coordinate data in the trajectory data 2*n*1 in the defense line action data 2*n*) that has the same gy value as the gy value of the game field coordinates in the player's team athlete data. On the other hand, if no trajectory data 2*n*1 exists in the defense line action data 2*n*, or if the attribute value is not DF, the CPU core 21 controls the movement of the selected player's team athlete according to a predetermined algorithm (step S159), and proceeds to the next step S160. The process of step S159 is to be performed by the CPU core 21 using a predetermined thinking routine as in conventional techniques, and any detailed description thereof is omitted here.

At step S160, the CPU core 21 determines whether the process has been completed for every player's team athlete. If any unprocessed player's team athlete is still left, the CPU core 21 returns to step S151 to repeat the process for the other player's team athlete(s). On the other hand, if the process has been performed for all player's team athletes, the CPU core 21 ends the processing of this subroutine.

Next, referring to FIG. 30, the tracing action process will be described. The tracing action process, which is to be performed in parallel to the main process as mentioned earlier, is begun when the CPU core 21 processes step S148. If there is a plurality of player objects to be subjected to the tracing action process, each one of them is processed in parallel. For example, if the player object P1 and the player object P2 are in a tracing action state, the tracing action process for the player object P1 and the tracing action process for the player object P2 are performed in parallel. In other words, as many instances of the tracing action process as there are sets of athlete numbers and trajectory data stored in the tracing action data 2*l* are activated.

In FIG. 30, the CPU core 21 clears the tracing action timer 2*o* (see FIG. 19), and thereafter causes counting to be started (step S171). Next, the CPU core 21 moves a player's team athlete (hereinafter referred to as a "tracing action athlete") having an athlete number designated in the tracing action data 2*l* to a coordinate point which is recorded at the beginning of the trajectory data corresponding to the athlete number (step S172). Then, the CPU core 21 deletes the coordinate data used at step S172 (step S173), and proceeds to the next step. By deleting the coordinate data which has been used, the next piece of coordinate data comes to the beginning, so that this next piece of coordinate data will be referred to at the next run of step S172. Thus, the coordinate data in the trajectory data are referred to in a sequential order.

Next, the CPU core 21 determines whether any trajectory data exists in the tracing action data 2*l* (step S174). If there exists any trajectory data, the CPU core 21 waits for the count of the tracing action timer 2*o* to equal a predetermined amount of time (step S175), and thereafter returns to the aforementioned step S172 to continue with the process. On the other hand, if there exists no trajectory data, the CPU core 21 causes the tracing action timer 2*o* to stop counting (step S176), deletes the tracing action data 2*l* (including the athlete number) used in this flowchart (step S177), and ends the process according to this flowchart. Thus, the tracing action athlete is processed so as to move in the game field in every predetermined amount of time, along a trajectory along which the player has touched the touch panel 13.

Next, with reference to FIG. 31, the flicking action process will be described. The flicking action process, which is to be performed in parallel to the main process as mentioned earlier, is begun when the CPU core 21 processes step S146. If there is a plurality of player objects to be subjected to the flicking action process, each one of them is processed in parallel, as is the case with the tracing action process.

In FIG. 31, the CPU core 21 clears the flicking action timer 2*p* (see FIG. 19), and thereafter causes counting to be started (step S181). Next, the CPU core 21 moves a player's team athlete (hereinafter referred to as a "flicking action athlete) having an athlete number designated in the flicking action data 2*m* by a predetermined distance in accordance with the flicking vector which is designated in the flicking action data 2*m* (step S182). Then, the CPU core 21 waits for the count of the flicking action timer 2*p* to equal a predetermined amount of time (step S183), and thereafter determines whether the counting has reached a flicking action time Th (step S184). The CPU core 21 repeats steps S182 and S183 until the count of the flicking action timer 2p reaches the flicking action time Th. Once the flicking action time Th is reached, the CPU core 21 proceeds to the next step S185. As used herein, the flicking action time Th refers to a predetermined amount of time during which the flicking action athlete keeps moving in accordance with the flicking vector.

At step S185, the CPU core 21 causes the flicking action timer 2p to stop counting. Then, the CPU core 21 deletes the flicking action data 2m (including the athlete number) which was used in this flowchart (step S186), and ends the process according to this flowchart. Thus, the flicking action athlete is processed so as to move in the game field in a direction in which the player has touched the touch panel 13 (flicking operation), until reaching the flicking action time Th.

Referring to FIG. 32, the detailed procedure of the image generation process for a first game image of step S29 will be described. In FIG. 32, the CPU core 21 sets a virtual camera at a position in the game space for viewing the switch-controllable athlete which is positioned on the game field (step S191). Next, by using the field image data 2a13 contained in the 3D image data 2a1, the CPU core 21 generates a 3D soccer field (game field) image as viewed from the virtual camera, and writes this image into the first VRAM 23 via the first GPU 24 (step S192). Moreover, in accordance with the positions (game field coordinates) which are respectively set for the player's team athletes and the enemy team athletes, the CPU core 21 deploys the athletes on the game field. Then, by using the athlete image data 2a11 contained in the 3D image data 2a1, the CPU core 21 generates 3D athlete images (player objects and enemy objects) as viewed from the virtual camera at the respective deployment positions in accordance with their operational statuses and the like, and writes these images into the first VRAM 23 via the first GPU 24 (step S193). Furthermore, in accordance with the ball coordinates 2h which are designated for the ball, the CPU core 21 deploys the ball in the game field. Then, by using the ball image data 2a12 contained in the 3D image data 2a1, a 3D ball image (ball object) as viewed from the virtual camera at the deployment position, and this image is written into the first VRAM 23 via the first GPU 24 (step S194). Moreover, the CPU core 21 adds a predetermined mark (e.g., a solid triangle) above the head of a player object corresponding to the switch-controllable athlete, writes such an image to the first VRAM 23 via the first GPU 24 (step S195), and ends the processing of this subroutine. Through this procedure, the images which are written into the first VRAM 23 are represented as the first game image. Since the image generation process for the first game image is similar to conventional image generation processes based on the game parameters which are set for each object, no further description thereof is provided herein.

Referring to FIG. 33, the image generation process for a second game image of the detailed procedure of step S30 will be described. In FIG. 33, the CPU core 21 determines whether an enlargement flag 2t is set to "on" (step S201). If the enlargement flag 2t is "on", the CPU core 21 enlarges the field image data 2a23 contained in the 2D image data 2a2 by a predetermined factor, around the central coordinates for enlargement 2u, thus generating a 2D soccer field (game field) image. The CPU core 21 writes this image into the second VRAM 25 via the second GPU 26 (step S202). Then, the CPU core 21 proceeds to the next step S204. On the other hand, if the enlargement flag 2t is "off", the CPU core 21 generates a 2D soccer field (game field) image by using the entire area of the field image data 2a23 contained in the 2D image data 2a2, and writes this image into the second VRAM 25 via the second GPU 26 (step S203). Then, the CPU core 21 proceeds to the next step S204.

At step S204, in accordance with the positions (game field coordinates) which are respectively set for the player's team athletes and the enemy team athletes, the CPU core 21 deploys the athletes on the game field. By using the athlete image data 2a21 contained in the 2D image data 2a2 of the displayed size respectively set therefor, 2D athlete images (symbolized player objects and enemy objects) are generated at the deployment positions, and written into the second VRAM 25 via the second GPU 26. In accordance with the ball coordinates 2h which are designated for the ball, the CPU core 21 deploys the ball in the game field. Then, by using the ball image data 2a22 contained in the 2D image data 2a2, a 2D ball image (symbolized ball object) is generated at the deployment position, and this image is written into the second VRAM 25 via the second GPU 26 (step S205), and control proceeds to the next step.

Next, the CPU core 21 determines whether trajectory data 2n1 exists in the defense line action data 2n (step S206). If trajectory data 2n1 exists in the defense line action data 2n, the CPU core 21 generates a defense line in a corresponding position on the game field in accordance with the trajectory data 2n1, writes this image into the second VRAM 25 via the second GPU 26 (step S209), and proceeds to the next step S207. On the other hand, if no trajectory data 2n1 exists in the defense line action data 2n, the CPU core 21 proceeds to the next step S207.

At step S207, the CPU core 21 determines whether there exists any tracing action data 2l. If any tracing action data 2l exists, the CPU core 21 generates a trajectory in a corresponding position on the game field in accordance with the trajectory data in the tracing action data 2l, writes this image into the second VRAM 25 via the second GPU 26 (step S210), and proceeds to the next step S208. On the other hand, if no tracing action data 2l exists, the CPU core 21 proceeds to the next step S208. If there exists a plurality of pieces of tracing action data, an image is drawn for each one of them.

At step S208, the CPU core 21 determines whether any coordinate data exists in the trajectory data buffer 2k. If any coordinate data exists, the CPU core 21 generates a trajectory in a corresponding position on the game field in accordance with the coordinate data, writes this image into the second VRAM 25 via the second GPU 26 (step S211), and ends the processing of this subroutine. On the other hand, if no coordinate data exists, the CPU core 21 ends the processing of this subroutine. Through this procedure, the images which are written into the second VRAM 25 are represented as the second game image. Since the image generation process for the second game image is similar to conventional image generation processes based on the game parameters which are set for each object, no further description thereof is provided herein.

(Second Exemplary Non-Limiting Implementation)

Figure 35:
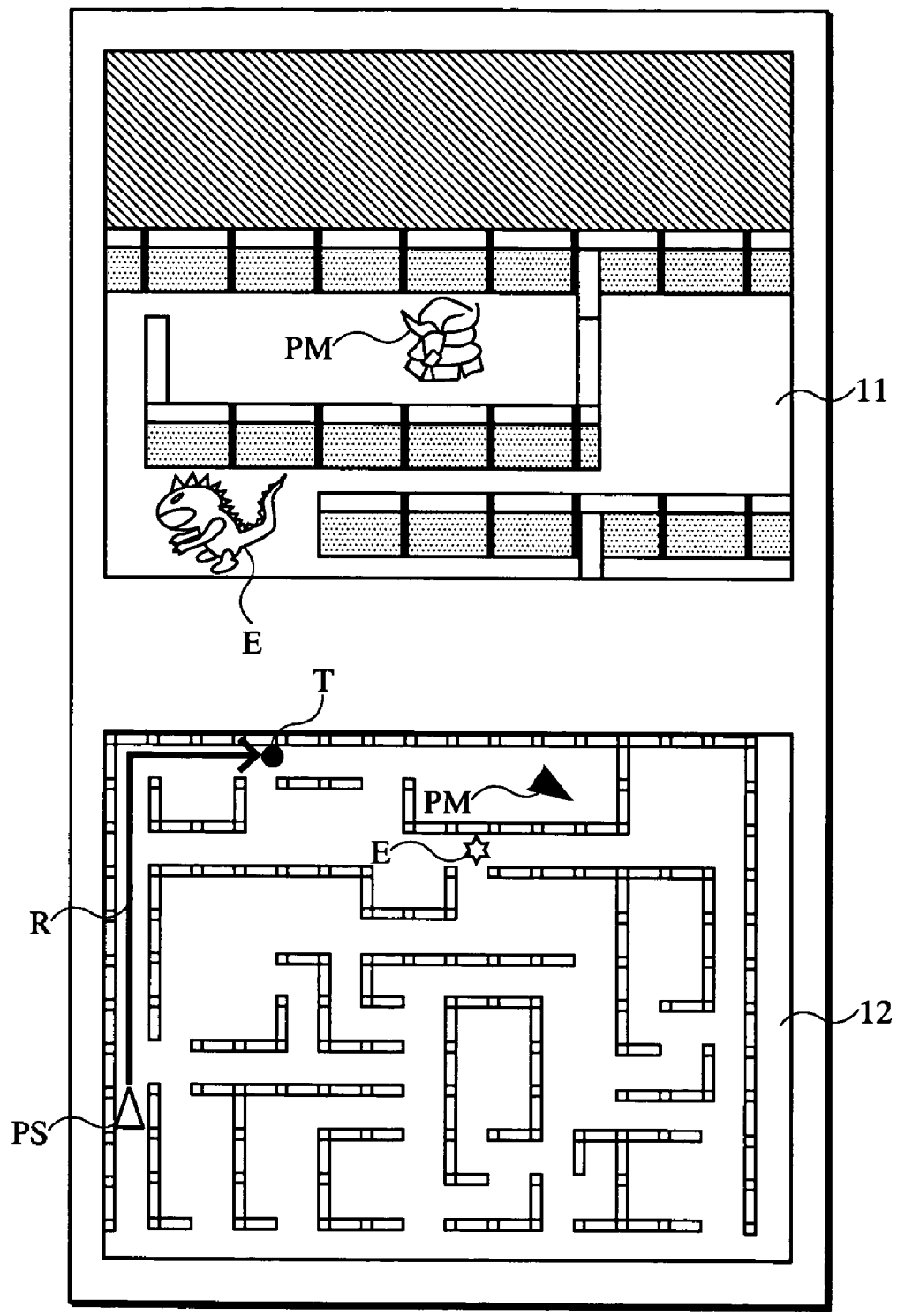
FIG. 35 is a diagram showing exemplary game images to be displayed on a first LCD 11 and a second LCD 12 according to a second exemplary non-limiting implementation.
Figure 36:
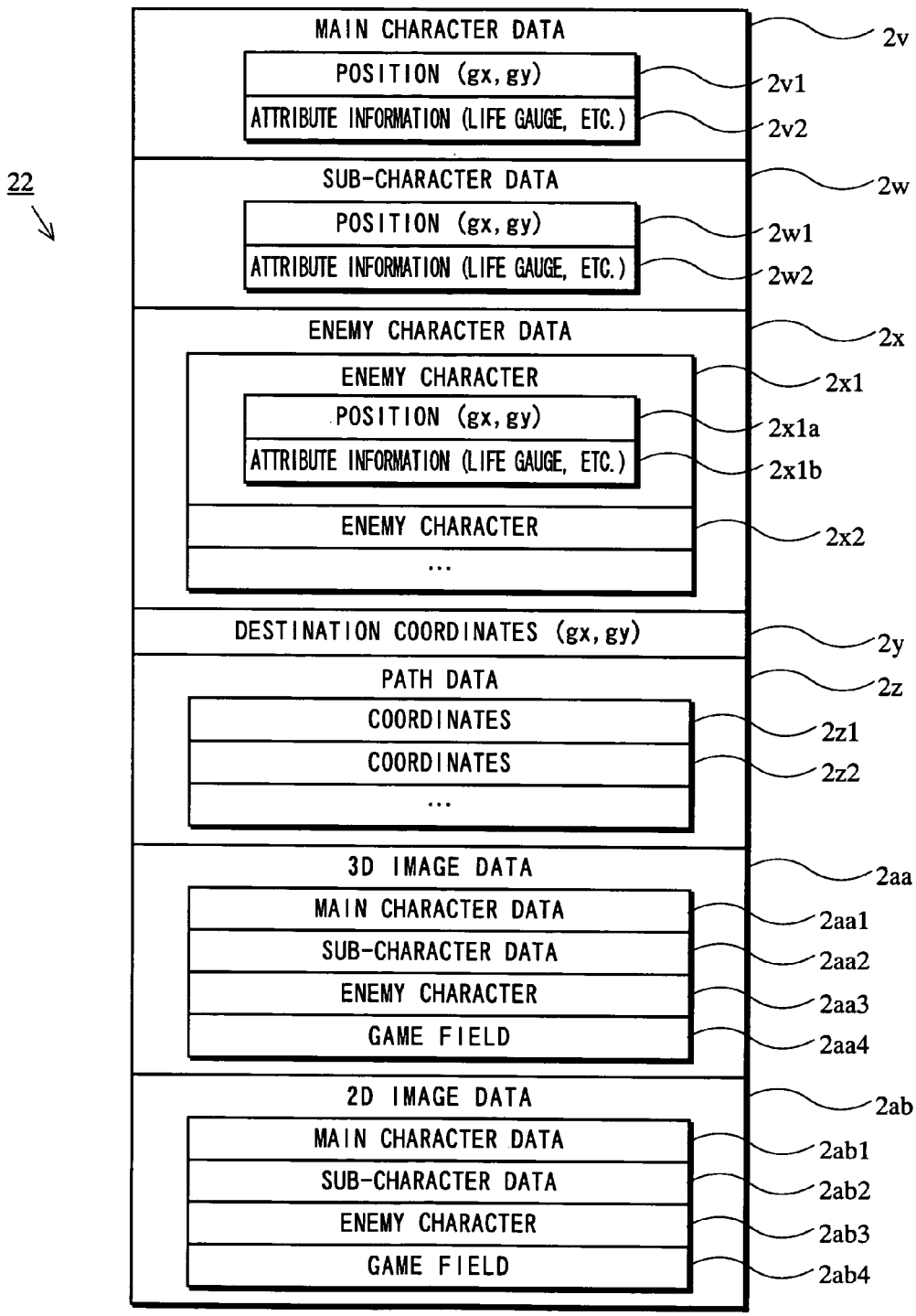
FIG. 36 is a RAM image diagram of a WRAM 22 according to the second exemplary non-limiting implementation.

Hereinafter, a game apparatus which executes a game program according to a second exemplary non-limiting implementation of the present exemplary non-limiting implementation will be described with reference to FIGS. 35 to 42. The game which is provided by the game program according to the second exemplary non-limiting implementation is an action game in which a main character PM (main object) and a sub-character PS (sub-object) appear in a game space as player objects which are controllable by the player. FIG. 35 is a diagram showing exemplary game images to be displayed on the first LCD 11 and the second LCD 12. FIG. 36 is a RAM image diagram of the WRAM 22. FIGS. 37 to 42 are flowcharts which are to be executed by the game apparatus 1 in accordance with the game program.

FIG. 35 show an exemplary first game image to be displayed on the first LCD 11 and an exemplary second game image to be displayed on the second LCD 12. The first game image is an enlarged 3D expression of a part of a game field which is provided in the game space. The second game image is a 2D image expression of the same game field. The second game image is a 2D expression of the game space as plan-viewed from above, such that each object acts similarly in both images. In other words, the first and second game images are directed to the same game space. The second game image is a radar representation of all or part of the game field which is set in the game space. Thus, the present exemplary non-limiting implementation illustrates an example where the first game image is presented as a 3D expression and the second game image is presented as a 2D expression of the game field in the game space. Alternatively, both game images may be 2D expressions, or both game images may be 3D expressions.

In the present game, a main character PM and a sub-character PS appear in the game field as player objects that are controllable by the player. The main character PM is controllable by the player using the operation switch section 14 ("switch-operable object"). The sub-character PS is controllable by the player using the touch panel 13 ("touch-operable object"). As a character which acts in accordance with the computer's thinking routine, an enemy character(s) E appears in the game field.

The first game image offers a 3D representation of a main character PM and the game field, the main character PM being shown in a substantially central position. The first game image also offers a 3D representation of any other character which is positioned in the portion of the game field being displayed in the first game image (e.g., the enemy character E in FIG. 35).

The second game image is a radar representation, as plan-viewed from above, of all or part of the game field which is set in the game space. The second game image shows the characters deployed in the game field, each being in a symbolized form. For example, in FIG. 35, the main character PM is symbolized as a solid triangle, the sub-character PS as a blank triangle, and the enemy character E as a star. Each of the main character PM and the other characters (e.g., the enemy character E) which are shown in the first game image is symbolized at the same position on the game field as in the first game image.

The player controls the main character PM by using the operation switch section 14, e.g., the operation switch (A button) 14a, the operation switch (B button) 14b, and the direction switch (cross key) 14c. For example, in accordance with the player's operation using the direction switch 14c, the main character PM may move in the game field. In accordance with the player's operation using the operation switch 14a, the main character PM may attack the enemy character E. If no operation is performed using the operation switch section 14, the main character PM does not make any action (i.e., neither moves nor attacks). Since the main character PM will eventually be attacked by the enemy character if the main character PM is left in such an inactive state, the player cannot leave the main character PM alone for a long time without performing any operation. Accordingly, the player mainly will control the main character PM mainly by using the operation switch section 14. As described above, a 3D image of the main character PM is always displayed at the substantially central position in the first game image. Therefore, the player controls the operation switch section 14 mainly by looking at the first game image, and the result of the operation is to be reflected in the first game image. If the symbolized representation of the main character PM is being displayed in the second game image, the result of the player's operation using the operation switch section 14 is also reflected in the second game image, in the form of a movement or the like of the symbolized representation of the main character PM.

On the other hand, the player controls the sub-character PS by using the touch panel 13. For example, if the player has performed a touch operation for the touch panel 13 so as to touch on a point T in the game field shown in the second game image, a route R from the current position to the point T is calculated by using a predetermined thinking routine route R, and the sub-character PS moves in the game field along the route R. Note that the sub-character PS automatically acts even in the absence of the player's operation, and therefore player does not need to perform any touch panel operation for a while, and may concentrate on controlling the main character PM using the operation switch section 14. If the sub-character PS is positioned in the portion of the game field being displayed in the first game image, the result of the player's operation using the touch panel 13 is reflected in the first game image in the form of a movement or the like of the 3D representation of the sub-character PS.

Thus, the player can perform various operations by manipulating the operation switch section 14 and the touch panel 13 while looking at the first game image and the second game image. In the present exemplary non-limiting implementation, the player is not only able to control the main character PM displayed in the first game image by using the operation switch section 14, but also able to control the sub-character PS displayed in the second game image by using the touch panel 13. As a result, it would be possible to use a strategy where, while moving the main character PM to pursue the enemy character E through the manipulation of the operation switch section 14, the player also moves the sub-character PS by manipulating the touch panel 13, thus sandwiching the enemy character E between the two.

Next, with reference to FIG. 36, a RAM image of the WRAM 22 will be described. As shown in FIG. 36, the WRAM 22 stores instructions and data which are of a format executable by a computer in the game apparatus 1, in particular by the CPU core 21. Moreover, the WRAM 22 stores game data which is generated by the CPU core 21 executing the game program. The game program is loaded to the WRAM 22 from the cartridge 17 as appropriate, and executed.

Referring to FIG. 36, the WRAM 22 stores main character data $2v$, sub-character data $2w$, enemy character data $2x$, destination coordinates $2y$, and path data $2z$. The WRAM 22 also stores 3D image data $2aa$ and 2D image data $2ab$.

The main character data $2v$ is data for managing the main character PM. The main character data $2v$ includes a position on the game field (game field coordinates (gx, gy)) $2v1$, attribute information (life gauge or the like) $2v2$, and the like. The game field coordinates (gx, gy) are similar to those in the coordinate system of the first exemplary non-limiting implementation described with reference to FIG. 34, and the detailed descriptions thereof are omitted.

The sub-character data $2w$ is data for managing the sub-character PS. The sub-character data $2w$ includes a position on the game field (game field coordinates (gx, gy)) $2w1$, attribute information (life gauge or the like) $2w2$, and the like.

The enemy character data $2x$ includes data $2x1$, $2x2$, etc., for respectively managing a plurality of enemy characters E. Each of the enemy character data $2x1$, $2x2$, etc. includes a position on the game field (game field coordinates (gx, gy)) $2x1a$, $2x2a$, etc., and attribute information (life gauge or the like) $2x1b$, $2x2b$, etc.

The destination coordinates 2*y* indicate the position (game field coordinates (gx, gy)) of a destination designated by the player in the game field. The path data 2*z*, which is a record of a path in the form of a set of game field coordinates (gx, gy) as computed by the computer, includes coordinate data 2*z*1, coordinate data 2*z*2, etc.

The 3D image data 2*aa* and the 2D image data 2*ab* are data for displaying characters and the like in the first game image and the second game image, respectively. The 3D image data 2*aa*, which is data for displaying 3D representations of characters and the like in the first game image, includes main character image data 2*aa*1, sub-character image data 2*aa*2, enemy character image data 2*aa*3, game field image data 2*aa*4, and the like. The 2D image data 2*ab*, which is data kg displaying symbolized characters and the like in the second game image, includes main character image data 2*ab*1, sub-character image data 2*ab*2, enemy character image data 2*ab*3, game field image data 2*ab*4, and the like.

Figure 37:
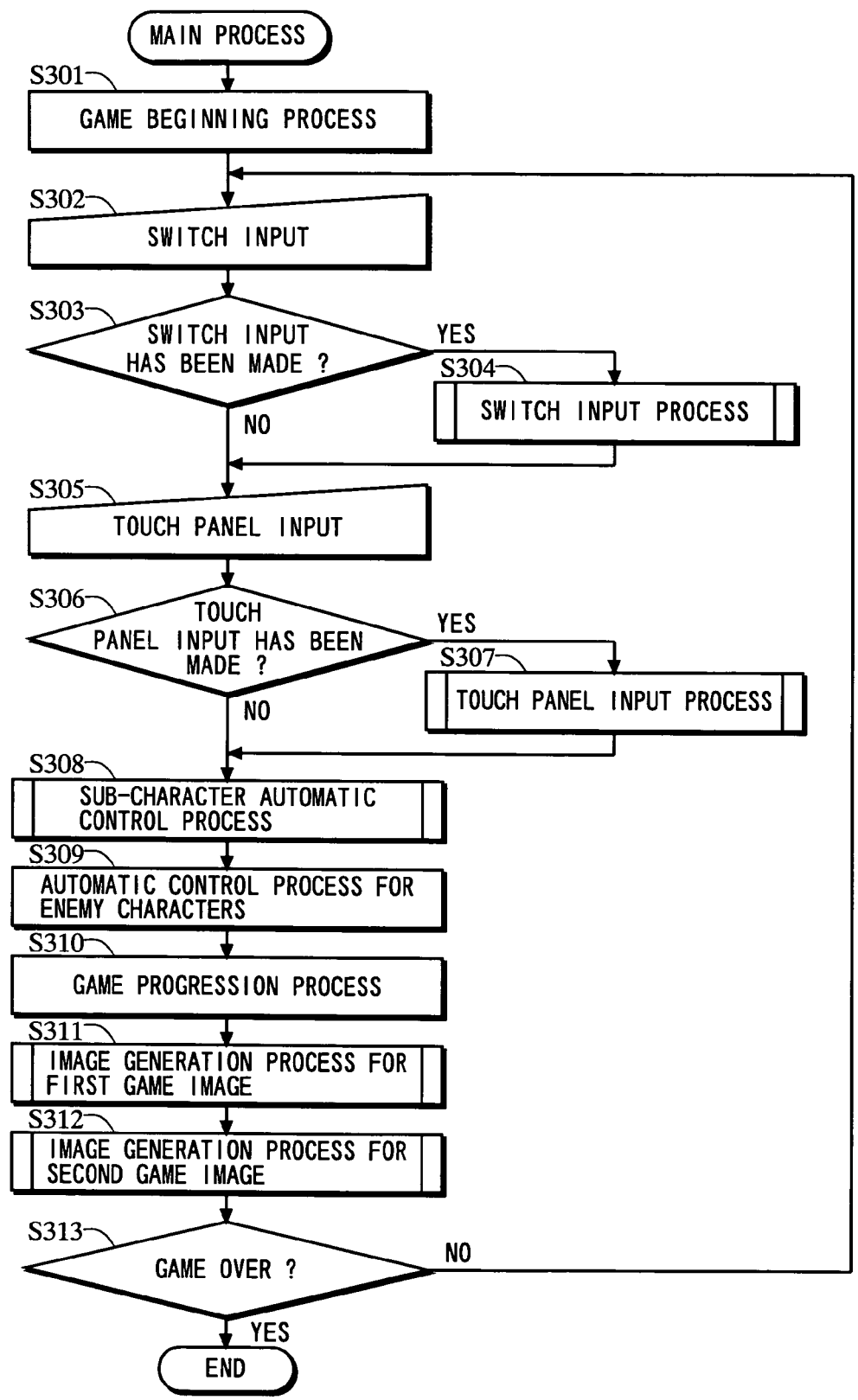
FIG. 37 is a flowchart illustrating a main process executed in the game apparatus 1 in accordance with a game program according to the second exemplary non-limiting implementation.
Figure 38:
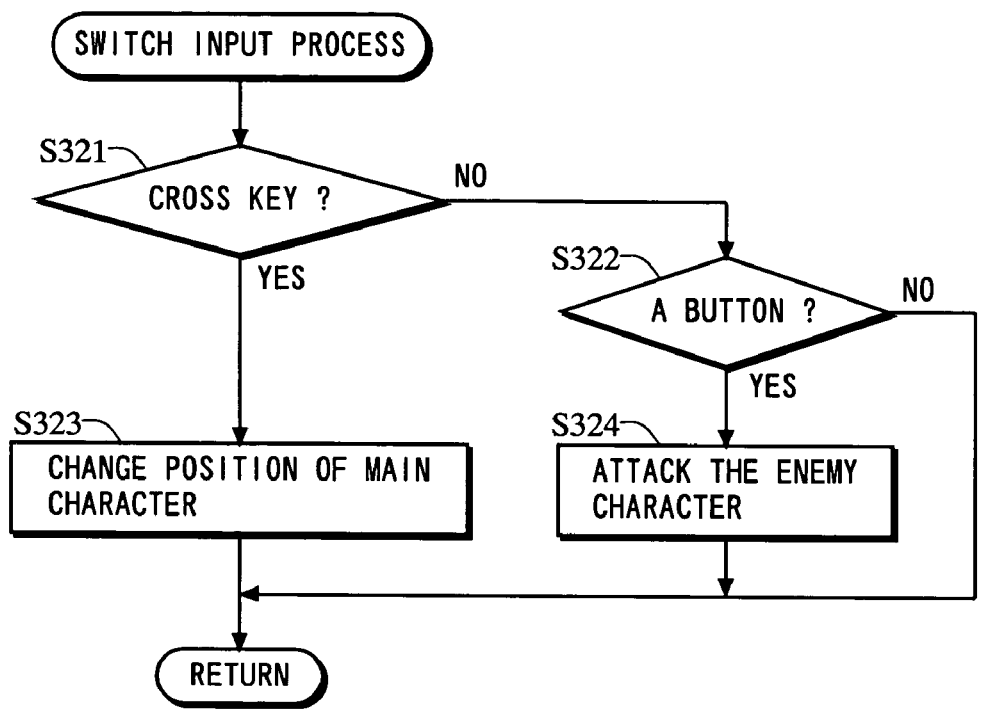
FIG. 38 shows the subroutine of a switch input process to be performed at step S304 of FIG. 37.
Figure 39:
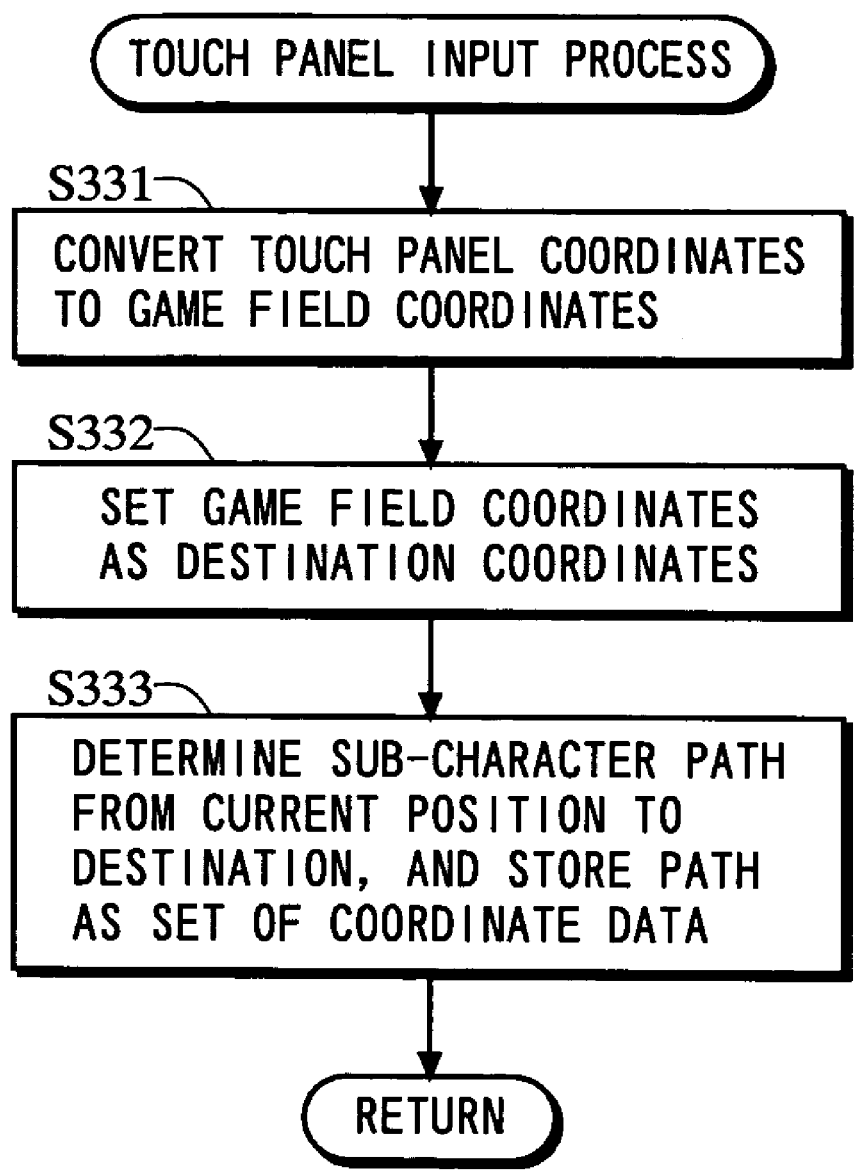
FIG. 39 shows the subroutine of a touch panel input process to be performed at step S307 of FIG. 37.
Figure 40:
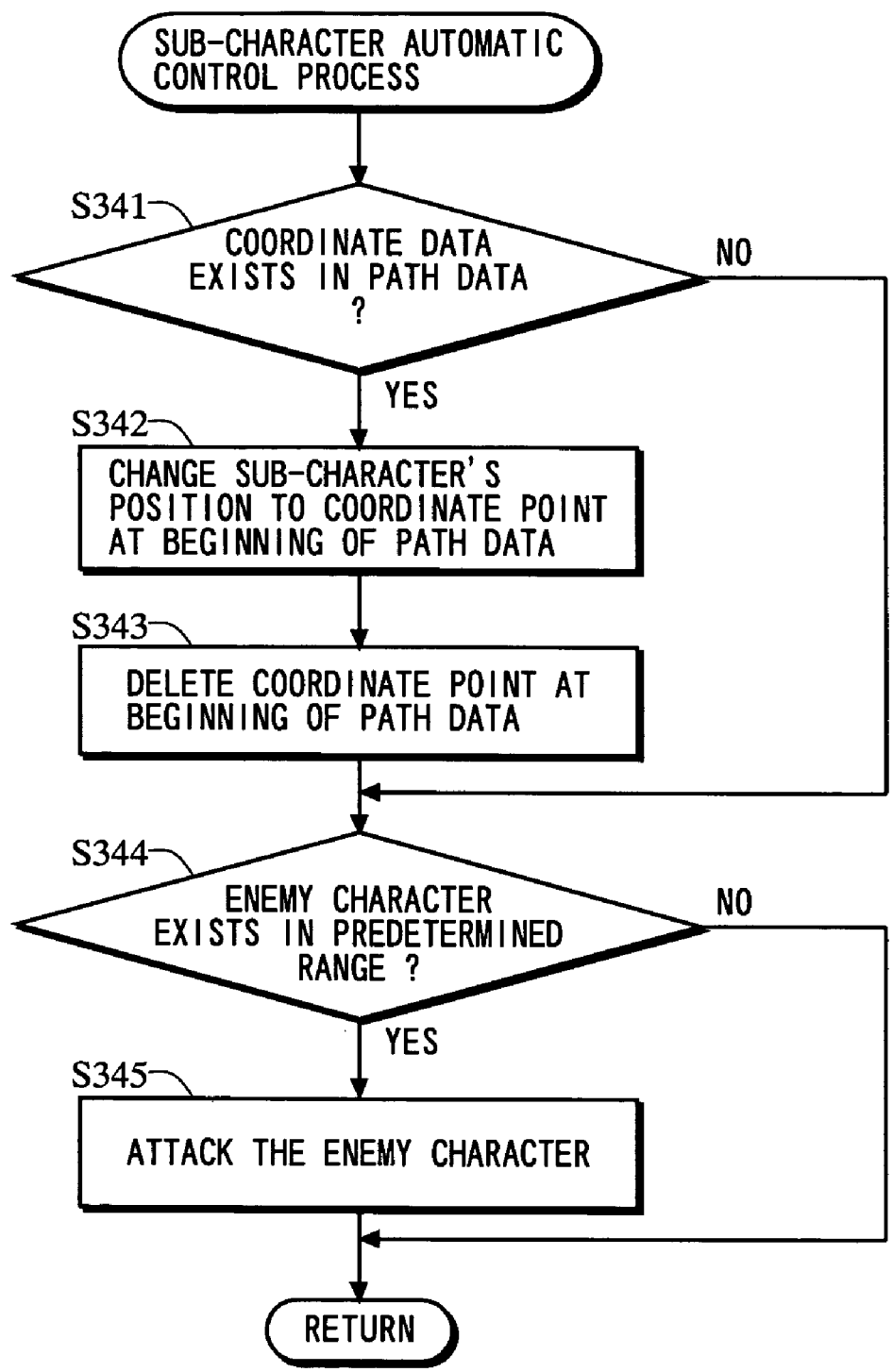
FIG. 40 shows the subroutine of an automatic control process for a sub-character to be performed at step S308 of FIG. 37.
Figure 41:
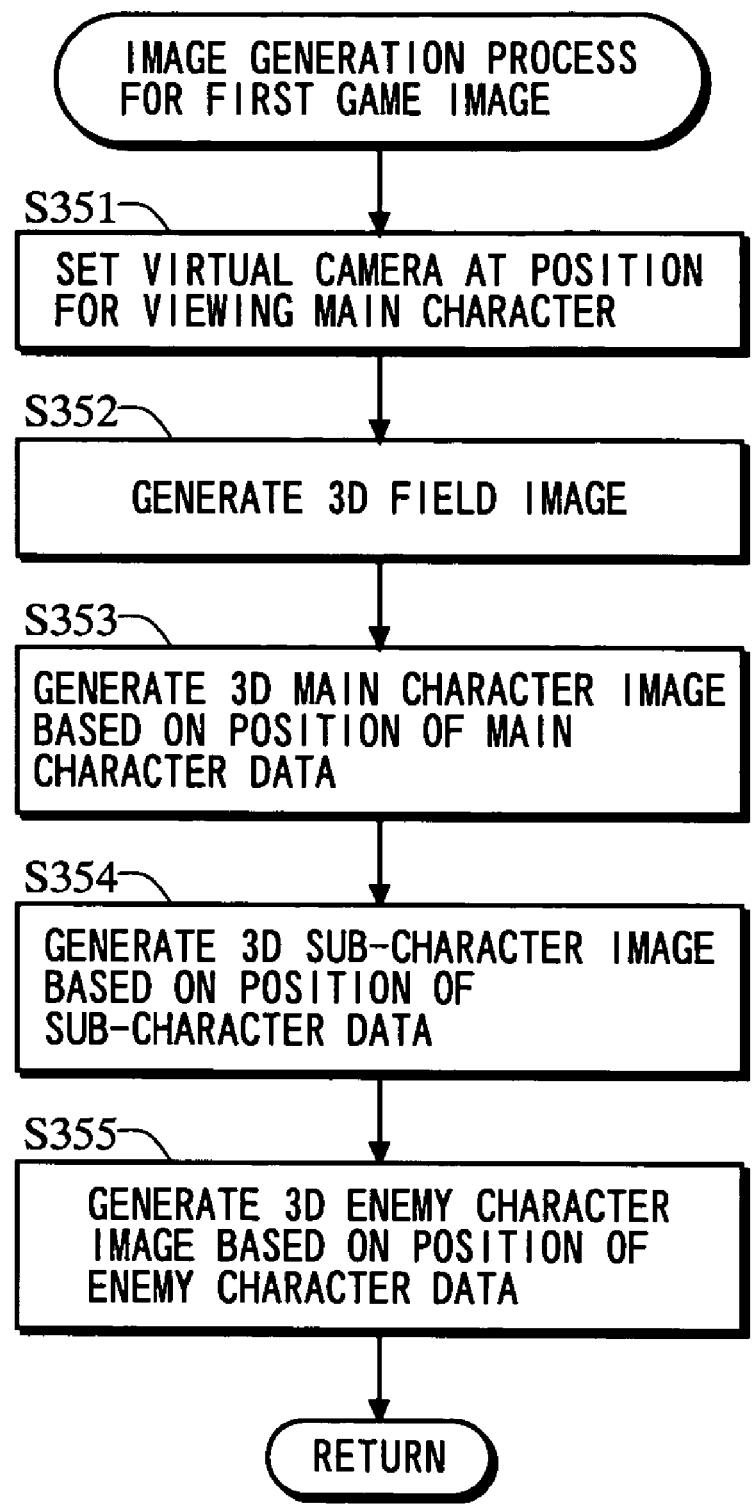
FIG. 41 shows the subroutine of an image displaying process for a first game image to be performed at step S311 of FIG. 37.
Figure 42:
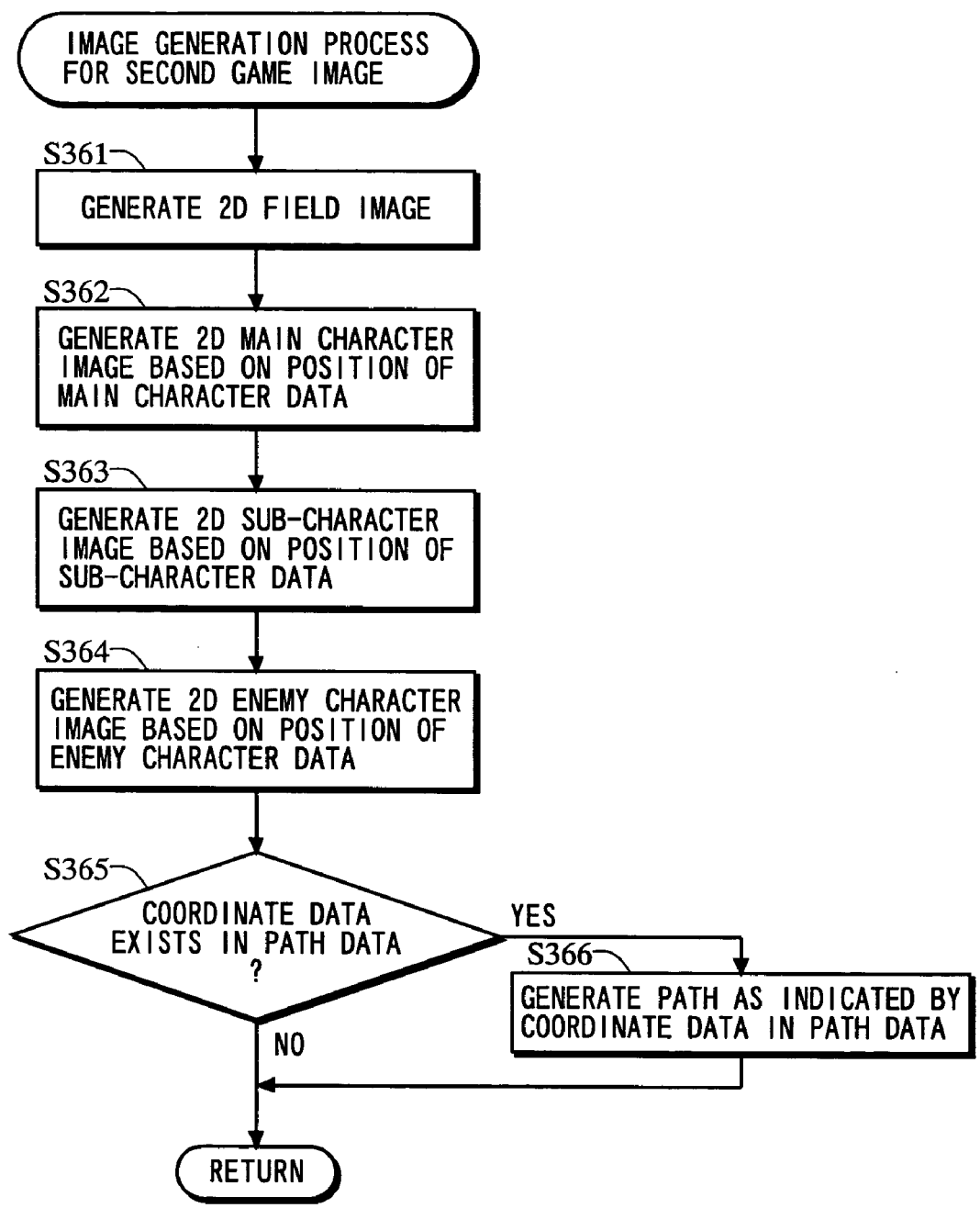
FIG. 42 shows the subroutine of an image displaying process for a second game image to be performed at step S312 of FIG. 37.

Hereinafter, the processes to be performed by a computer in realizing the present exemplary non-limiting implementation will be described with reference to the flowcharts of FIGS. 37 to 42. FIG. 37 is a flowchart illustrating a main process executed in the game apparatus 1 in accordance with the game program according to the second exemplary non-limiting implementation. FIG. 38 shows the subroutine of a switch input process to be performed at step S304 of FIG. 37. FIG. 39 shows the subroutine of a touch panel input process to be performed at step S307 of FIG. 37. FIG. 40 shows the subroutine of an automatic control process for a sub-character to be performed at step S308 of FIG. 37. FIG. 41 shows the subroutine of an image displaying process for a first game image to be performed at step S311 of FIG. 37. FIG. 42 shows the subroutine of an image displaying process for a second game image to be performed at step S312 of FIG. 37. The programs for performing these processes are contained in the game program which is stored in the ROM 171, and loaded from the ROM 171 to the WRAM 22 when power to the game apparatus 1 is turned on, so as to be executed by the CPU core 21.

Referring to FIG. 37, when power to the game apparatus 1 is turned on, various initialization processes for the game apparatus 1 are performed in accordance with a program in a boot ROM (not shown). Furthermore, at least part of the programs stored in the ROM 171 are read and stored to the WRAM 22. Thereafter, the player operates the operation switch section 14 and the like to cause a game to be started. In response, the CPU core 21 begins executing the game program, and performs a game beginning process (step S301), and proceeds to the next step.

Next, the CPU core 21 awaits a switch input from the player (step S302). As used herein, a "switch input" in this process is an input made by the player using any operation means other than the touch panel 13, and corresponds specifically to an operation input using the operation switch section 14. Then, the CPU core 21 determines whether a switch input has been made by the player or not (step S303). If a switch input has been made, a switch input process (step S304) is performed, and control proceeds to the next step S305. The detailed procedure of the switch input process at step S304 will be described later. On the other hand, if no switch input is made, the CPU core 21 proceeds to the next step S305.

At step S305, the CPU core 21 awaits a touch panel input from the player. As used herein, a "touch panel input" in this process is an input made through a touch operation by the player using the touch panel 13 as an operation means. Then, the CPU core 21 determines whether the player has made a touch panel input or not (step S306). If a touch panel input has been made, a touch panel input process (step S307) is performed, and control proceeds to the next step S308. The detailed procedure of the touch panel input process at step S307 will be described later. On the other hand, if no touch panel input has been made, the CPU core 21 proceeds to the next step S308.

At step S308, the CPU core 21 performs a automatic control process for the sub-character. The detailed procedure of the automatic control process for the player's team athletes at step S22 will be described later. Next, the CPU core 21 performs an automatic control process for the enemy characters (step S309). The process of step S309 is to be performed by the CPU core 21 using a predetermined thinking routine as in conventional techniques, and any detailed description thereof is omitted here.

Next, the CPU core 21 performs a game progression process (processing related to attack judgment and points; step S310), an image generation process for a first game image (step S311), and an image generation process for a second game image (step S312). The detailed procedures of the image generation processes of steps S311 and S312 will be described later. Then, the CPU core 21 determines whether the end of the game (game over) has been reached (step S313). If the game is to be continued, the CPU core 21 returns to the aforementioned step S302 to continue with the process. If the game is to be ended, the main process in accordance with the flowchart is ended.

Referring to FIG. 38, the detailed procedure of the switch input process of step S304 will be described. First, the CPU core 21 determines whether an input has been made by the player using the direction switch (cross key) 14*c* (step S321). If an input has been made using the direction switch 14*c*, the CPU core 21 proceeds to the next step S323. If no such input has been made, control proceeds to the next step S322.

At step S323, the CPU core 21 changes the position of the main character in accordance with the input from the direction switch 14*c*, and ends the processing of this subroutine. Specifically, the CPU core 21 changes the position (game field coordinates (gx, gy)) 2*v*1 of the main character data 2*v* in accordance with the input from the input direction switch 14*c*.

At step S322, the CPU core 21 determines whether an input has been made by the player using the operation switch (A button) 14*a*. If the player has operated the operation switch 14*a*, the CPU core 21 causes the main character PM to make an action of attacking the enemy character E (step S324), and ends the processing of this subroutine. On the other hand, if the player has not operated the operation switch 14*a*, the CPU core 21 ends the processing of this subroutine. Through the processes of steps S321 to S324, the game parameters which are set for the main character PM in accordance with an input from the operation switch section 14 are changed.

Referring to FIG. 39, the detailed procedure of the touch panel input process of step S307 will be described. The CPU core 21 converts the touch panel coordinates on the touch panel 13 which are currently being touched by the player to game field coordinates (step S331), and proceeds to the next step. The relationship between touch panel coordinates and game field coordinates is similar to that described in the first exemplary non-limiting implementation, and any detailed description thereof is omitted here.

Next, the CPU core 21 sets the game field coordinates obtained through the conversion at step S331 as destination coordinates 2*y* (step S332). Then, the CPU core 21 calculates a path for the sub-character PS from the current position to the destination on the game field, stores the calculated path as a set of coordinate data in the path data 2*z* (step S333), and ends the processing of this subroutine. Specifically, on the game field, the CPU core 21 sets the game field coordinates designated in the position $2w1$ of the sub-character data $2w$ as the current position coordinates, and sets the game field coordinates designated in the destination coordinates $2y$ as the destination coordinates. Next, based on a predetermined thinking routine, the CPU core 21 calculates a path from the current position coordinates to the destination coordinates on the game field. Then, the calculated path is converted to a set of game field coordinates, which game field coordinates are recorded as coordinate points $2z1$, $2z2$, etc., in the path data $2z$ (as starting from the current position coordinates). Through the processes of steps S331 to S333, the game parameters which are set for the sub-character PS in accordance with an input from the touch panel 13 are changed.

Referring to FIG. 40, the detailed procedure of the sub-character automatic control process of step S308 will be described. In FIG. 40, the CPU core 21 determines whether coordinate data exists in the path data $2z$ (step S341). If any coordinate data exists, the CPU core 21 changes the position $2w1$ of the sub-character data $2w$ to a coordinate point which is designated at the beginning of path data $2z$ (step S342). Then, the CPU core 21 deletes the coordinate point designated at the beginning of the path data $2z$, which was used at step S342 (step S343), and proceeds to the next step S344. On the other hand, if no coordinate data exists in the path data $2z$, the CPU core 21 proceeds to the next step S344.

At step S344, the CPU core 21 determines whether the enemy character E is present within a predetermined range of the game field around the sub-character PS. If the enemy character E is present in the predetermined range, the CPU core 21 causes the sub-character PS to attack the enemy character E (step S345), and ends the processing of this subroutine. On the other hand, if the enemy character E is not present within the predetermined range, the CPU core 21 ends the processing of this subroutine.

Referring to FIG. 41, the detailed procedure of the image generation process for a first game image of step S311 will be described. In FIG. 41, the CPU core 21 sets a virtual camera at a position in the game space for viewing the main character which is positioned on the game field (step S351). Next, by using the game field image data $2aa4$ contained in the 3D image data $2aa$, the CPU core 21 generates a 3D game field image as viewed from the virtual camera, and writes this image into the first VRAM 23 via the first GPU 24 (step S352). Moreover, in accordance with the position $2v1$ of the main character data $2v$, the CPU core 21 deploys the main character on the game field. Then, by using the main character image data $2aa1$ contained in the 3D image data $2aa$, the CPU core 21 generates 3D main character image as viewed from the virtual camera at the deployment position in accordance with its operational status and the like, and writes these images into the first VRAM 23 via the first GPU 24 (step S353). Furthermore, in accordance with the position $2w1$ of the sub-character data $2w$, the CPU core 21 deploys the sub-character in the game field. Then, by using the sub-character image data $2aa2$ contained in the 3D image data $2aa$, the CPU core 21 generates a 3D sub-character image as viewed from the virtual camera at the deployment position in accordance with its operational status and the like, and writes this image into the first VRAM 23 via the first GPU 24 (step S354). Moreover, in accordance with the position designated in each piece of enemy character data $2x$, the CPU core 21 deploys each enemy character in the game field. Then, by using the enemy character image data $2aa3$ contained in the 3D image data $2aa$, the CPU core 21 generates 3D enemy character images as viewed from the virtual camera at the respective deployment positions in accordance with their operational statuses and the like, writes these images into the first VRAM 23 via the first GPU 24 (step S355), and ends the processing of this subroutine. Through this procedure, the images which are written into the first VRAM 23 are represented as the first game image. Since the image generation process for the first game image is similar to conventional image generation processes based on the game parameters which are set for each character, no further description thereof is provided herein.

Referring to FIG. 42, the detailed procedure of the image generation process for a second game image of step S312 will be described. In FIG. 42, the CPU core 21 generates a 2D game field image by using the entire game field image data $2ab3$ contained in the 2D image data $2ab$, and writes this image into the second VRAM 25 via the second GPU 26 (step S361). Then, in accordance with the position $2v1$ of the main character data $2v$, the CPU core 21 deploys the main character in the game field. By using the main character image data $2ab1$ contained in the 2D image data $2ab$, a 2D main character image (symbolized representation) is generated at the deployment position, and this image is written into the second VRAM 25 via the second GPU 26 (step S362). Furthermore, in accordance with the position $2w1$ of the sub-character data $2w$, the CPU core 21 deploys the sub-character in the game field. By using the sub-character image data $2ab2$ contained in the 2D image data $2ab$, a 2D sub-character image (symbolized representation) is generated at the deployment position, and this image is written into the second VRAM 25 via the second GPU 26 (step S363). Then, in accordance with the position designated in each piece of enemy character data $2x$, the CPU core 21 deploys each enemy character in the game field. By using the enemy character image data $2ab3$ contained in the 2D image data $2ab$, 2D enemy character images (symbolized representations) are generated at the respective deployment positions; these images are written into the second VRAM 25 via the second GPU 26 (step S355); and control proceeds to the next step.

Next, the CPU core 21 determines whether coordinate data exists in the path data $2z$ (step S365). If any coordinate data exists in the path data $2z$, the CPU core 21 generates a path at a relevant position on the game field in accordance with the coordinate data, writes this image into the second VRAM 25 via the second GPU 26 (step S366), and ends the processing of this subroutine. On the other hand, if no coordinate data exists, the CPU core 21 ends the processing of this subroutine. Through this procedure, an image which has been written into the second VRAM 25 is generated as a second game image. Since the image generation process for the second game image is similar to conventional image generation processes based on the game parameters which are set for each character, no further description thereof is provided herein.

(Third Implementation)

Figure 43:
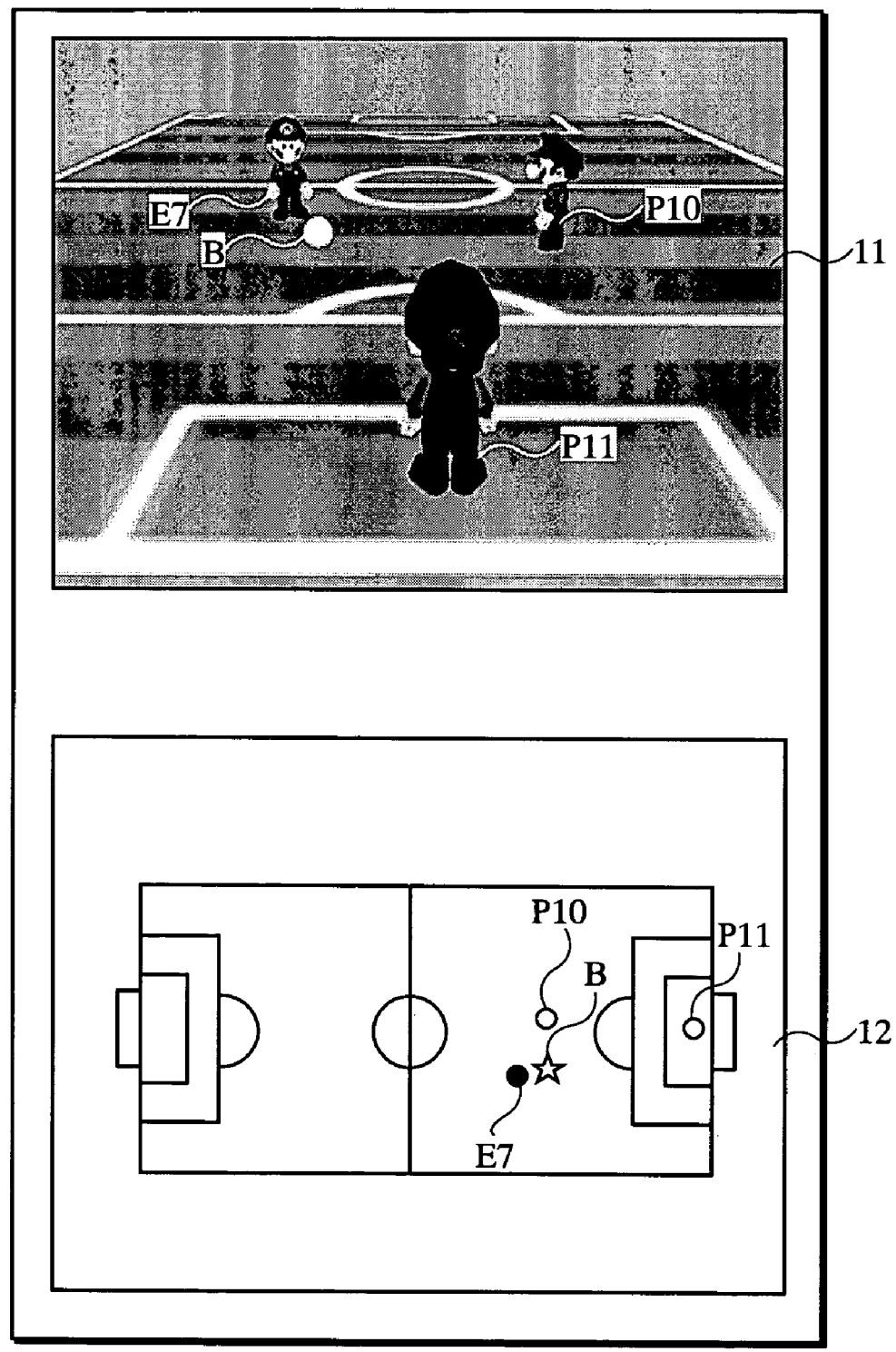
FIG. 43 is a diagram showing exemplary game images to be displayed on a first LCD 11 and a second LCD 12 according to a third exemplary non-limiting implementation.

Hereinafter, a game apparatus which executes a game program according to a third exemplary non-limiting implementation of the present exemplary non-limiting implementation will be described with reference to FIG. 43. A game which is provided by a game program according to the third exemplary non-limiting implementation is a soccer game in which a plurality of player objects that are controllable by the player appear in a game space, as in the case of the first exemplary non-limiting implementation. FIG. 43 is a diagram showing exemplary game images to be displayed on the first LCD 11 and the second LCD 12.

The game which is provided by a game program according to the present exemplary non-limiting implementation differs from the game according to the first exemplary non-limiting implementation in that the player object which is controllable by the player using the operation switch section 14 is always fixed, and the first game image is also fixed at a viewpoint from behind the player object. Since there are no other structural differences from the first exemplary non-limiting implementation, the game images will be mainly described, while omitting the RAM images of the WRAM 22 and detailed descriptions of processes using flowcharts.

FIG. 43 shows an exemplary first game image to be displayed on the first LCD 11 and an exemplary second game image to be displayed on the second LCD 12. The first game image is a 3D expression of a part of a game field (soccer field) which is provided in the game space. The second game image is a 2D image expression of the same game space. Each object acts similarly in both images; in other words, the first game image and the second game image are images representing the same game space. The second game image is a radar representation of the entire soccer field which is set in the game space. Thus, the present exemplary non-limiting implementation illustrates an example where the first game image is presented as a 3D expression and the second game image is presented as a 2D expression of the entire game field in the game space. Alternatively, both game images may be 2D expressions, or both game images may be 3D expressions.

FIG. 43 illustrates an example where the player is on the defense in a soccer game. The first game image displays a plurality of player objects from the player's team that are controllable by the player; for instance, player objects P10 and P11 are shown in this example. The first game image also shows enemy objects from the enemy team; for instance, an enemy object E7 is displayed in this example. The first game image also shows a ball object B representing a soccer ball. Currently, the enemy object E7 is keeping the ball object B.

The player object P11 is a player's team athlete in the role of a goalkeeper (GK) under the soccer rules, and is assigned with an attribute value GK. The first game image always shows the game space as viewed from behind the goalkeeper player object P11. The player object P11 is a player object (switch-operable object) which is always controllable by the player using the operation switch section 14, e.g., the operation switches 14*a* and 14*b* or the direction switch 14*c*.

For comparison, in the first exemplary non-limiting implementation, a player object which is closest to the ball is set as a player object (switch-controllable athlete) that is controllable by the player using the operation switch section 14. Moreover, the first game image in the first exemplary non-limiting implementation is a 3D expression of a game space at least containing the player object which is set as a switch-controllable athlete; in other words, the player object which is controllable by the player using the operation switch section 14 changes with the game situation, and the first game image is shown from different viewpoints due to such changes. On the other hand, in the third exemplary non-limiting implementation, the player object which is controllable by the player using the operation switch section 14 is always fixed, and the first game image is also fixed at a viewpoint from behind the player object.

The second game image is a radar representation of the entire soccer field (game field) which is set in the game space, as plan-viewed from above. The second game image shows the plurality of player objects P10 and P11 from the player's team that are controllable by the player, each being symbolized as a blank circle or the like. In the second game image, each of the player objects P10 and P11 which are shown in the first game image is symbolized at the same position on the game field as in the first game image. The second game image also shows the enemy object E7, which is symbolized as a solid circle or the like. In the second game image, the enemy object E7 shown in the first game image is symbolized at the same position on the game field as in the first game image. The second game image also shows the ball object B representing a soccer ball, which is symbolized as a star or the like.

The player can select one of the plurality of player objects shown in the second game image by using the touch panel 13, and control the selected player object (touch-operable object). The operation using the touch panel 13 is similar to that described in the first exemplary non-limiting implementation. For example, a touch-controllable athlete may be selected in accordance with the player's touch operation so as to make a flicking action, a tracing action, or the like. The detailed descriptions of such touch operations and the associated actions are omitted.

Thus, the player can perform various operations by manipulating the operation switch section 14 and the touch panel 13 while looking at the first game image and the second game image. In the present exemplary non-limiting implementation, the player is not only able to control the goalkeeper displayed in the first game image by using the operation switch section 14, but also able to control the other player's team athletes displayed in the second game image by using the touch panel 13. By prescribing the goalkeeper to be always controllable by means of the operation switch section 14, and showing a first game image using a viewpoint from behind the goalkeeper, the player can enjoy the kind of presence which is specific to a goalkeeper. A goalkeeper naturally has different roles and performs different actions from those of any other athlete; by realizing such differences through the use of different operation means and different game image, it becomes possible to realize an operation which is in accordance with the action of each athlete, and to represent the state of a match in an appropriate manner.

The fixed player object which is controllable by the player using the operation switch section 14 does not need to be a goalkeeper. For example, a specific player object in the role of a main character in the game may always be made controllable by the player using the operation switch section 14. In this case, the first game image may always be a 3D expression of a subjective viewpoint of the main character, or a 3D expression of a game space at least containing the main character. Alternatively, a first game image as seen from the viewpoint of the ball object B may be displayed.

(Fourth Implementation)

Figure 44:
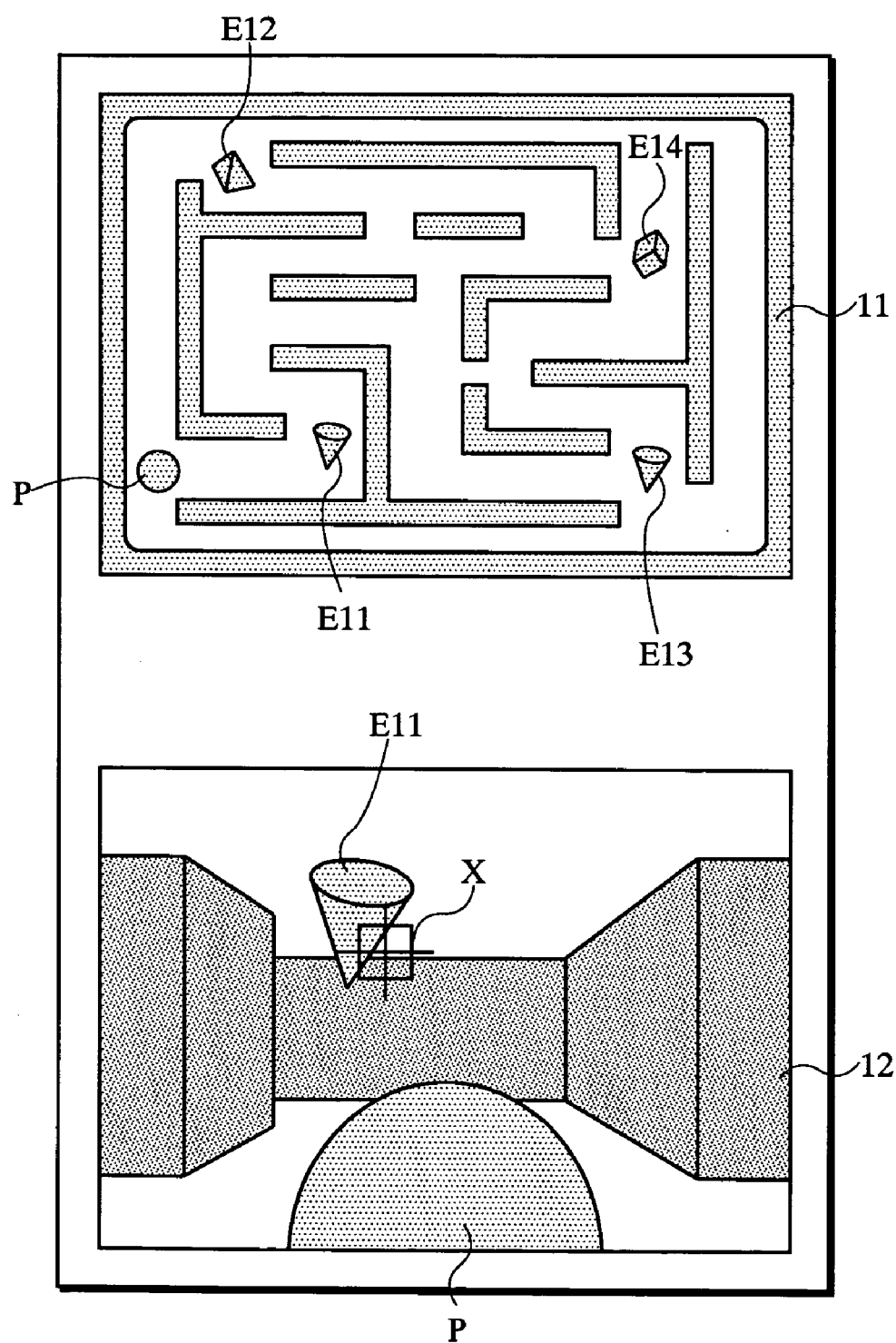
FIG. 44 is a diagram showing exemplary game images to be displayed on a first LCD 11 and a second LCD 12 according to a fourth exemplary non-limiting implementation.

Hereinafter, a game apparatus which executes a game program according to a fourth exemplary non-limiting implementation of the present exemplary non-limiting implementation will be described with reference to FIG. 44. A game which is provided by a game program according to the fourth exemplary non-limiting implementation is a shooting game in which a player object P that is controllable by the player appears in a game space, as in the case of the first exemplary non-limiting implementation. FIG. 44 is a diagram showing exemplary game images to be displayed on the first LCD 11 and the second LCD 12. In the illustration of the fourth exemplary non-limiting implementation, the game images will be mainly described, while omitting the RAM images of the WRAM 22 and detailed descriptions of processes using flowcharts.

FIG. 44 shows an exemplary first game image to be displayed on the first LCD 11 and an exemplary second game image to be displayed on the second LCD 12. The first game image is a 2D expression of the entire game field which is provided in the game space. The second game image is an image from a subjective viewpoint of the player object P which is deployed in the game field, and is a 3D expression of part of the game field. The first game image is a 2D expression of the game space as plan-viewed from above, such that each object acts similarly in both images; in other words, the first game image and the second game image are images representing the same game space. The first game image is a radar representation of the entire game field which is set in the game space. Thus, the present exemplary non-limiting implementation illustrates an example where the first game provides a 2D expression of the entire game field in the game space and the second game image provides a 3D expression of part of the game space. Alternatively, both game images may be 2D expressions, or both game images may be 3D expressions.

In the present game, a player object P which is controllable by the player appears in the game field. The player object P is controllable by the player using the operation switch section 14. The game progresses as the player shoots at objects appearing in the game field. A plurality of enemy characters E11 to E14 appear in the game field as characters which act in accordance with the computer's thinking routine. The enemy characters E11 to E14 are the targets of shooting by the player object P. The game field in this game is constructed in the fashion of a maze.

The first game image is a radar representation of the entire game field which is set in the game space, as plan-viewed from above. In the first game image, the objects which are deployed in the game field to be displayed are symbolized. For example, in FIG. 44, the player object P is symbolized as a circle, whereas the enemy characters E11 to E14 are symbolized 3D objects.

The player controls the player object P (switch-operable object) by using the operation switch section 14, e.g., the operation switch (A button) 14*a*, the operation switch (B button) 14*b*, or the direction switch (cross key) 14*c*. For example, in accordance with the player's operation using the direction switch 14*c*, the player object P moves through the maze which is provided in the game field. Moreover, in accordance with the player's operation using the operation switch 14*f*, the player object P shoots at an aim position (described later). While looking at the first game image, the player is able to have an overall grasp of the position and situation in the maze provided in the game field, and can obtain information necessary for movements of the player object P using the operation switch section 14 from the first game image.

The second game image shows the player object P substantially in a bottom center region, and provides a 3D representation of the game field as seen from the subjective viewpoint of the player object P. In accordance with the movement of the player object P, the viewpoint in the second game image also moves. Any enemy object which is positioned in the game field displayed in the second game image is also displayed as a 3D representation (e.g., the enemy object E11 in FIG. 44). The second game image also shows a cursor X, which serves as an aim of shooting by the player object P.

By using the touch panel 13, the player controls the position of the cursor X (touch-operable object). For example, if the player performs a touch operation on the touch panel 13 so as to touch on a position in the game field shown in the second game image, the cursor X is moved to the touch-operated position. Specifically, the CPU core 21 converts the touch panel coordinates of a position touched by the player on the touch panel 13 to game field coordinates, and generates a second game image in which the cursor X has been moved to the game field coordinates. The touch panel coordinates and the game field coordinates are of such a relation that game field coordinates can be directly input by using the touch panel 13. In other words, the player can move the cursor X to the game field coordinates of a position in the second game image corresponding to the position at which the touch panel 13 is touched. Therefore, the player can quickly move the aim position by simply touching on an arbitrary position in the second game image displayed on the second LCD 12. The result of the player's operation on the touch panel 13 (e.g., the enemy object E11 being eliminated by being shot) is also reflected in the first game image.

(Fifth Implementation)

Figure 45:
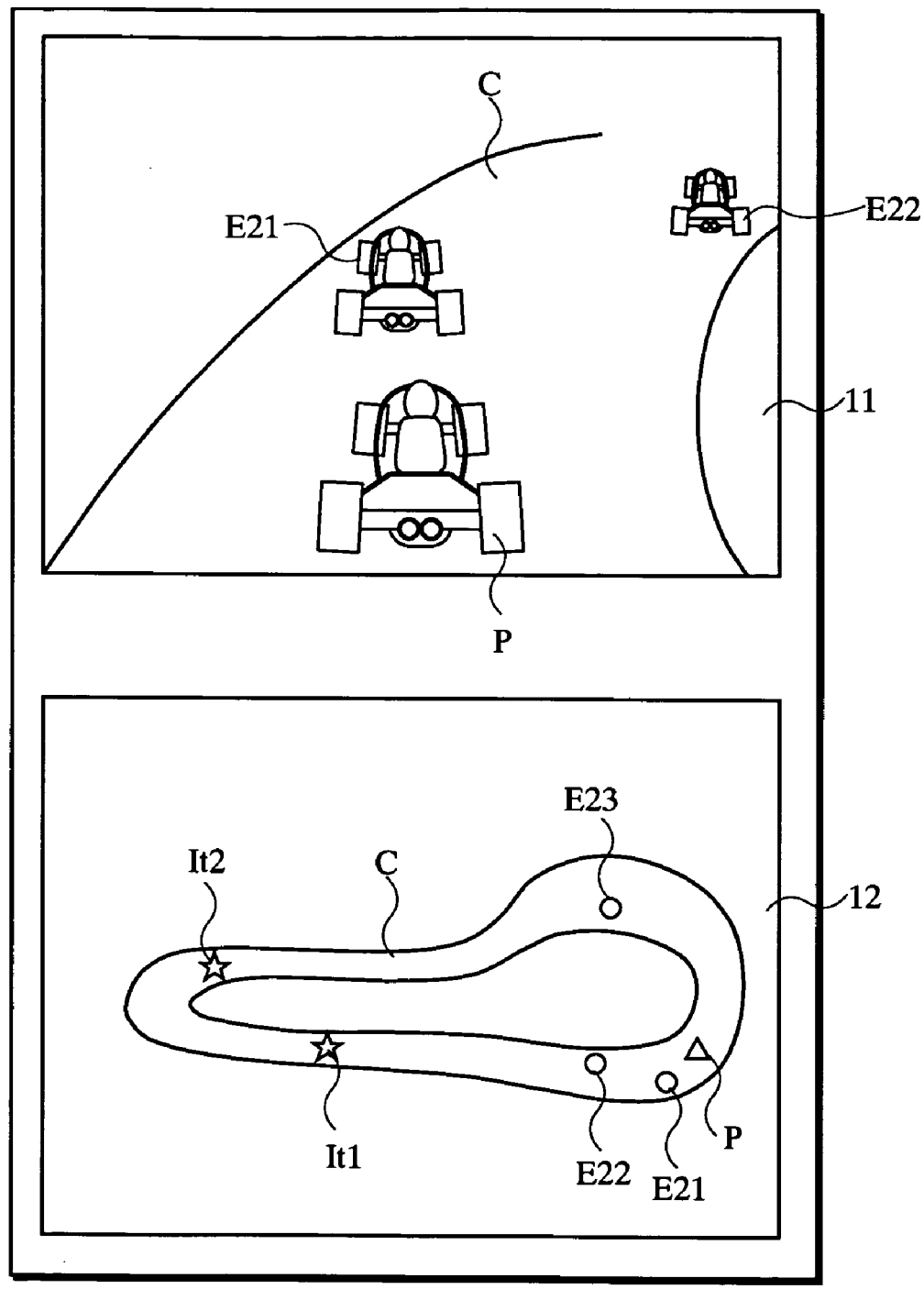
FIG. 45 is a diagram showing exemplary game images to be displayed on a first LCD 11 and a second LCD 12 according to a fifth exemplary non-limiting implementation.

Hereinafter, a game apparatus which executes a game program according to a fifth exemplary non-limiting implementation will be described with reference to FIG. 45. A game which is provided by a game program according to the fifth exemplary non-limiting implementation is a racing game in which a player object P that is controllable by the player appears in a game space. FIG. 45 is a diagram showing exemplary game images to be displayed on the first LCD 11 and the second LCD 12. In the illustration of the fifth exemplary non-limiting implementation, the game images will be mainly described, while omitting the RAM images of the WRAM 22 and detailed descriptions of processes using flowcharts.

FIG. 45 shows an exemplary first game image to be displayed on the first LCD 11 and an exemplary second game image to be displayed on the second LCD 12. The first game image is an enlarged 3D expression of a part of racing course C (game field) which is provided in the game space. The second game image is a 2D image expression of the game field which is provided in the same game space. The second game image is a 2D expression of the game space as plan-viewed from above, such that each object acts similarly in both images; in other words, the first game image and the second game image are images representing the same game space. The second game image is a radar representation of the entire game field which is set in the game space. Thus, the present exemplary non-limiting implementation illustrates an example where the first game image is presented as a 3D expression and the second game image is presented as a 2D expression of the entire game field in the game space. Alternatively, both game images may be 2D expressions, or both game images may be 3D expressions.

In the present game, a player object P which is controllable by the player appears in the game field. The player object P is a racing car which runs on a racing course C that is set as a game field, and which is controllable by the player using the operation switch section 14 (switch-operable object). Moreover, enemy objects E21 to E23 appear in the game field as objects which run in accordance with the computer's thinking routine. The enemy objects E21 to E23 are also racing car running on the racing course C. In predetermined places on the racing course C, items It1 and It2 are provided. For example, the items It1 and It2 may be bombs which are installed on the racing course C, and which may be controlled by the player using the touch panel 13 (touch-operable object).

The first game image shows the player object P substantially in a bottom center position. The first game image shows 3D representations of the player object P and a portion of the racing course C that lies ahead. In the case where any other enemy object is positioned in a portion of the racing course which is displayed in the first game image, that object is also shown as a 3D representation (e.g., enemy objects E21 and E22 in FIG. 45).

The player controls the player object P by using the operation switch section 14, e.g., the operation switch (A button) 14*a*, the operation switch (B button) 14*b*, or the direction switch (cross key) 14*c*. For example, in accordance with the player's operation using the direction switch 14*c*, a steering control of the player object P may be performed. In accordance with the player's operation using the operation switch 14a, an acceleration control of the player object P may be performed. In accordance with the player's operation using the operation switch 14b, a braking control of the player object P may be performed. As described above, since the first game image shows 3D representations of the player object P and a portion of the racing course C that lies ahead, the player can control the player object P by manipulating the operation switch section 14 while looking at the first game image.

The second game image provides a radar representation of the entire racing course C which is set in the game space, as plan-viewed from above. The second game image shows symbolized representations of the objects which are positioned on the racing course C. For example, in FIG. 45, the player object P is symbolized as a blank triangle, the enemy objects E21 to E23 as blank circles, and items It1 and It2 as stars. In the second game image, each of the player object P and other objects (e.g., the enemy objects E21 and E22) which are shown in the first game image is symbolized at the same position on the racing course C as in the first game image. The result of the player's operation using the operation switch section 14 is also reflected in the second game image, in the form of a movement of the symbolized representation of the player object P.

The player controls the items It 1 and It2 by using the touch panel 13. For example, if the player performs a touch operation on the touch panel 13 so as to touch on the item It1 or It2 shown in the second game image, the touch-operated item It1 or It2 explodes. The player may explode the item It at the same time when an enemy object E drives by the item It to obstruct the running of the enemy object E.

Thus, the player can perform various operations by manipulating the operation switch section 14 and the touch panel 13 while looking at the first game image and the second game image. In the present exemplary non-limiting implementation, the player is not only able to control the player object P shown in the first game image by using the operation switch section 14, but also able to control the item It shown in the second game image by using the touch panel 13.

The above exemplary non-limiting implementation s illustrate examples where two physically separate LCDs 11 and 12 are disposed one on top of the other (i.e., two vertically-arranged screens) as liquid crystal display sections embodying two screens. However, such two display screens may be realized by any other structure. For example, the first LCD 11 and the second LCD 12 may be disposed side by side upon one of the principle faces of the lower housing 18a. Alternatively, an LCD which has the same horizontal dimension as that of the first LCD 11 but has a vertical dimension which is twice as long as its horizontal dimension (i.e., an LDC which is physically a single entity but has a displayed size which can vertically accommodate two screens) may be employed to display two screens on one top of the other (so that the images will be displayed vertically adjacent to each other in a seamless fashion). Alternatively, an LCD which has the same vertical dimension as that of the first LCD 11 but has a horizontal dimension which is twice as long as its vertical dimension (i.e., an LDC which is physically a single entity but has a displayed size which can horizontally accommodate two screens) may be employed to display two screens side by side (so that the images will be displayed horizontally adjacent to each other in a seamless fashion). Thus, an LCD which is physically a single entity can be split into two screens for displaying the first and second game images. Regardless of the modes of the game images, the present exemplary non-limiting implementation can be realized by providing a touch panel 13 on a screen which displays the second game image.

The second game image to be displayed on the second LCD 12 can be expressed in various modes. For example, as a second game image, the second LCD 12 may display: a game image which is a 2D expression of the game space as plan-viewed from above; an image representing a broader area of the game space than what is covered by first game image displayed on the first LCD 11; an image expressing the entire game space; or the like.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A game apparatus for displaying a game image representing an operable object in a game space, the operable object being controllable in response to an operation performed by a player, comprising:

a first display section;

an input section which does not comprise a touch panel;

a first action controller for controlling an action of a first operable object in accordance with an operation performed on the input section;

a first display controller for displaying on the first display section a first game image representing at least a portion of the game space;

a second display section different from the first display section;

a touch panel provided on a surface of the second display section;

a second action controller for controlling an action of a second operable object in accordance with a touch operation performed on the touch panel; and a second display controller for displaying on the second display section a second game image representing at least a portion of the game space, the second game image being different from the first game image, wherein the first operable object is different than the second operable object, wherein, the game space comprises a plurality of operable objects, the game apparatus further comprises:

a first operable object selector for selecting at least one of the plurality of operable objects as a first operable object, the selection being made automatically or by the player; and a second operable object selector for selecting at least one of the plurality of operable objects as a second operable object, the selection being made in accordance with coordinates obtained from the touch operation, wherein the second action controller comprises continuous action control programmed logic circuitry for, after the touch operation is performed on the touch panel, controlling the second operable object to continuously perform an action which is in accordance with the touch operation, the game apparatus further comprising a control selector for, when the second operable object which is acting under the control of the continuous action controller becomes controllable under the first action controller in accordance with an operation performed on the input section when a predetermined action in the game occurs, switching said second operable object between being controlled to act by the continuous action control programmed logic circuitry while no operation is performed on the input section and said second operable object being controlled to act by the first action controller if an operation is performed on the input section.

2. The game apparatus according to claim 1, wherein, the game apparatus further comprises:
game parameter storage locations for storing a game parameter pertaining to the game space;
first changing programmed logic circuitry for changing the game parameter stored in the game parameter storage locations in accordance with the action of the operable object controlled by the first action controller; and
second changing programmed logic circuitry for changing the game parameter stored in the game parameter storage locations in accordance with the action of the operable object controlled by the second action controller,
the first display controller displays on the first display section the first game image representing at least a portion of the game space and being generated based on the game parameter, and
the second display controller displays on the second display section the second game image representing at least a portion of the game space and being generated based on the game parameter.

3. The game apparatus according to claim 1, wherein the second game image displayed on the second display section is an image selected from the group consisting of: a game image which is a 2D expression of the game space as plan-viewed from above; an image representing a portion of the game space broader than and encompassing the first game image displayed on the first display section; and an image representing the entire game space.

4. The game apparatus according to claim 1, wherein, the first game image displayed on the first display section is an image at least containing an image representing the operable object whose action is controlled by the first action controller, and
the second game image displayed on the second display section is an image at least containing an image representing the operable object whose action is controlled by the second action controller.

5. The game apparatus according to claim 1, wherein, the game apparatus further comprises:
corresponding trajectory calculation programmed logic circuitry for, in response to an input trajectory obtained from the touch operation performed on the touch panel, calculating a corresponding trajectory in the game space so as to correspond to the input trajectory; and
moving direction determination programmed logic circuitry for determining a moving direction for the second operable object in the game space in accordance with the corresponding trajectory calculated by the corresponding trajectory calculation programmed logic circuitry, and
the continuous action control programmed logic circuitry controls the second operable object to continuously perform an action of moving in the moving direction determined by the moving direction determination programmed logic circuitry.

6. The game apparatus according to claim 5, wherein the second display controller comprises trajectory display control programmed logic circuitry for displaying, in the second game image, the corresponding trajectory calculated by the corresponding trajectory calculation programmed logic circuitry.

7. The game apparatus according to claim 6, wherein, the game apparatus further comprises movable trajectory setting programmed logic circuitry for, when a touch operation is performed on the touch panel so as to touch on the corresponding trajectory displayed in the second game image, setting the corresponding trajectory as a movable trajectory,
the corresponding trajectory calculation programmed logic circuitry comprises corresponding trajectory calculation programmed logic circuitry for calculating a new corresponding trajectory by moving the movable trajectory set by the movable trajectory selection programmed logic circuitry within the game space in accordance with a touch operation performed on the touch panel, and
the moving direction determination programmed logic circuitry extemporaneously determines a moving direction for the second operable object in the game space in accordance with the new corresponding trajectory calculated by the corresponding trajectory calculation programmed logic circuitry.

8. The game apparatus according to claim 5, wherein the continuous action control programmed logic circuitry controls a plurality of second operable objects to continuously perform an action of simultaneously moving in the moving direction determined by the moving direction determination programmed logic circuitry.

9. The game apparatus according to claim 1, wherein, the game apparatus further comprises corresponding coordinates calculation programmed logic circuitry for, in response to input coordinates obtained from the touch operation performed on the touch panel, calculating corresponding coordinates in the game space so as to correspond to the input coordinates, and
the continuous action control programmed logic circuitry controls the second operable object to move toward the corresponding coordinates calculated by the corresponding coordinates calculation programmed logic circuitry.

10. A game apparatus for displaying a game image representing an operable object in a game space, the operable object being controllable in response to an operation performed by a player, comprising:
a first display section;
an input section which does not comprise a touch panel;
a first action controller for controlling an action of a first operable object in accordance with an operation performed on the input section;
a first display controller for displaying on the first display section a first game image representing at least a portion of the game space;
a second display section different from the first display section;
a touch panel provided on a surface of the second display section;
a second action controller for controlling an action of a second operable object in accordance with a touch operation performed on the touch panel; and
a second display controller for displaying on the second display section a second game image representing at least a portion of the game space, the second game image being different from the first game image, wherein the first operable object is different than the second operable object, wherein,
the game space comprises a plurality of operable objects, the game apparatus further comprising:
a first operable object selector for selecting at least one of the plurality of operable objects as a first operable object, the selection being made automatically or by the player;

a second operable object selector for selecting at least one of the plurality of operable objects as a second operable object, the selection being made in accordance with coordinates obtained from the touch operation;

automatic action control programmed logic circuitry for automatically controlling the action of the second operable object according to predetermined rules;

a control selector for, when the second operable object which is acting under the control of the automatic action controller becomes controllable under the first action controller in accordance with an operation performed on the input section when a predetermined action in the game occurs, switching said second operable object between being controlled to act by the automatic action control programmed logic circuitry while no operation is performed on the input section and said second operable object being controlled to act by the first action controller if an operation is performed on the input section, and control selection programmed logic circuitry for switching the second operable object between being controlled to act by the automatic action control programmed logic circuitry while no touch operation is performed on the touch panel and said second operable object being controlled to act by the second action controller if a touch operation is performed on the touch panel.

11. The game apparatus according to claim 1, wherein, the second operable object selector selects at least one of the plurality of operable objects, excluding the first operable object, as a second operable object.

12. The game apparatus according to claim 11, wherein the first operable object is controlled to act by the first action controller in accordance with an operation performed on the input section, and is not controlled to act by the second action controller in accordance with an operation performed on the touch panel.

13. A game apparatus for displaying a game image representing an operable object in a game space, the operable object being controllable in response to an operation performed by a player, comprising:

a first display section;

an input section which does not comprise a touch panel;

a first action controller for controlling an action of a first operable object in accordance with an operation performed on the input section;

a first display controller for displaying on the first display section a first game image representing at least a portion of the game space;

a second display section different from the first display section;

a touch panel provided on a surface of the second display section;

a second action controller for controlling an action of a second operable object in accordance with a touch operation performed on the touch panel; and a second display controller for displaying on the second display section a second game image representing at least a portion of the game space, the second game image being different from the first game image, wherein the first operable object is different than the second operable object, the second action controller comprises continuous action control programmed logic circuitry for, after the touch operation is performed on the touch panel, controlling the second operable object to continuously perform an action which is in accordance with the touch operation, the game apparatus further comprising a control selector for, when the second operable object which is acting under the control of the continuous action controller becomes controllable under the first action controller in accordance with an operation performed on the input section when a predetermined action in the game occurs, switching said second operable object between being controlled to act by the continuous action control programmed logic circuitry while no operation is performed on the input section and said second operable object being controlled to act by the first action controller if an operation is performed on the input section, wherein, the game apparatus further comprises corresponding coordinates calculation programmed logic circuitry for, in response to input coordinates obtained from the touch operation performed on the touch panel, calculating corresponding coordinates in the game space so as to correspond to the input coordinates, and the second display controller displays an enlarged version of the second game image on the second display section, the enlarged version being enlarged around a central point represented by the corresponding coordinates calculated by the corresponding coordinates calculation programmed logic circuitry.

14. A non-transitory storage medium storing a game program to be executed by a computer in a game apparatus including: a first display section and a second display section for each displaying a game image representing an operable object in a game space, the operable object being controllable in response to an operation performed by a player; a touch panel provided on a surface of the second display section; an input section which does not comprise a touch panel; and a storage section, the game program causing the computer to function as:

a first action controller for controlling an action of a first operable object in accordance with an operation performed on the input section;

a first display controller for displaying on the first display section a first game image representing at least a portion of the game space;

a second action controller for controlling an action of a second operable object in accordance with a touch operation performed on the touch panel; and a second display controller for displaying on the second display section a second game image representing at least a portion of the game space, the second game image being different from the first game image, wherein the first operable object is different than the second operable object, wherein, the game space comprises a plurality of operable objects, the game program causes the computer to function further as:

a first operable object selector for selecting at least one of the plurality of operable objects as a first operable object, the selection being made automatically or by the player; and a second operable object selector for selecting at least one of the plurality of operable objects as a second operable object, the selection being made in accordance with coordinates obtained from the touch operation, wherein the second action controller comprises continuous action controller for, after the touch operation is performed on the touch panel, controlling the second operable object to continuously perform an action which is in accordance with the touch operation, wherein the game program causes the computer to function further as a control selector for, when the second operable object which is acting under the control of the continuous action controller becomes controllable under the first action controller in accordance with an operation performed on the input section when a predetermined action in the game occurs, switching said second operable object between being controlled to act by the continuous action control programmed logic circuitry while no operation is performed on the input section and said operable object being controlled to act by the first action controller if an operation is performed on the input section.

15. The storage medium storing the game program according to claim 14, wherein,
the game program causes the computer to function further as:
game parameter storage locations for storing a game parameter pertaining to the game space to the storage section;
first changing programmed logic circuitry for changing the game parameter stored in the storage section in accordance with the action of the operable object controlled by the first action controller; and
second changing programmed logic circuitry for changing the game parameter stored in the storage section in accordance with the action of the operable object controlled by the second action controller,
the first display controller displays on the first display section the first game image representing at least a portion of the game space and being generated based on the game parameter, and
the second display controller displays on the second display section the second game image representing at least a portion of the game space and being generated based on the game parameter.

16. The storage medium storing the game program according to claim 14, wherein the second game image displayed on the second display section is an image selected from the group consisting of: a game image which is a 2D expression of the game space as plan-viewed from above; an image representing a portion of the game space broader than and encompassing the first game image displayed on the first display section; and an image representing the entire game space.

17. The storage medium storing the game program according to claim 14, wherein,
the first game image displayed on the first display section is an image at least containing an image representing the operable object whose action is controlled by the first action controller, and
the second game image displayed on the second display section is an image at least containing an image representing the operable object whose action is controlled by the second action controller.

18. The storage medium storing the game program according to claim 14, wherein,
the game program causes the computer to function further as:
corresponding trajectory calculation programmed logic circuitry for, in response to an input trajectory obtained from the touch operation performed on the touch panel, calculating a corresponding trajectory in the game space so as to correspond to the input trajectory; and
moving direction determination programmed logic circuitry for determining a moving direction for the second operable object in the game space in accordance with the corresponding trajectory calculated by the corresponding trajectory calculation programmed logic circuitry, and the continuous action control programmed logic circuitry controls the second operable object to continuously perform an action of moving in the moving direction determined by the moving direction determination programmed logic circuitry.

19. The storage medium storing the game program according to claim 18, wherein the continuous action control programmed logic circuitry controls a plurality of second operable objects to continuously perform an action of simultaneously moving in the moving direction determined by the moving direction determination programmed logic circuitry.

20. The storage medium storing the game program according to claim 18, wherein the second display controller comprises trajectory display control programmed logic circuitry for displaying, in the second game image, the corresponding trajectory calculated by the corresponding trajectory calculation programmed logic circuitry.

21. The storage medium storing the game program according to claim 20, wherein,
the game program causes the computer to function further as movable trajectory setting programmed logic circuitry for, when a touch operation is performed on the touch panel so as to touch on the corresponding trajectory displayed in the second game image, setting the corresponding trajectory as a movable trajectory,
the corresponding trajectory calculation programmed logic circuitry comprises corresponding trajectory calculation programmed logic circuitry for calculating a new corresponding trajectory by moving the movable trajectory set by the movable trajectory selection programmed logic circuitry within the game space in accordance with a touch operation performed on the touch panel, and
the moving direction determination programmed logic circuitry determines a moving direction for the second operable object in the game space in accordance with the new corresponding trajectory calculated by the corresponding trajectory calculation programmed logic circuitry.

22. The storage medium storing the game program according to claim 14, wherein,
the game program causes the computer to function further as corresponding coordinates calculation programmed logic circuitry for, in response to input coordinates obtained from the touch operation performed on the touch panel, calculating corresponding coordinates in the game space so as to correspond to the input coordinates, and
the continuous action control programmed logic circuitry controls the second operable object to move toward the corresponding coordinates calculated by the corresponding coordinates calculation programmed logic circuitry.

23. The storage medium storing the game program according to claim 14, wherein,
the second operable object selector selects at least one of the plurality of operable objects, excluding the first operable object, as a second operable object.

24. The storage medium storing the game program according to claim 23, wherein the first operable object is controlled to act by the first action controller in accordance with an operation performed on the input section, and is not controlled to act by the second action controller in accordance with an operation performed on the touch panel.

25. A non-transitory storage medium storing a game program to be executed by a computer in a game apparatus including: a first display section and a second display section for each displaying a game image representing an operable object in a game space, the operable object being controllable in response to an operation performed by a player; a touch panel provided on a surface of the second display section; an input section which does not comprise a touch panel; and a storage section, the game program causing the computer to function as:

a first action controller for controlling an action of a first operable object in accordance with an operation performed on the input section;

a first display controller for displaying on the first display section a first game image representing at least a portion of the game space;

a second action controller for controlling an action of a second operable object in accordance with a touch operation performed on the touch panel; and a second display controller for displaying on the second display section a second game image representing at least a portion of the game space, the second game image being different from the first game image, wherein the first operable object is different than the second operable object, wherein, the game space comprises a plurality of operable objects, the game program causes the computer to function further as:

a first operable object selector for selecting at least one of the plurality of operable objects as a first operable object, the selection being made automatically or by the player; and a second operable object selector for selecting at least one of the plurality of operable objects as a second operable object, the selection being made in accordance with coordinates obtained from the touch operation;

an automatic action controller for automatically controlling the action of the second operable object according to predetermined rules;

a control selector for, when the second operable object which is acting under the control of the continuous action controller becomes controllable under the first action controller in accordance with an operation performed on the input section when a predetermined action in the game occurs, switching said second operable object between being controlled to act by the continuous action control programmed logic circuitry while no operation is performed on the input section and said second operable object being controlled to act by the first action controller if an operation is performed on the input section; and a control selector for ensuring that the second operable object is controlled to act by the automatic action controller while no touch operation is performed on the touch panel and that the second operable object is controlled to act by the second action controller if a touch operation is performed on the touch panel.

26. A non-transitory storage medium storing a game program to be executed by a computer in a game apparatus including: a first display section and a second display section for each displaying a game image representing an operable object in a game space, the operable object being controllable in response to an operation performed by a player; a touch panel provided on a surface of the second display section; an input section which does not comprise a touch panel; and a storage section, the game program causing the computer to function as:

a first action controller for controlling an action of a first operable object in accordance with an operation performed on the input section;

a first display controller for displaying on the first display section a first game image representing at least a portion of the game space;

a second action controller for controlling an action of a second operable object in accordance with a touch operation performed on the touch panel;

a second display controller for displaying on the second display section a second game image representing at least a portion of the game space, the second game image being different from the first game image, wherein the first operable object is different than the second operable object, the second action controller comprises continuous action control programmed logic circuitry for, after the touch operation is performed on the touch panel, controlling the second operable object to continuously perform an action which is in accordance with the touch operation; the game apparatus further comprising a control selector for, when the second operable object which is acting under the control of the continuous action controller becomes controllable under the first action controller in accordance with an operation performed on the input section when a predetermined action in the game occurs, switching said second operable object between being controlled to act by the continuous action control programmed logic circuitry while no operation is performed on the input section and said second operable object being controlled to act by the first action controller if an operation is performed on the input section, wherein, the game program causes the computer to function further as corresponding coordinates calculation programmed logic circuitry for, in response to input coordinates obtained from the touch operation performed on the touch panel, calculating corresponding coordinates in the game space so as to correspond to the input coordinates, and the second display controller displays an enlarged version of the second game image on the second display section, the enlarged version being enlarged around a central point represented by the corresponding coordinates calculated by the corresponding coordinates calculation programmed logic circuitry.

\* \* \* \* \*